(12) United States Patent
Hasan Abadi et al.

(10) Patent No.: US 11,706,066 B2
(45) Date of Patent: Jul. 18, 2023

(54) BANDWIDTH ADJUSTABLE EUCLIDEAN MODULATION

(71) Applicant: Kymeta Corporation, Redmond, WA (US)

(72) Inventors: Seyed Mohamad Amin Momeni Hasan Abadi, Redmond, WA (US); Mohsen Sazegar, Kirkland, WA (US)

(73) Assignee: Kymeta Corporation, Redmond, WA (US)

( * ) Notice: Subject to any disclaimer, the term of this patent is extended or adjusted under 35 U.S.C. 154(b) by 0 days.

(21) Appl. No.: 17/103,742

(22) Filed: Nov. 24, 2020

(65) Prior Publication Data
US 2021/0160110 A1 May 27, 2021

Related U.S. Application Data

(60) Provisional application No. 62/940,423, filed on Nov. 26, 2019.

(51) Int. Cl.
*H04L 27/12* (2006.01)
*H01Q 3/44* (2006.01)
*H01Q 3/22* (2006.01)
*H01Q 13/10* (2006.01)

(52) U.S. Cl.
CPC ............ *H04L 27/12* (2013.01); *H01Q 3/22* (2013.01); *H01Q 3/44* (2013.01); *H01Q 13/103* (2013.01)

(58) Field of Classification Search
CPC .................................................... H04L 27/12
USPC ........................................................ 375/302
See application file for complete search history.

(56) References Cited

U.S. PATENT DOCUMENTS

| | | | | |
|---|---|---|---|---|
| 6,147,648 | A * | 11/2000 | Granholm | H01Q 21/065 343/700 MS |
| 9,967,011 | B1 * | 5/2018 | Lipworth | H01Q 1/36 |
| 2006/0262007 | A1 * | 11/2006 | Bonthron | G01S 13/44 342/107 |
| 2012/0115429 | A1 | 5/2012 | Falk | |
| 2014/0162578 | A1 | 6/2014 | Langer et al. | |
| 2015/0236412 | A1 * | 8/2015 | Bily | H01Q 21/0012 343/731 |

(Continued)

FOREIGN PATENT DOCUMENTS

| | | |
|---|---|---|
| CN | 103684564 A | 3/2014 |
| CN | 109547085 A | 3/2019 |

OTHER PUBLICATIONS

International Search Report and Written Opinion on the Patentability of Application No. PCT/US2020-062460 dated Mar. 26, 2021, 10 pages.

(Continued)

*Primary Examiner* — Lihong Yu
(74) *Attorney, Agent, or Firm* — Womble Bond Dickinson (US) LLP

(57) ABSTRACT

A method and apparatus for using Euclidean modulation in an antenna are disclosed. In one embodiment, a method for controlling an antenna comprises mapping a desired modulation to achievable modulation states, mapping modulation values associated with the achievable modulation states to one or more control parameters, and controlling radio frequency (RF) radiating antenna elements using the one or more control parameters to perform beam forming.

15 Claims, 35 Drawing Sheets

Map a desired modulation to achievable modulation states
911

Map modulation values associated with the achievable modulation states to control parameters
912

Control radio frequency (RF) radiating antenna elements using the control parameters to perform beam forming
913

(56) References Cited

U.S. PATENT DOCUMENTS

2019/0238375 A1    8/2019    Bowen et al.

OTHER PUBLICATIONS

International Preliminary Report and Written Opinion on the Patentability of Application No. PCT/US2020/062460 dated Jun. 9, 2022, 7 pages.

\* cited by examiner

Perform modulation for a frequency range (e.g., obtaining the desired modulation, mapping the desired modulation to the achievable modulation states, and determining a first set of modulation values for achievable modulation states associated with the frequency range)
2211

↓

Map modulation values associated with the achievable modulation states to one or more control parameters
2212

↓

Control the radiating antenna elements using the one or more control parameters to perform beam forming
2213

FIG. 22B

Determine, for a first frequency window (e.g., a single frequency, a frequency window/range), a desired modulation associated with a desired impedance for each radio frequency (RF) radiating antenna element of a plurality of RF radiating antenna elements of an antenna, using a holographic equation that relates a feed wave to a desired radiation pattern
2221

Map the desired modulation to achievable modulation states using Euclidean mapping
2222

Determine whether gain associated with a modulation pattern is above a threshold
2223

Is gain above the threshold?
2224

No → End the process 2225

Yes

Determine whether requirements for instantaneous bandwidth (IBW) have been met previously by the first frequency window
2226

If the IBW requirements are not met by the first frequency window, then adjust the first frequency window by increasing size of the first frequency window to create a second frequency window and repeat the process using the second frequency window instead of the first frequency window
2227

If requirements for IBW are met, then map modulation values associated with the achievable modulation states to one or more control parameters, and control RF radiating antenna elements using the one or more control parameters to perform beam forming
2228

FIG. 22C

BANDWIDTH ADJUSTABLE EUCLIDEAN MODULATION

PRIORITY

The present patent application claims priority to and incorporates by reference the corresponding provisional patent applications No. 62/940,423, titled, "BANDWIDTH ADJUSTABLE EUCLIDEAN MODULATION," filed on Nov. 26, 2019.

FIELD OF THE INVENTION

Embodiments of the present invention relate to the field of antennas; more particularly, embodiments of the present invention relate to the use of a distance-based mapping between desired and achievable modulation states to control a holographic beamforming antenna.

BACKGROUND

Metasurface antennas have recently emerged as a new technology for generating steered, directive beams from a lightweight, low-cost, and planar physical platform. Such metasurface antennas have been recently used for microwave applications and stand to provide relevant hardware and software gains for various applications such as microwave imaging, communications and synthetic aperture radar.

Metasurface antennas may comprise a waveguide structure, loaded with resonant, complementary metamaterial elements in the upper surface of the waveguide that can selectively couple energy away from a guided wave into free space as radiation. By tuning the constituent elements' characteristics, a hologram at the aperture plane can be achieved, in which the waveguide mode acts as the reference wave and the collection of tuned elements form the hologram. The overall radiation from these holographic antennas can thereby be modulated to form arbitrary patterns by the use of electronic tuning. These antennas are capable of achieving comparable performance to phased array antennas from an inexpensive and easy-to-manufacture hardware platform.

By using simpler elements as compared to phased arrays, the operation of metasurfaces is easier and faster. These elements, however, do not exhibit the same level of control as is achievable with phase shifters and amplifiers, common to phased array architectures. To regain some of the control possible with phased array elements, metasurface elements are typically spaced closer together in order to more finely sample the guided wave. In further contrast to phased array antennas, however, tuning metamaterial elements does not provide independent control of both the magnitude and phase of each individual element in the array. Instead, tuning a metamaterial unit cell results in a shift in the resonant frequency, which shifts both the magnitude and phase response with only one control knob. As a result, attempting to create arbitrary magnitude or phase patterns within a metasurface antenna can yield undesirable results.

The reason that creating arbitrary magnitude or phase patterns does not work as intended can be traced back to the coupled nature of the magnitude and phase of the resonant elements in a metasurface antenna. Considering a phase pattern, when tuning an antenna element to a certain phase value, the magnitude of the element becomes correspondingly shifted. This arbitrary shift can lead to unwanted periodic behavior or to low radiation efficiency. In the same manner, similar side effects of phase artifacts result when attempting to create a magnitude pattern. These problems do not exist in traditional phased array systems because amplifiers and phase shifters can directly compensate for any such unwanted artifacts.

One method of modulating individual elements in a metasurface antenna element is to turn some elements "on" while others are kept "off". This is referred to as binary modulation. Another method that is used is referred to as greyshade modulation in which antenna elements have more states than simply one "on" states and an "off" state.

Instantaneous bandwidth (IBW) is defined herein as the frequency range that the antenna demonstrates consistent radiation characteristics without changes in the modulation pattern, where consistency refers to gain variation being below a defined requirement in response to changes in the modulation pattern (e.g., changes in frequency). In holographic metasurface antennas, the modulation pattern refers to as the impedance of the scattering antenna elements (RF radiating antenna elements) forming the metasurface. The desired impedance for each element is calculated using a holographic equation that relates the feed wave to a desired radiation pattern. These impedance values, however, are ideal and need to be translated to an impedance that can be realized using the available scattering antenna elements. This is done using Euclidean mapping that reduces, and potentially minimizes, the Euclidean distance (i.e., mapping error) between the desired and achievable impedances.

One way to do this calculation to reduce the Euclidean distance is at a single desired frequency, which can be the center frequency, the modulation frequency, or the carrier frequency. This means that the calculated modulation pattern is optimized only for that frequency and not necessarily optimized at any other frequency. Because of this, as the frequency moves further away from that desired frequency, mapping errors can result in an offset in the direction of the beam compared to the beam at the reference frequency. This is generally referred to as beam squinting. Beam squinting reduces the gain flatness, which consequently limits the instantaneous bandwidth.

SUMMARY

A method and apparatus for using Euclidean modulation in an antenna are disclosed. In one embodiment, a method for controlling an antenna having a plurality of radio frequency (RF) radiating antenna elements, comprises: performing modulation for a frequency range, including determining a first set of modulation values for achievable modulation states associated with the frequency range; mapping modulation values associated with the achievable modulation states to one or more control parameters; and controlling the radiating antenna elements using the one or more control parameters to perform beam forming.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 22B is a flow diagram of another embodiment of a process for performing bandwidth adjustable Euclidean modulation processing.

FIG. 22C is a flow diagram of yet another embodiment of a process for performing bandwidth adjustable Euclidean modulation processing.

DETAILED DESCRIPTION

Figure 1:
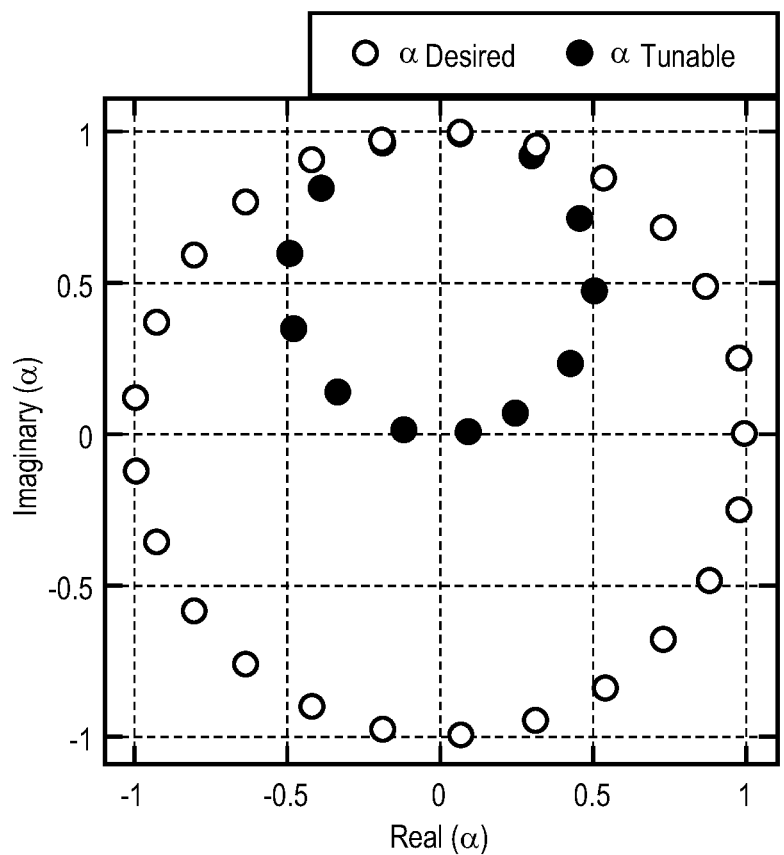
FIG. 1 illustrates desired polarizabilities required to achieve a directive beam and polarizabilities achievable by tuning metasurface elements.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

To overcome problems disclosed above, an antenna is controlled using Euclidean Modulation. Euclidean modulation is a technique that can improve and potentially optimize the tuned resonant frequency of each metamaterial element to achieve arbitrary, desired, radiation patterns from a metasurface antenna. More specifically, Euclidean modulation is a particular technique for finding a resonance frequency for each metamaterial element that provides a superior overall beam performance compared to prior art. While metasurface antennas do not exhibit the same direct control over the element responses, employing the appropriate modulation technique results in performance on par with phased arrays that can be achieved from a hardware platform that is lightweight, low power, and inexpensive.

In one embodiment, the Euclidean modulation is a bandwidth adjustable Euclidean modulation. In one embodiment, the bandwidth adjustable Euclidean modulation selects for use a Euclidean modulation that meets IBW requirements. In another embodiment, the bandwidth adjustable Euclidean modulation selects for use a Euclidean modulation that meets both gain and IBW requirements. One or both of the gain and IBW requirements may be set by a satellite services provider.

A method and apparatus for performing bandwidth adjustable Euclidean modulation with satellite antennas in a satellite communication system are disclosed. In one embodiment, the satellite antennas are electronically-steered flat panel antennas with radio frequency (RF) radiating elements, such as, for example, but not limited to, the antennas described in more detail below.

The following description provides a general description of holographic antennas, phase hologram modulation, followed by a description of Euclidean modulation, and then a description of bandwidth adjustable Euclidean modulation.

Holographic Antennas

In one embodiment, holographic antennas comprise a waveguide structure with a guided wave incident on the metasurface elements embedded within the waveguide. Relative to a traditional hologram, the guided wave can be treated as the reference wave, which interferes with the array of metasurface elements. By tuning these elements, the hologram can be altered to produce arbitrary radiation patterns in the far field.

The scattered field of any object or antenna can be described by the object's far-field pattern. In the case of a leaky waveguide antenna or holographic meta-material antenna, the antenna performs ideally when it radiates in only a single direction, i.e., when the field produced by the antenna is a plane wave, so that $$E(r) = E_0 e^{-ik_0 \cdot r}. \quad (1)$$

where $E_0$ is the polarization and $k_0$ is the desired direction of the antenna beam. In the language of scattering theory, this would imply that the radiation pattern from the antenna is a delta function in k-space. If the antenna were to extend infinitely in a plane S with unit-normal vector $\hat{n}$, then the set of currents that would produce this far-field pattern are a set of magnetic surface currents over a perfectly electric conducting (PEC) ground plane, given for points $r \in S$ as $$K_M = E \times \hat{n} = E_0 \times \hat{n} e^{-ik_0 \cdot r}. \quad (2)$$

Alternatively, one way to prove equation (2) is to use Schelkunoff's equivalence principles. For more information, see R. E. Collin, Antennas, and P. Society, *Field theory of guided waves*, IEEE/OUP series on electromagnetic wave theory, New York: IEEE Press, 1991, published under the sponsorship of the IEEE Antennas and Propagation Society. One of Schelkunoff's equivalence principles states that, if the electric and magnetic fields are known on the boundary S of a domain V that contains no sources, then the field inside V is equal to the field that would be radiated by a magnetic current $K_M = E \times n$ that lies on S, and is backed by a PEC just behind S. However, it is also possible to state Schelkunoff's equivalence principle backwards: if one desires a particular electric field E in a volume V that is bounded by a surface S, then placing a magnetic surface current of $K_M = E \times n$ along with a PEC will achieve the electric field E, provided that E is a solution to the wave equation in free space. If the volume V to be the upper half-space with S being the plane where z=0, then the inverse of Schelkunoff's equivalence principle dictates that the magnetic current distribution in equation (2) will radiate like a plane wave in the direction $k_0$. The inverse of Schelkunoff's equivalence principles is not unique: i.e., there are other current distributions that will yield the same field (for instance, an electric surface current along with a perfect magnetic conductor (PMC) boundary applied to the surface S will achieve the same result), but it does give a solution to the problem.

In the context of holographic metamaterial antennas, the goal is to produce the required surface current $K_M$ using waveguide slots or complimentary metamaterial elements. In one embodiment, these elements are known to radiate like magnetic dipoles, and since they are coupled to a ground plane, they can provide the required magnetic surface current to produce an ideal plane-wave beam in the limit that the antenna is infinitely large. Holographic metamaterial antennas typically use a waveguide or feed structure to excite the complimentary metamaterial elements, and in the limit that the distance A between the metamaterial elements is deeply sub-wavelength, the magnetic surface current can be written down as a magnetic surface susceptibility tensor $\overline{\chi}_M$, times the magnetic field of the feed wave $H_f$:

$$K_M(r) = -i\omega \hat{\chi}_M(r) H_f(r). \quad (3)$$

The surface susceptibility is defined as the magnetic dipole moment generated per unit area on the surface of the antenna, and so in one embodiment it is physically composed of a lattice of complementary metamaterial elements in the surface of the waveguide that scatter like magnetic dipoles. In order to achieve a well-formed beam, the surface current is set equal to $E_0 \times n e^{k_0 \cdot r}$, which is done in practice by designing the surface susceptibility tensor $\hat{\chi}_M$ using the modulation pattern. Moreover, in order to allow the antenna to produce a beam with any polarization, both eigenvectors of the surface susceptibility tensor are orthogonal and controlled in two different directions. In one embodiment, this is done using holographic metamaterial antennas by imposing two lattices of metamaterial scattering elements, where each element in each lattice can be excited with a magnetic dipole moment in only one direction, and the directions of the dipoles in the two lattices are orthogonal.

To derive the control of these lattices of magnetic dipoles, consider two lattices where the positions of the dipoles in the first lattice are $r_i$ with orientations $\hat{v}_i$, and where the positions of the dipoles in the second lattice are also $r_i$, but with orientations $\hat{\mu}_i$ such that $\hat{v}_i \cdot \hat{\mu}_i = 0$. Then the surface susceptibility tensor can be generally written as $$\overline{\chi}_M(r_i) = \chi_1(r_i) \hat{v}_i \otimes \hat{v}_i + \chi_2(r_i) \hat{\mu}_i \otimes \hat{\mu}_i \quad (4)$$

where the symbol $\otimes$ is used to designate the tensor product. If the scattering of the elements into the waveguide is small enough to be negligible, then the surface susceptibility at position $r_i$ is related to the magnetic polarizability $\alpha_i^1$ of the element in the first lattice at position $r_i$ by $\alpha_i^1 = \Lambda^2 \chi_1(r_i)$ while the polarizability of the element in the second lattice is likewise $\alpha_i^2 = \Lambda^2 \chi_2(r_i)$. Using this relationship, together with equations (3) and (4), a straightforward calculation shows that the required polarizabilities of the dipoles are $$\alpha_1^i = \frac{i\mu_0 \Lambda^2}{Z_0 k} E_0 \cdot (\hat{n} \times \hat{v}_i) \left( \frac{e^{ik_0 \cdot r_i}}{H_f \cdot \hat{v}_i} \right) \quad (5a)$$

$$\alpha_2^i = \frac{i\mu_0 \Lambda^2}{Z_0 k} E_0 \cdot (\hat{n} \times \hat{\mu}_i) \left( \frac{e^{ik_0 \cdot r_i}}{H_f \cdot \hat{\mu}_i} \right). \quad (5b)$$

At this point, a particular form of the feed wave needs to be chosen. In one embodiment, the feed structure is a linear waveguide that only has a single propagating mode, and then the feed-wave on the upper surface of the waveguide is proportional to $H_f \propto h_f e^{i\beta y}$, where $\beta$ is the propagation constant, and the waveguide is assumed to propagate waves in the y-direction. In this case, the requirement on the polarizabilities to produce an ideal beam-pattern is $$\alpha_1^i = \frac{i\mu_0 \Lambda^2}{Z_0 k}\left(\frac{E_0 \cdot (\hat{n} \times \hat{v}_i)}{h_f \cdot \hat{v}_i}\right) e^{i(k_0 - \beta y) \cdot r_i} \quad (6a)$$

$$\alpha_1^i = \frac{i\mu_0 \Lambda^2}{Z_0 k}\left(\frac{E_0 \cdot (\hat{n} \times \hat{\mu}_i)}{h_f \cdot \hat{\mu}_i}\right) e^{i(k_0 - \beta y) \cdot r_i}. \quad (6b)$$

Notice that the term $$\left(\frac{E_0 \cdot (\hat{n} \times \hat{v}_i)}{h_f \cdot \hat{v}_i}\right) \equiv Z_{ant}$$

has units of impedance, and it defines the amplitude of the electric field of the radiated wave relative to the amplitude of the magnetic field of the feed wave.

Also, while the modulation pattern is defined above by desired and achievable polarizabilities, it may be defined by the desired and achievable/realized/available impedances. As is shown, the polarizabilities have a unit of impedance since it defines the amplitude of electric field of the radiated wave to the amplitude of the magnetic field of the feed wave. Thus, it should be understood that these definitions of the modulation pattern are interchangable.

As the index i runs through various metamaterial element positions $r_i$, the ideal modulation pattern is proportional to $e^{i(k_0 - \beta) \cdot r_i}$, which traces out a unit circle in the complex plane. Hence, in an ideal situation, all of the elements would be excited at an equal level, but with different scattering phases which are dictated by the modulation pattern.

Alternatively, in one embodiment, the feed structure is a planar waveguide that is centrally fed, and the feed wave follows the form $H_f = h_f \hat{\theta} H^{(2)}(\beta r) \approx h_f \hat{\theta} e^{i\beta r}/\sqrt{\beta r}$.

$$\alpha_1^i = \frac{i\mu_0 \Lambda^2}{Z_0 k}\left(\frac{E_0 \cdot (\hat{n} \times \hat{v}_i)}{h_f \hat{\theta} \cdot \hat{v}_i}\right) \sqrt{\beta r_i}\, e^{i(k_0 - \beta) \cdot r_i} \quad (7a)$$

$$\alpha_2^i = \frac{i\mu_0 \Lambda^2}{Z_0 k}\left(\frac{E_0 \cdot (\hat{n} \times \hat{\mu}_i)}{h_f \hat{\theta} \cdot \hat{\mu}_i}\right) \sqrt{\beta r_i}\, e^{i(k_0 - \beta) \cdot r_i}. \quad (7b)$$

In this case the required polarizability rotates through all possible phases, but increase as $\sqrt{r}$ to compensate for the natural spread in the feed wave through the aperture. In both of these cases, the requirement for an ideally radiating antenna is that all possible phases of the polarizability of the scattering elements be available. Unfortunately, merely changing the resonance frequency of a metamaterial element does not only change the phase but also the magnitude of scattering of the element, and it is only possible to obtain 180 degrees of all the possible scattering phases at any magnitude. To show this, consider the general form for the polarizability of a resonant metamaterial element. A resonant magnetic dipole over a ground plane has a polarizability that follows a Lorentzian function, which is the form $$\alpha = \frac{\mu_0 \omega_0^2 A}{\omega_0^2 - \omega^2 - i\omega(\Omega + \omega^2 \omega_0^2 A/3\pi c^3)} \quad (8)$$

where $\omega_0 = 1/\sqrt{LC}$ is the resonance frequency of the metamaterial element, c is the speed of light in free space, and $\Omega$ is the Ohmic loss rate. The constant A is an arbitrary coupling coefficient that has dimensions of volume and roughly corresponds to the cube of the effective radius of the dipole. The term $i\omega^2 \omega_0^2 A/3\pi c^2$ in the denominator corresponds to the radiative loss rate, and here it is modified to take into account the losses when the dipole is placed over a ground plane rather than in free space. For more information on Lorentzian, see M. Albooyeh, D. Morits, and S. A. Tretyakov, "Effective electric and magnetic properties of metasurfaces in transition from crystalline to amorphous state," Phys. Rev. B, vol. 85, p. 205110, May 2012.

This discussion now leads to the definition of the basic difficulty with holographic metamaterial antennas that Euclidean modulation attempts to solve. The image of equation (8) as a function of the resonance frequency $\omega_0$ represents the range of polarizabilities that may be achieved by tuning the resonance frequency of a metamaterial cell. However, equations (6a), (6b), (7a) and (7b) prescribe the polarizabilities that are required for each metamaterial element in order for the antenna to radiate in a far-field pattern that most closely approximates an ideal plane wave. Unfortunately, the set of achievable polarzabilities does not overlap with the set of required polarizabilities. In FIG. 1, the real and imaginary parts of equation (8) are plotted as curve 101 in the complex plane that is parameterized by $\omega_0$ for the choice of parameters $\Omega = 0$ and $A = (\lambda/10)^3$, and hence this illustrates the range of achievable polarizabilites using metamaterial elements. The same plot also shows the required polarizabilities from equations (6a) and (6b) for a linear waveguide with metamaterial elements that are placed $\Lambda = \lambda/3.6$ apart, and with $Z_{ant} = 3.1 Z_0$.

Unfortunately, only one out of the 18 polarizabilities needed for this modulation pattern actually lies on the curve of achievable polarizabilities. In order to achieve good beam performance, in one embodiment, an approximation is made in order to use the set of achievable polarizabilities to approximate the required polarizabilities. The Euclidean Modulation technique described herein is used to choose points out of the set of achievable polarizabilities that best approximate the required polarizabilities.

Phase Hologram Modulation

The primary existing method for optimizing the polarizability of each metamaterial element is to form a phase hologram. In this approach, the desired phase of the surface currents still follows a circle in the complex plane as given by equations (6a) and (6b). However, the state of the unit cell is chosen by taking the phase of eq. (8) and finding the point that agrees in phase with equations (6a) and (6b). In this way the magnitude of the unit cell's response is ignored, but the correct phase is chosen. In the case of a metasurface antenna, using a phase hologram to create a beam results in some unintended consequences due to the coupled phase and magnitude of the tunable radiating elements. The goal of achieving a desired phase profile may be met, but in doing so, many elements with the correct phase will be incidentally set to have a low magnitude. Since metasurface antennas lack amplifiers to compensate for this type of side effect, using a traditional phase hologram will result in lost efficiency, which can further be magnified by the losses in a specific system. Conversely, one might focus on a single phase in equations (6a) and (6b), by shifting the circle up the imaginary axis on the complex plane and taking the imaginary part while ignoring the real part of equations (6a) and (6b) to read $$a_1^i = \frac{\mu_0 \Lambda^2}{Z_0 k} \left( \frac{E_0 \cdot (\hat{n} \times \hat{v}_i)}{h_f \cdot \hat{v}_i} \right) [\cos((\beta \hat{y} - k_0) \cdot r_i) + 1] \quad (9a)$$

$$a_1^i = \frac{\mu_0 \Lambda^2}{Z_0 k} \left( \frac{E_0 \cdot (\hat{n} \times \hat{\mu}_i)}{h_f \cdot \hat{\mu}_i} \right) [\cos((\beta \hat{y} - k_0) \cdot r_i) + 1] \quad (9b)$$

Figure 2:
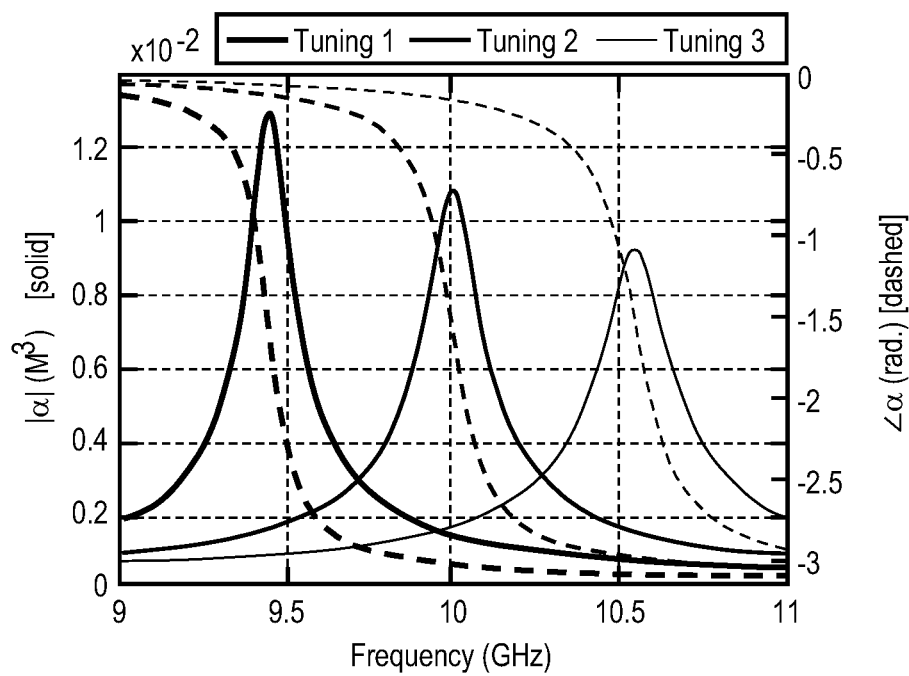
FIG. 2 illustrates Lorentzian polarizability for the idealized metamaterial element used to model a sample metasurface antenna in three different tuning states.

This somewhat artificial construct modifies the modulation circle of desired polarizabilities in the complex plane by mapping it onto a set of positive, real numbers. However, once this is done, it's possible to ignore the phase of the desired modulation pattern, and hence select tuning states of the elements by finding the amplitude of the set of tunable polarizabilities from the Lorentzian elements, which are given by taking the magnitude of equation (8). These amplitudes are shown in FIG. 2. An amplitude hologram is therefore achieved by finding the points in the curve of tunable polarizabilities that are closest in amplitude to the amplitude prescribed in equations (9a) and (9b). As opposed to the phase hologram, which only makes one approximation by ignoring the magnitude, amplitude hologram therefore has two steps in approximation. The first approximation in amplitude hologram is that it ignores the phase of the response of the elements, and the second approximation in amplitude hologram is that it artificially maps the ideal modulation pattern equation to the positive real axis, so that only the amplitude of the response of the elements is relevant.

Euclidean Modulation

Figures 3A, 3B, 3C:
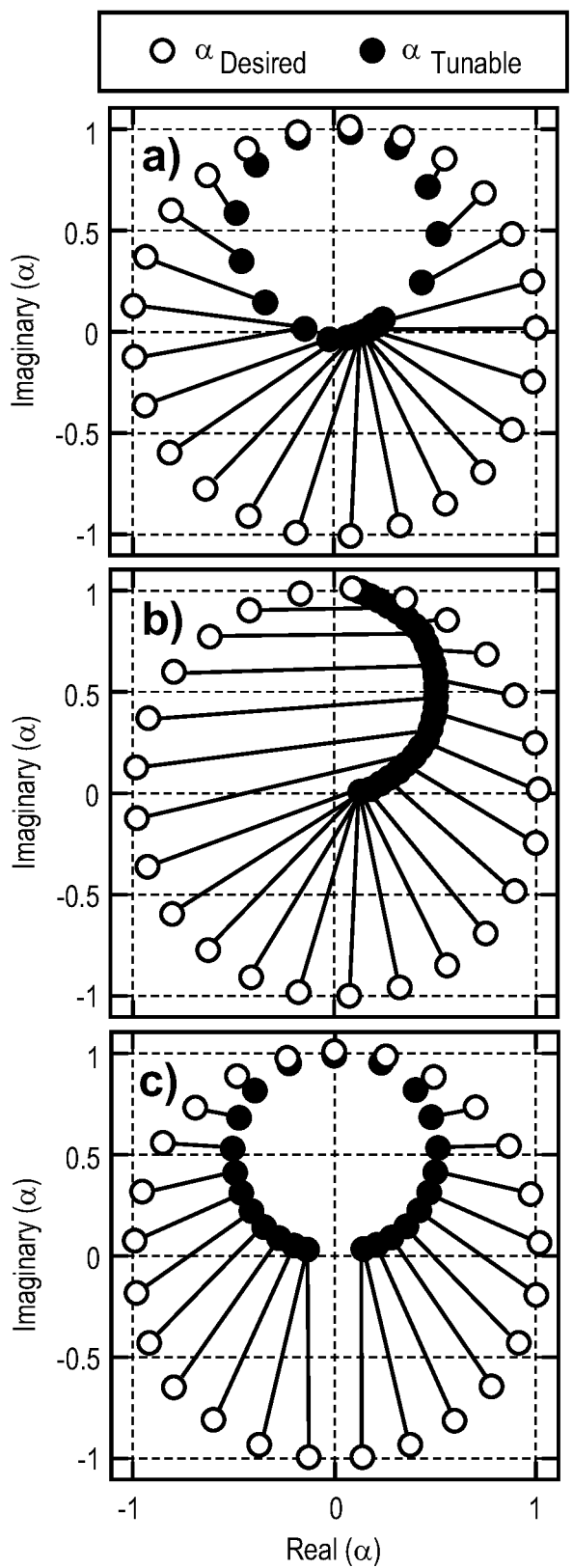
FIGS. 3A-C illustrate the a) phase hologram and b) Euclidean modulation.

Euclidean Modulation is one technique to approximate the set of required polarizabilities with tunable elements in a metasurface. To do this, the Euclidean distance between the required and achievable polarizabilities is reduced, and potentially minimized. FIGS. 3A-3C illustrate a) phase hologram and b) Euclidean modulation. Referring to FIG. 3A-3C, the phase hologram approach involves minimizing the error between the phase of the desired and available polarizabilities. FIG. 3A illustrates where each point on the set of required polarizabilities is mapped to the nearest point on the Lorentzian curve. This mapping is defined by the resonance frequency $\omega_{0i}$ for the $i^{th}$ metamaterial element located at position $r_i$ such that the distance $$d = |\alpha_{L(\omega_{0i})} - \alpha_D(r_i)| \quad (10)$$

is a global minimum. FIGS. 3B and 3C illustrate the Euclidean modulation approach, which involves minimizing the Euclidean norm between the desired and available polarizabilities. Minimizing the Euclidean distance between those two points is a way of locally minimizing the error between the required polarizability and the actual polarizability delivered by the dipole. This does not guarantee that the modulation pattern chosen by Euclidean Modulation is the globally best possible pattern, but it is an optimized pattern in the sense that it is a local maximum of the directivity function.

Far-Field Performance

Figure 4:
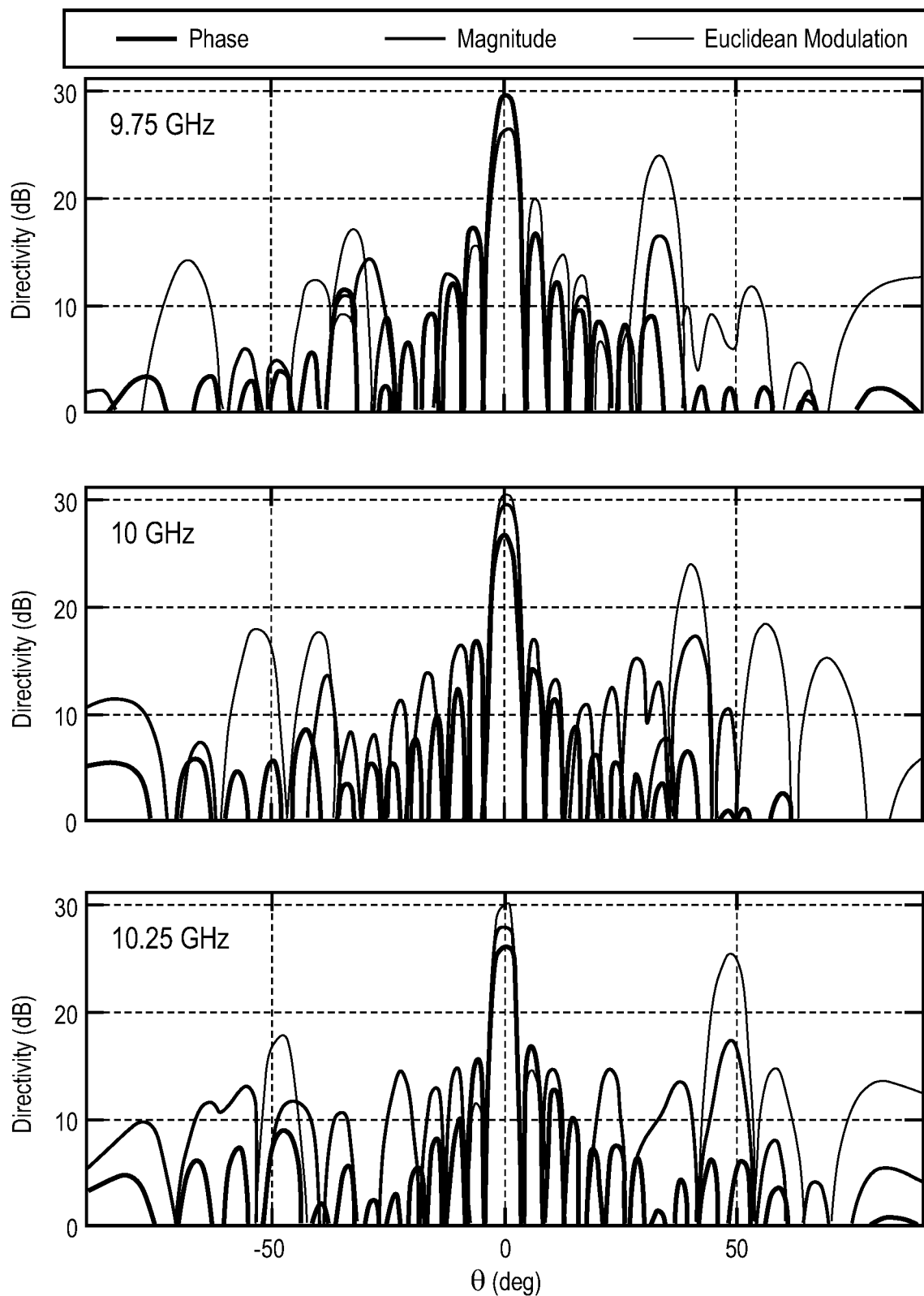
FIG. 4 illustrates far-field radiation patterns for a phase hologram- and Euclidean modulation-optimized broadside beams across the operational bandwidth.
Figure 5:
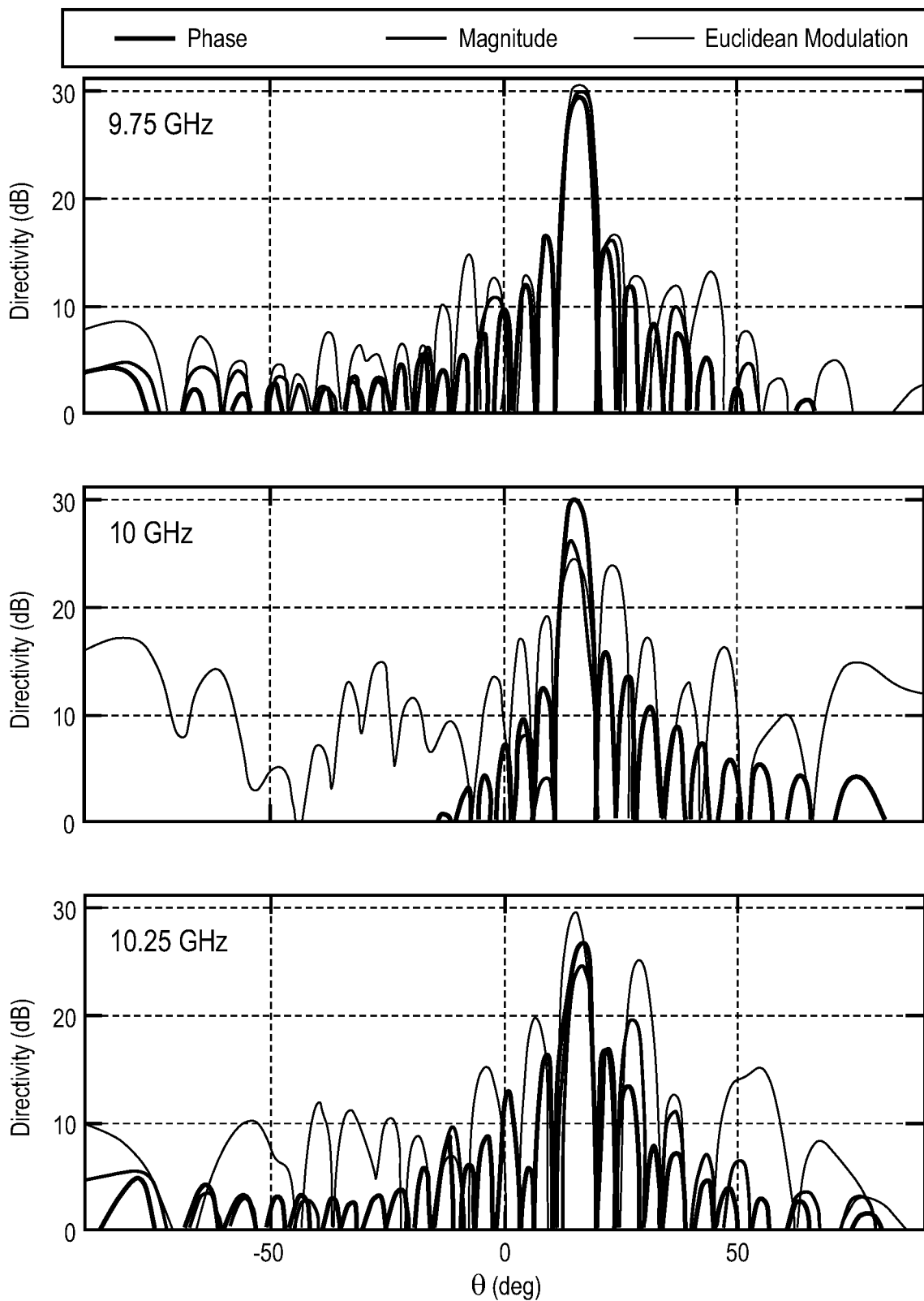
FIG. 5 illustrates far-field radiation patterns for a phase hologram- and Euclidean modulation-optimized beams steered to 25 degrees across the operational bandwidth.

To examine the far-field performance of Euclidean Modulation as compared to the phase hologram and magnitude hologram approaches, consider a sampled, analytically modeled metasurface. In one embodiment, this metasurface consists of a waveguide that is aligned along the x-axis with 50 complementary metamaterial elements that are placed a distance $\Lambda = \lambda/4$ apart from each other, where $\lambda$ is the free space wavelength. These elements are modeled with an idealized Lorentzian polarizability, as plotted in FIG. 2. To model the antenna, an incident magnetic field is modeled as $H(x) = H_0 e^{i\beta x}$. This guided wave is assumed to be unperturbed by the scattering of the elements in the waveguide (without including the aperture taper). By exciting each metamaterial element with the guided wave, a magnetic dipole moment is induced as a function of x and the tuned polarizability, as determined by the given modulation technique. To find the resulting far-field radiation patterns, the magnetic dipole moments of the elements $m_i$ are calculated by assuming the feed wave is unperturbed as it flows through the waveguide, and hence each dipole moment is given by $m_i = \alpha_t(\omega_{0,i}) H(x_i)$, where $\omega_{0,i}$ is the tuned resonance frequency of the $i^{th}$ unit cell, as prescribed by the chosen modulation technique. The collection of dipole moments can be propagated into the far field using Green's functions. Sample radiation patterns for phase hologram and Euclidean Modulation optimization approaches are shown in FIG. 4 for different frequencies. The Euclidean Modulation patterns result in beams with superior broadband directivity and reduced sidelobe levels, as described in further below.

Broadband Directivity

The beam patterns shown in FIG. 4 demonstrate that Euclidean modulation exhibits superior directivity across a wide bandwidth. The directivity of beams generated with a phase hologram and Euclidean Modulation can be calculated across the full operational bandwidth. The only intrinsic limitation on the bandwidth of these patterns is the beam squint. If a pattern is a solution to the modulation equations at one particular frequency for a certain angle, then for a small change in frequency that pattern will be a solution to the modulation pattern equations at a slightly different angle. This effect causes the beam to shift its angle as the frequency changes, which is consistent with the operation of a conventional leaky-wave antenna. That is, by creating the appropriate hologram at the surface of the aperture by tuning the metasurface elements, a leaky-wave antenna has essentially been created. Note that the tuning can be adjusted per frequency to maintain a constant steered angle.

An additional limitation on the broadband performance of the antenna is due to the decay of the fields in the waveguide. The ideal surface current on the antenna would follow equation (2), which prescribes a surface current of constant magnitude and rotating phase across the surface of the antenna. Unfortunately, as metamaterial elements scatter waves out of the antenna, the feed wave $H_f$ decays and cannot excite elements farther down the array as strongly as it can excite elements at the beginning of the array. This effect depends entirely on how strongly the elements couple to the feed wave and the decay in the feed wave increases exponentially with an increase in coupling. Holographic metamaterial antennas are therefore designed to operate away from the resonant frequency of the metamaterial elements in order to prevent strong coupling of the elements from decaying the feed wave too quickly. However, they also cannot operate far from the resonance due to the fact that if the elements couple too weakly, more energy is lost in the waveguide and the overall efficiency will be reduced. Additionally, the individual elements can only be tuned over a finite bandwidth, resulting in smaller variations in polarizability away from the resonance. As a result, the operational bandwidth of a metasurface antenna is limited due to a minimum coupling level required to achieve a high efficiency. These two effects place a limitation on the usable bandwidth of the antenna.

Figure 6:
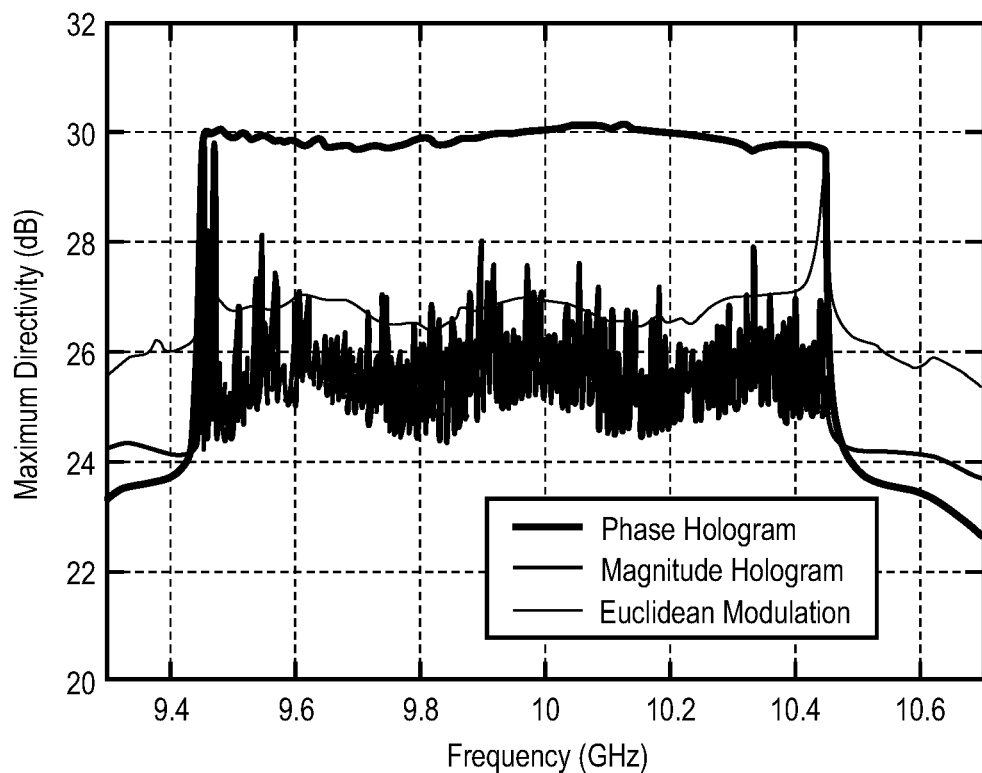
FIG. 6 illustrates beam characteristics for three modulation techniques over a wide bandwidth.
Figure 7:
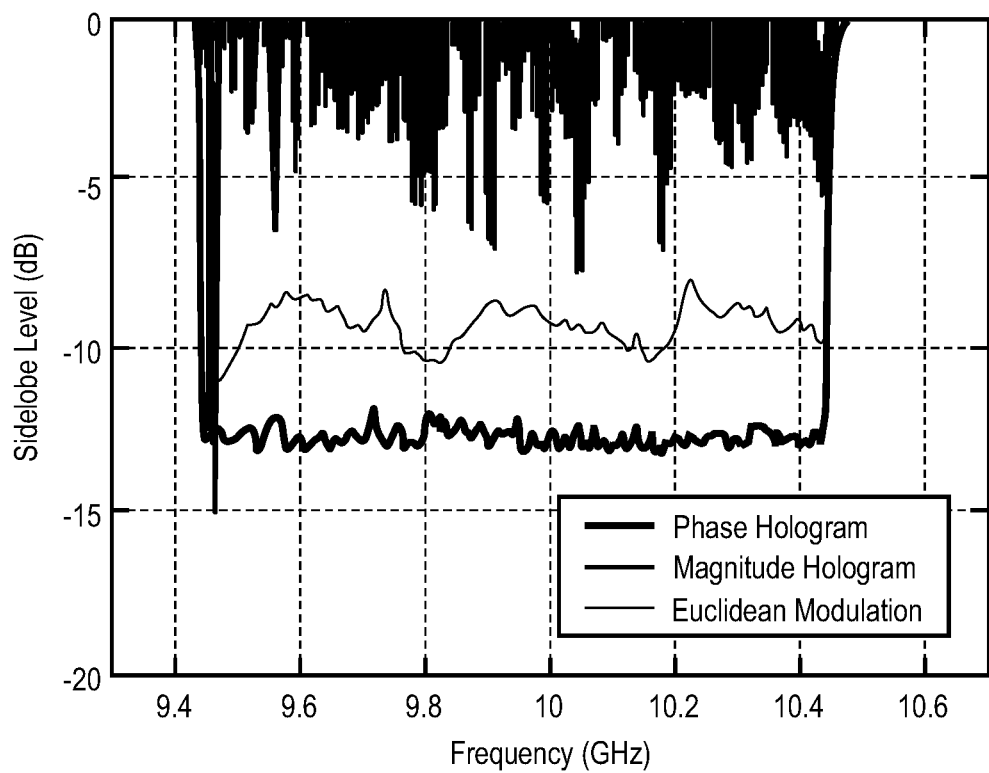
FIG. 7 illustrates beam characteristics for three modulation techniques over a wide bandwidth.

To numerically investigate the broadband performance of the three discussed modulation techniques, the far-field radiation patterns were calculated across a large operational bandwidth. The tunable polarizability for the idealized unit cells used to model the sample metasurface antenna had a tuning range, and therefore operational bandwidth, spanning 1 GHz (9.5-10.5 GHz). To compare the resulting far-field beam patterns, the metrics of directivity and sidelobe level were extracted for each frequency and these results are plotted in FIG. 6 and FIG. 7, respectively. From these plots, it is shown that while the beam width is consistent for the three methods, the side-lobe levels remain lower and more consistent in the case of Euclidean Modulation as compared to the other methods.

Euclidean Modulation Processes

Figure 8:
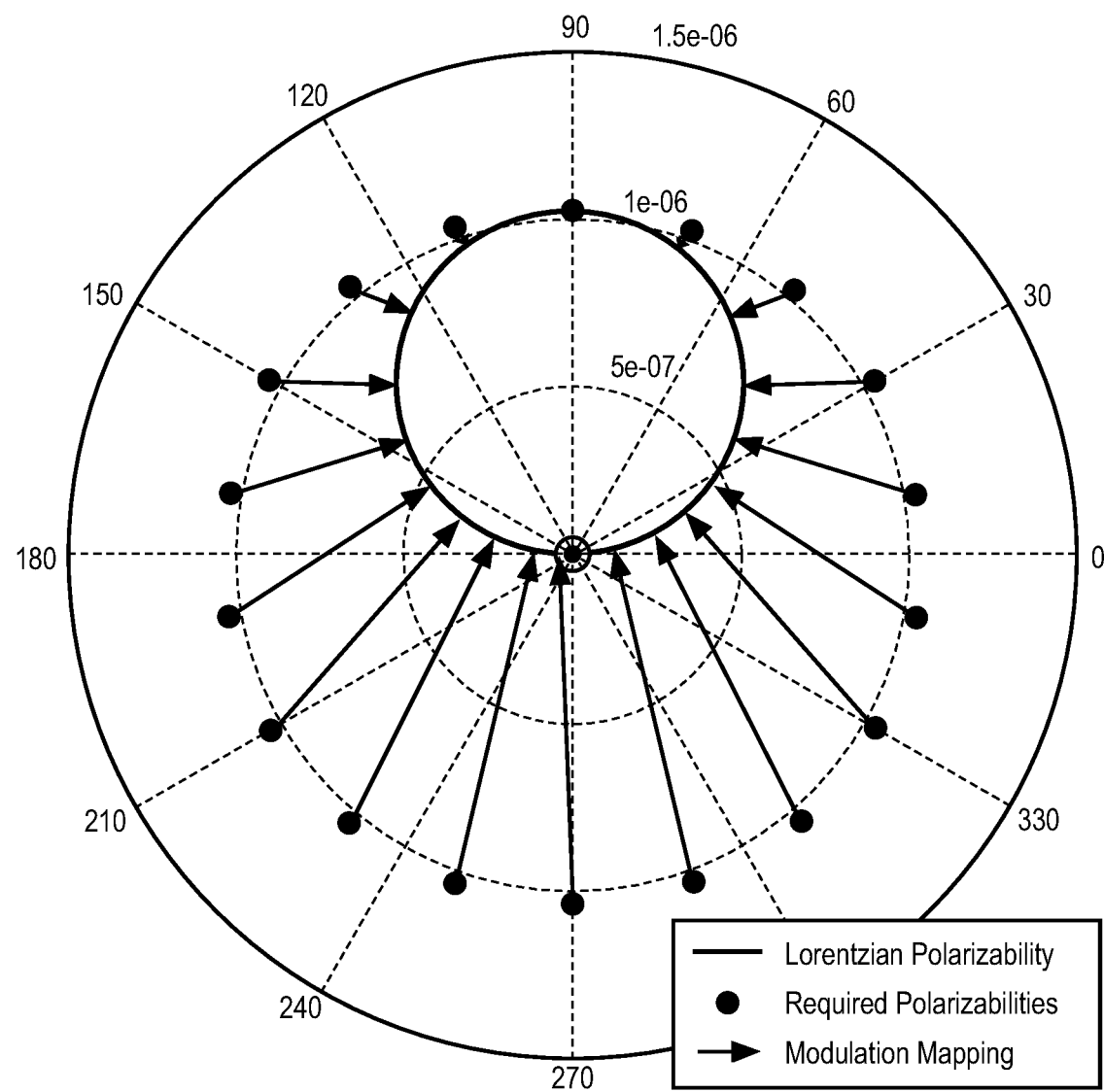
FIG. 8 illustrates an example of the Euclidean modulation pattern in which the ideal/required polarizabilities are approximated by the Lorentzian curve by mapping the desired polarizabilities to the nearest possible points on the curve possible polarizabilities.

As discussed above, in one embodiment, Euclidean modulation uses the set of available polarizabilities to approximate the set of required polarizabilities by minimizing the Euclidean distance between the two. An example of this is illustrated in FIG. 8, where each point on the set of required polarizabilities is mapped to the nearest point on the Lorentzian curve. This mapping is given defined by the resonance frequency $\omega_{0i}$ for the $i^{th}$ metamaterial element located at position $r_i$ such that the distance $$d = |\alpha_L(\omega_{0i}) - \alpha_D(r_i)| \quad (14)$$

is a global minimum.

In one embodiment, minimizing the Euclidean distance between those two points comprises locally minimizing the error between the required polarizability and the actual polarizability delivered by the dipole. This does not guarantee that the modulation pattern chosen by Euclidean modulation is the globally best possible pattern, but it is an optimized pattern in the sense that it is a local maximum of the directivity function.

Figure 9A:
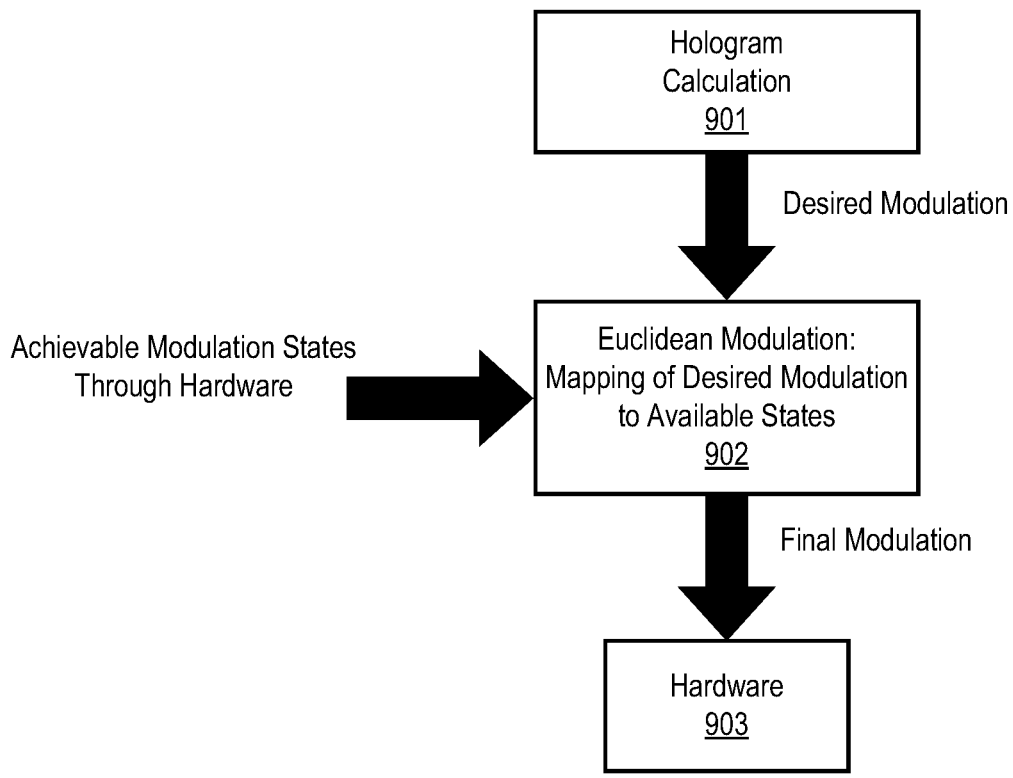
FIGS. 9A-D illustrate an algorithm for determining optimized resonator states using the Euclidean modulation principle.

FIG. 9A is a data flow diagram of one embodiment of a process for controlling an antenna. In one embodiment, the antenna comprises a metasurface antenna having a plurality of surface scattering antenna elements. Example embodiments of such an antenna are discussed in more detail below. The process is performed by processing logic that may comprise hardware, software, firmware, or a combination of the three. In one embodiment, the processing logic is part of a modem of the antenna.

Referring to FIG. 9A, the process begins with processing logic performing a hologram calculation module (processing block 901). In one embodiment, this calculation is performed from equations 6a/b or 7a/b. In one embodiment, the inputs for the hologram calculation include the wave propagation in the feed, the location of the radiating cells, the beam pointing direction and the polarization. The results of the hologram calculation is the desired modulation.

Processing logic compares the desired modulation with the achievable modulation states and uses them to perform a Euclidean modulation module (processing block 902). As discussed herein, the Euclidean modulation module maps the desired modulation to the available, or achievable, states. In one embodiment, the mapping of the desired modulation to the available states includes creating a resonator model, extracting complex impedance values, and then mapping the complex desired modulation values to those impedance values based on Euclidean distance. In one embodiment, the achievable states are calculated using an ideal Lorentzian approximation for the magnetic dipole. In an alternative embodiment, a more realistic model of the resonator is generated.

The result of processing logic performing the Euclidean modulation module is the final modulation. Processing logic provides the final modulation to the antenna hardware to control the antenna to perform beamforming (processing block 903). In one embodiment, performing the beamforming with the antenna hardware using the final modulation includes mapping the final modulation values to control parameters (etc., control voltages to control, for example, the TFTs, diode current if using varactor diodes to control element capacitance, etc.) and controlling RF radiating antenna element unit cells (e.g., surface scattering antenna elements) to achieve the desired beamforming. In one embodiment, a control board receives the modulation values as input and generates outputs that drive the row and column lines of the TFT array.

Figure 9B:
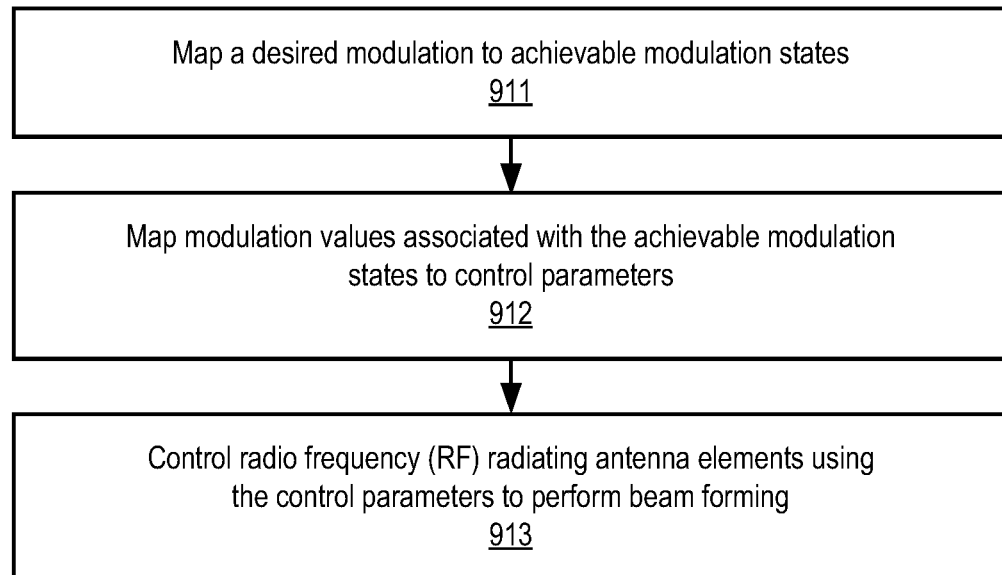

FIG. 9B is a flow diagram of one embodiment of a modulation process for controlling an antenna. The process is performed by processing logic that may comprise hardware, software, firmware, or a combination of the three.

Referring to FIG. 9B, the process begins by mapping a desired modulation to achievable modulation states (processing block 911). In one embodiment, the desired modulation is obtained based on location of at least a subset of the RF radiating antenna elements, beam pointing direction and polarization, as well as the wave propagation in a feed of the antenna.

In one embodiment, the mapping a desired modulation to achievable modulation states is based on Euclidian distance. In one embodiment, the RF radiating antenna elements comprise tunable elements in a metasurface and mapping the desired modulation to achievable modulation states comprises approximating a set of required polarizabilities with a set of the tunable elements in the metasurface.

In one embodiment, mapping the desired modulation to achievable modulation states comprises selecting points out of achievable polarizabilities that approximate required polarizabilities of the desired modulation. In one embodiment, selecting points out of a set of achievable polarizabilities that approximate required polarizabilities of the desired modulation comprises minimizing distance between the required and achievable polarizabilities. In one embodiment, minimizing distance between the required and achievable polarizabilities comprises minimizing a Euclidean norm between the required and achievable polarizabilities.

After mapping a desired modulation to achievable modulation states, processing logic maps modulation values associated with the achievable modulation states to one or more control parameters (processing block 912). In one embodiment, the one or more control parameters comprise a voltage to be applied to each of the RF radiating antenna elements.

Using the control parameters, processing logic controls radio frequency (RF) radiating antenna elements of a metasurface (e.g., a metasurface antenna with surface scattering antenna elements such as described, for example, in more detail below) to perform beam forming (processing block 913).

In one embodiment, Euclidean modulation is implemented for a metamaterial antenna using the following algorithm:
1) Find the range of polarizabilities available for the metamaterial elements, given the tuning range of the elements. In one embodiment, these polarizabilities follow a Lorentzian of the form of equation (8).
2) For each metamaterial element in the waveguide, compute the ideal polarizability. In one embodiment, the ideal polarizability is computed using equations (6a) and (6b).
3) For each element, find the point on the range of available polarizabilities that is the shortest distance in the complex plane from the ideal polarizability.
4) Tune each element so that it operates with the polarizability that was found in step 3.

Figure 9C:
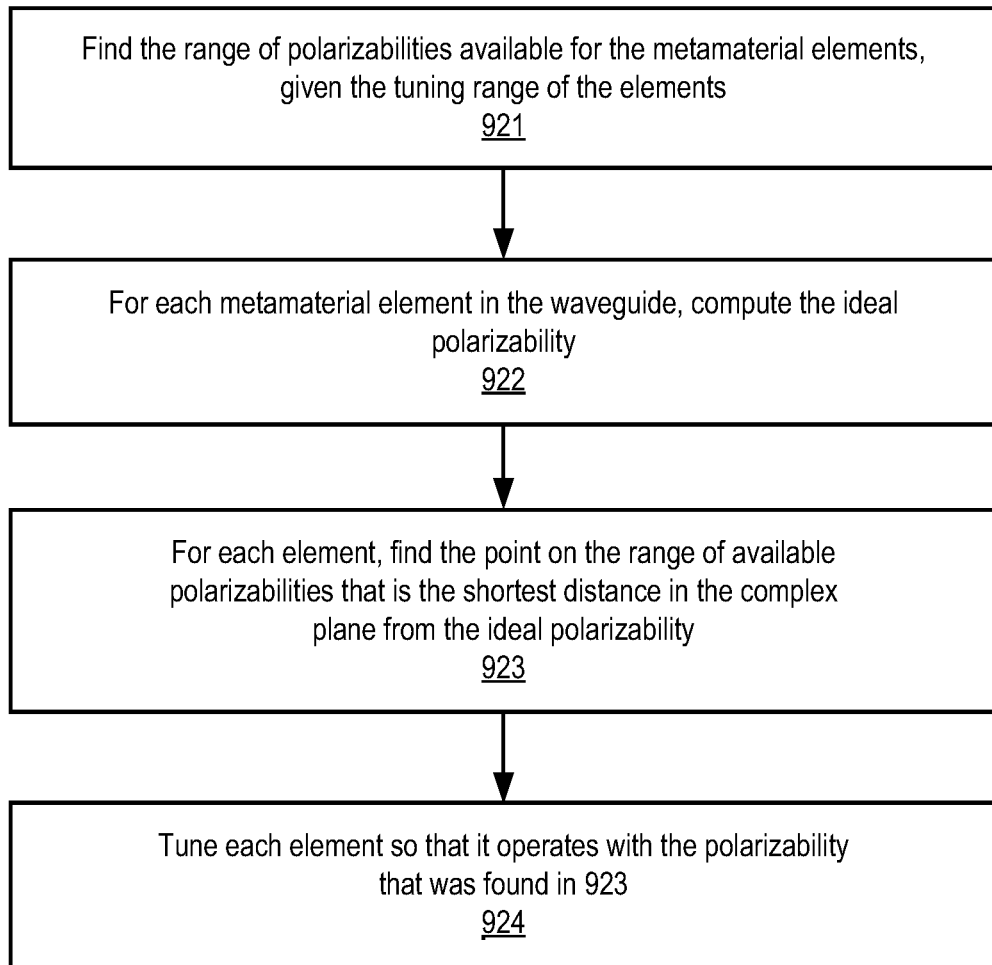

This process is shown in FIG. 9C. In one embodiment, the operations of the process are performed by a control board. In another embodiment, the operations of the process are performed by processing logic and a modem.

Figure 10A:
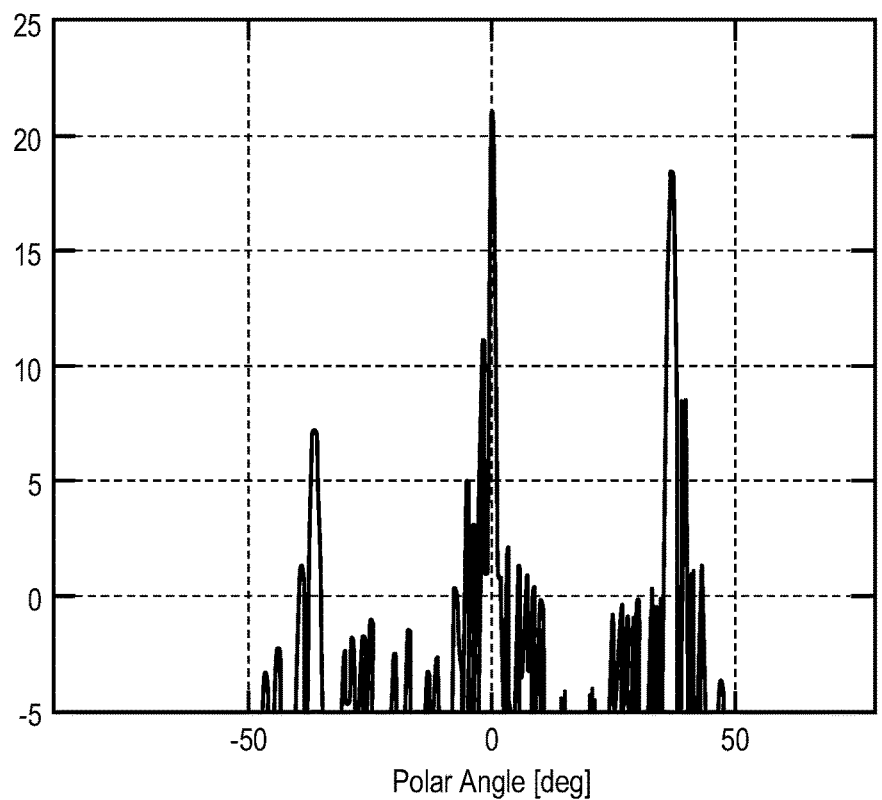
FIG. 10A illustrates binary modulation far-field pattern in the $\phi=0$ plane.
Figure 10B:
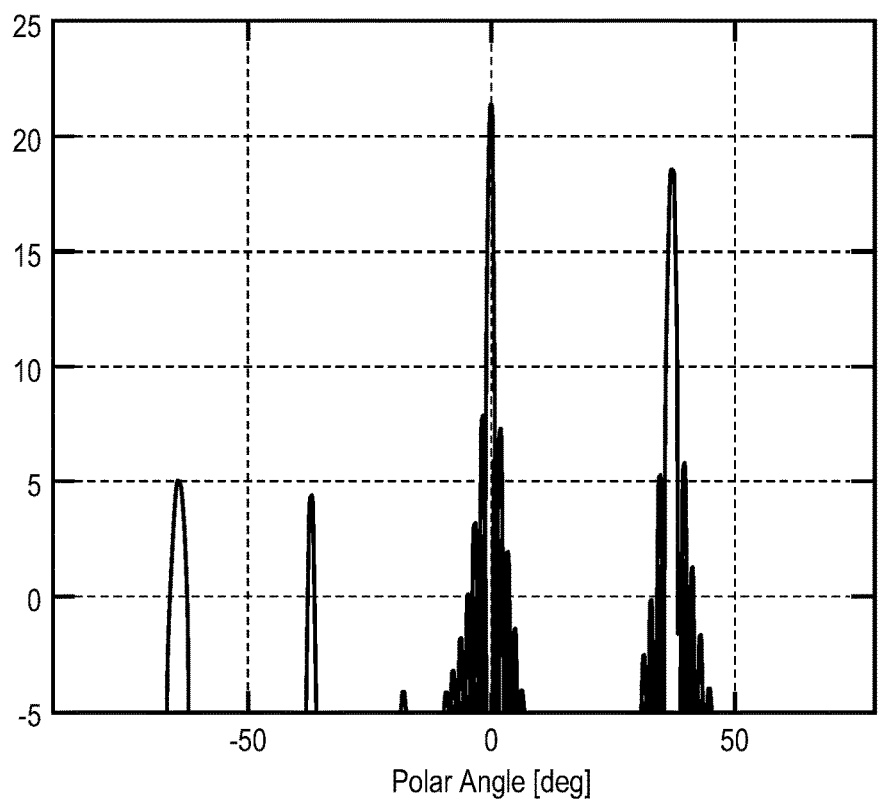
FIG. 10B illustrates greyshade modulation far-field pattern in the $\phi=0$ plane.
Figure 10C:
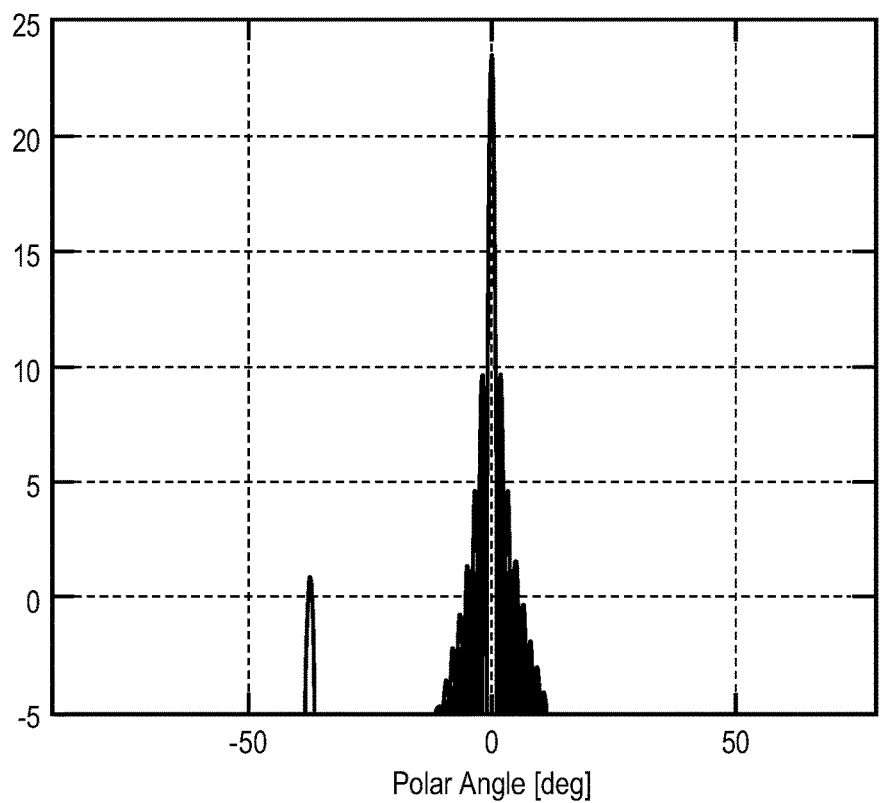
FIG. 10C illustrates Euclidean modulation far-field pattern in the $\phi=0$ plane.

To examine the far-field performance of Euclidean modulation versus binary and greyshade modulation patterns, consider a waveguide that is aligned along the x-axis with 150 complementary metamaterial elements that are placed a distance $\Lambda=\lambda/3.6$ apart from each other, where $\lambda$ is the free space wavelength of light. The incident field is also assumed to be unperturbed by the scattering of the elements in the guide, so that this study only examines the inherent benefits of each of the modulation patterns, without including the aperture taper. The resulting far-field patterns of the three modulation patterns can be found using a standard array factor calculation, and these are illustrated in FIGS. 10A, 10B, and 10C. The Euclidean modulation pattern removes most of the side-lobes that are produced by the greyshade and binary patterns, and also exhibits a slightly higher maximum directivity of the main beam.

In one embodiment, the use of Euclidean modulation maintains an even aperture illumination over a larger bandwidth than greyshade modulation, and therefore it offers superior broadband directivity. When a feed-wave ($E_\mu$, $H_\mu$) travels through a leaky waveguide, the propagation constant of the feed wave $\beta$ is perturbed by the metamaterial elements on the surface of the guide. If the metamaterial elements are spaced uniformly with spacing $\Lambda$ down the guide, and all have the same magnetic polarizability $\alpha(\omega)$, then the effect is that the feed-wave travels as if it were through a homogenous medium with a new propagation constant $$\beta_{\mathit{eff}} = \beta + \frac{\omega Z_\mu}{4\Lambda} H_\mu^2(r_i) \alpha(\omega) \qquad (11)$$

where $H_\mu(r_i)$ is the magnetic field of the mode at the location of the metamaterial elements, and $Z_\mu$ is a normalization constant defined by the Poynting vector of the waveguide mode $$\frac{1}{Z_\mu} = \int (E_\mu \times H_\mu) \cdot da. \qquad (12)$$

If the metamaterial elements are not all the same, but vary by some periodic modulation pattern then the average polarizability can be used in equation (11). Based on equation (11), if the polarizability is mostly imaginary, then the perturbation of the propagation constant will mostly contribute to the absorption of the feed wave. If it is real and negative, which is the case when the system operates above the resonance frequency of the elements, then it will slow down the wave. If it is real and positive, which is the case when the system operates below the resonance frequency of the elements, then it will speed up the wave. Slowing down or speeding up the feed wave can negatively impact the performance of a holographic metamaterial antenna, since the modulation pattern is designed with a particular value for the propagation constant in mind. Comparing FIGS. 10A and 10B, the real part of the average polarizability for greyshade modulation will be negative if the modulation pattern is implemented below resonance, and this will slow down the feed wave. However, since the real part of the average polarizability for Euclidean modulation is zero, Euclidean patterns will not perturb the speed of the feed wave.

Figure 10D:
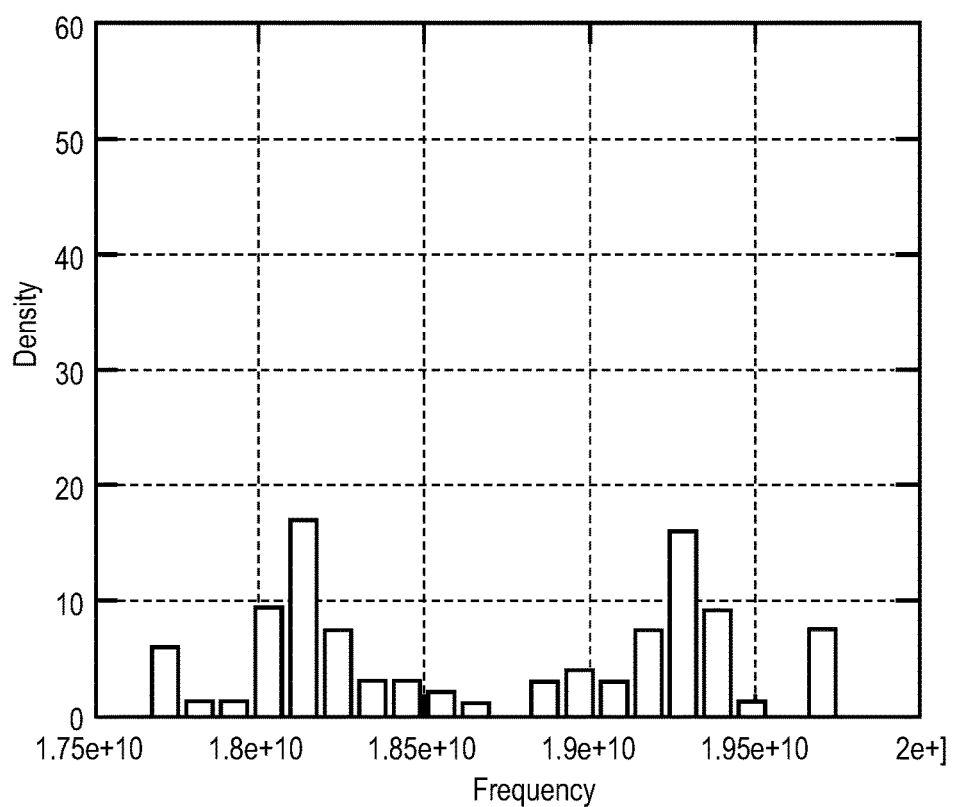
FIG. 10D illustrates Euclidean Modulation Element Density

However, one effect on the propagation constant of the feed wave is the decay due to the imaginary part of the polarizability. To examine the bandwidth of the system, consider an example system with 100 metamaterial elements that is designed to operate at 18.7 GHz. Applying a Euclidean modulation pattern defines a resonance frequency $\omega_{0i}$ for each metamaterial element such that the polarizability of the $i^{th}$ element, $\alpha_i = \alpha(\omega_{0i}, \omega)$, evaluated at the operating frequency $\omega=2\pi f$, is as close as possible to the ideal polarizability. In FIG. 10D, the histogram of the resonance frequencies of all the elements is plotted for the Euclidean modulation pattern, which illustrates the density of elements $\rho(\omega_{0i})$ per unit frequency. Since the elements absorb significantly more when they operate on resonance than they do off resonance, the feed wave will decay much more rapidly when the antenna operates at points in the frequency spectrum when the density of elements with resonance frequency $\omega_{0i} \approx \omega$ than at a point in frequency where there are relatively few elements that are on resonance. There are two points of high density of elements, above and below the operating frequency. These points naturally arise in Euclidean modulation because the lower half plane in FIG. 8 mostly maps to elements that are turned off, which implies tuning them far away from the resonance frequency.

Figure 11A:
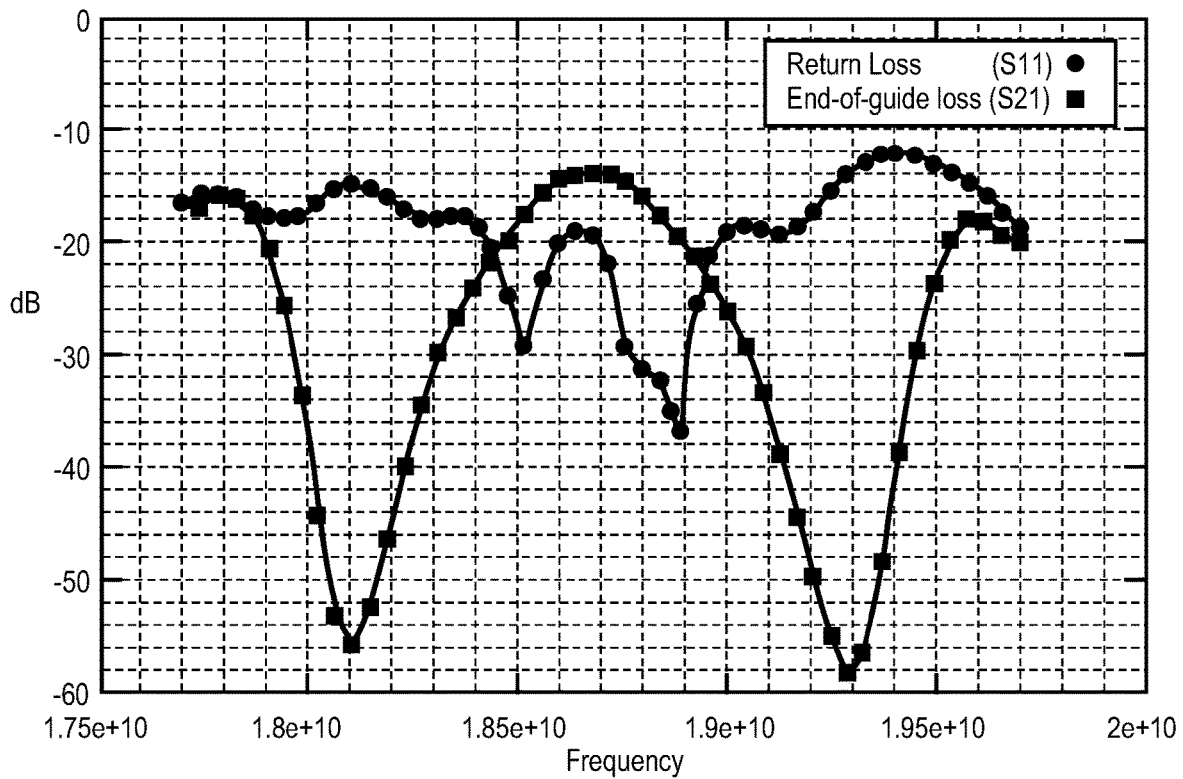
FIG. 11A illustrates return loss and end-of-guide loss.
Figure 11B:
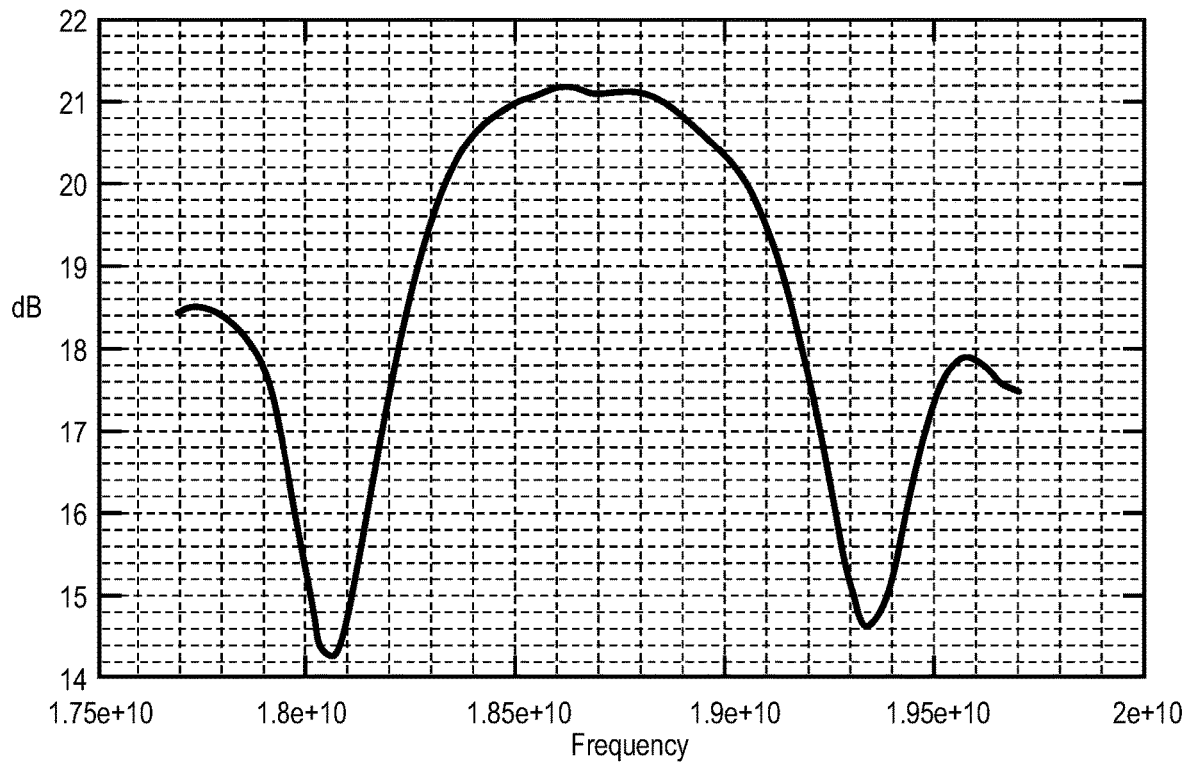
FIG. 11B illustrates maximum directivity over frequency.

Using this density function, $\rho(\omega_{0i})$, that defines the number of metamaterial elements with resonance frequency near some value $\omega_{0i}$, the average polarizability of the lattice of elements can be clearly defined using the equation $$<\alpha(\omega)> = \frac{1}{N}\sum_{i=1}^{N} \rho(\omega_{0i})\alpha(\omega_{0i}, \omega) \qquad (17)$$

where $\alpha(\omega_{0i}, \omega)$ is defined in equation (8). Using this expression for the average polarizability in equation (11), the decay in the feed wave can be effectively evaluated. Once the decay in the feed-wave is known, the directivity of the beam can be computed using a standard array factor calculation, and the end-of-guide loss can be computed using $P_L=|S_{21}|^2$, where $S_{21}=e^{i\beta_{\mathit{eff}}\Lambda(N-1)}$. The directivity and end-of-guide loss are both shown in FIG. 11A, which shows that the antenna has a useable bandwidth of around 500 MHz. When the operating frequency deviates too far from the design frequency, the metamaterial starts to absorb the feed wave more strongly, and hence the end of guide loss drops rapidly, as shown in FIG. 11A with return loss (red) and end-of-guide loss (blue). Unfortunately, even though the end-of-guide loss is decreasing, the directivity is also decreasing because the antenna can no longer sustain an even aperture. FIG. 11B illustrates maximum directivity over frequency. The directivity of the antenna remains high for a large bandwidth centered around the operating frequency.

Figure 11C:
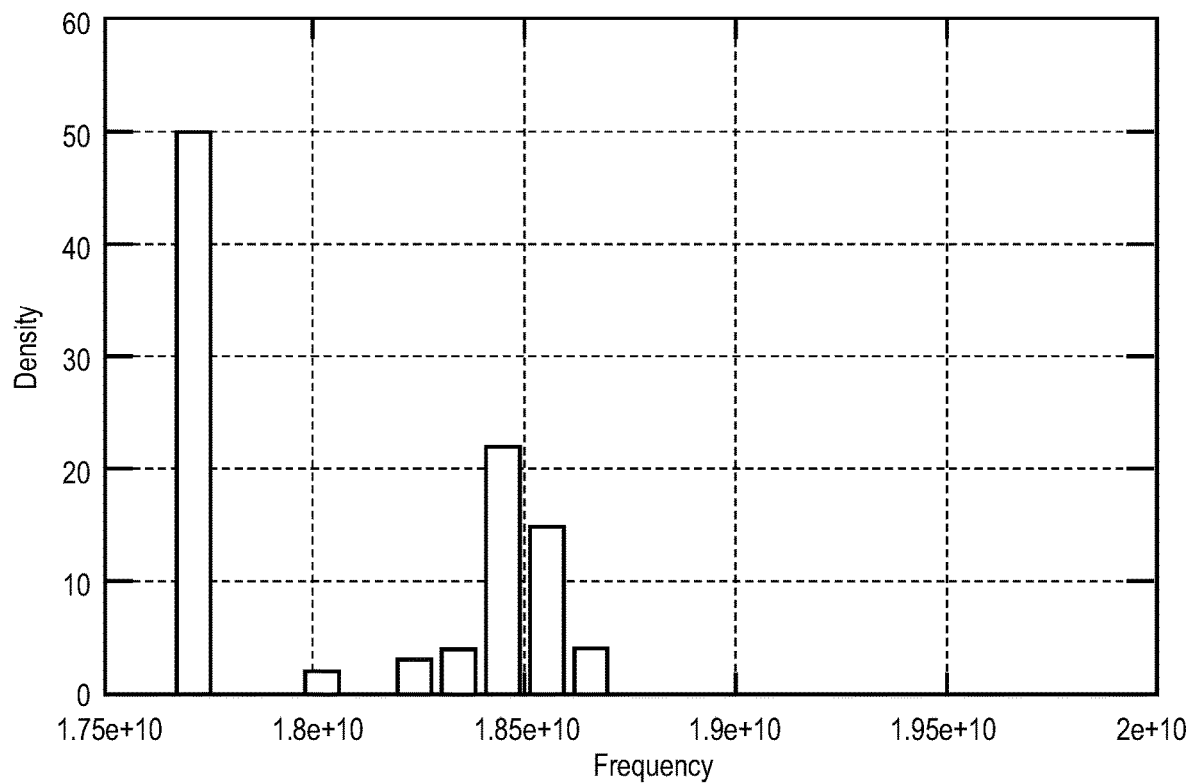
FIG. 11C illustrates a histogram of resonators states for a greyshade modulation scheme.
Figure 11D:
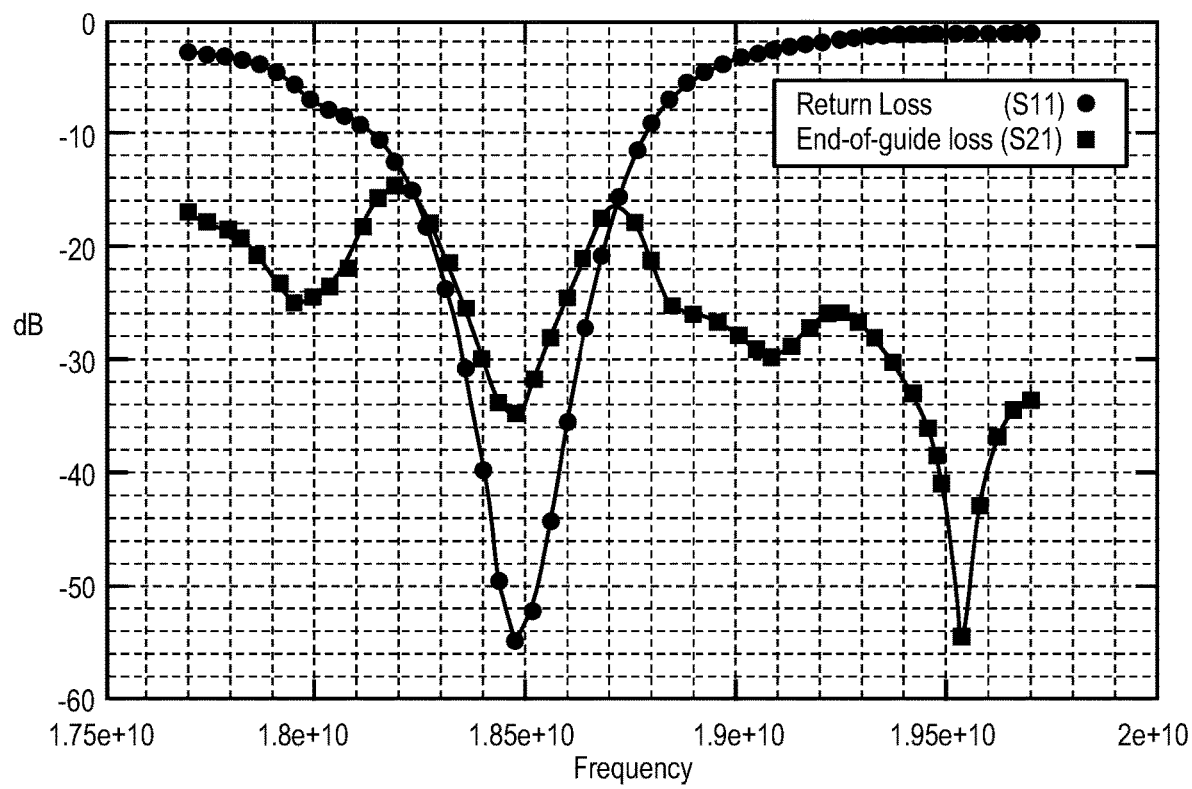
FIG. 11D illustrates return loss and end-of-guide loss.
Figure 11E:
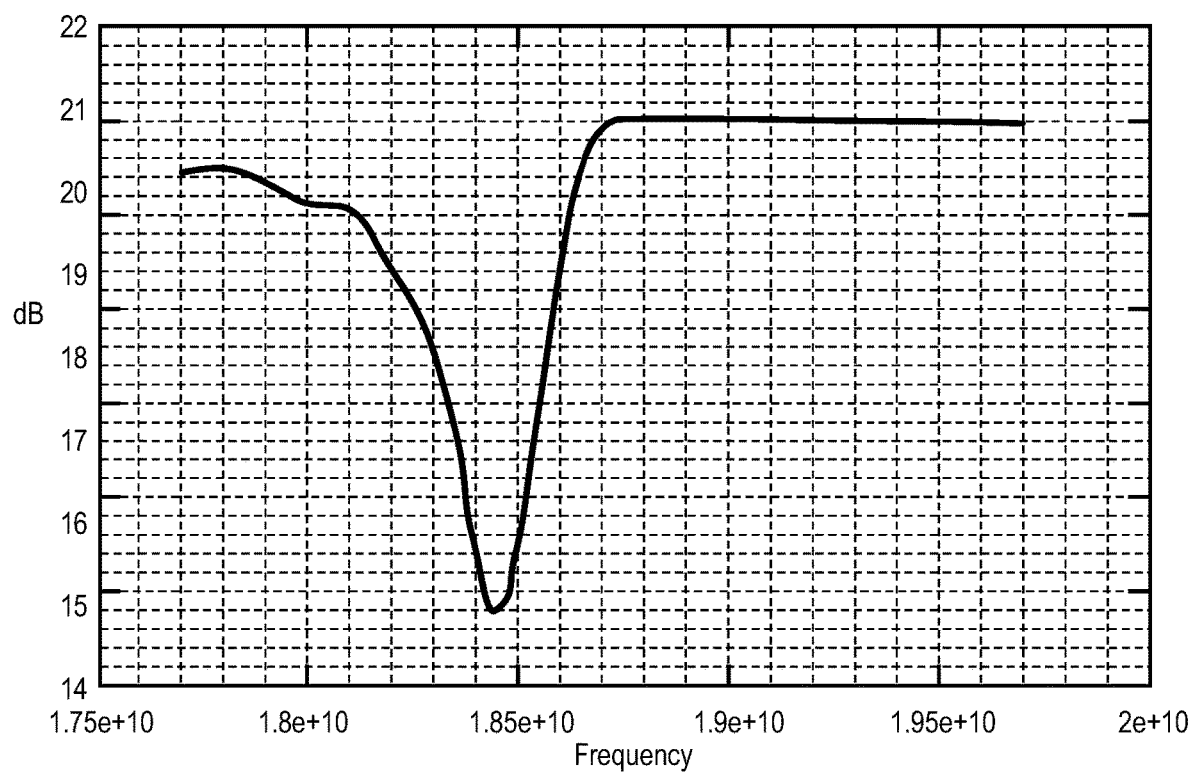
FIG. 11E illustrates maximum directivity over frequency.

In comparison with prior art, a bandwidth of 500 MHz is significantly larger than the bandwidth the system would exhibit under greyshade modulation. In FIG. 11C, the density of metamaterial element resonance frequencies is plotted for this system using greyshade modulation. In this case, all of the resonance frequencies are clumped together in one single hump that is just below the operating frequency. This spot of high density of elements means that the feed wave will decay very rapidly in that region, and so the directivity will suffer, as shown in FIG. 11E. However, if the operating frequency is increased to higher frequencies, then there are no more elements that resonate anywhere near the operating frequency, and the end of guide losses increase as shown in FIG. 11D. Because the resonance frequencies are clumped together in a single localized area in greyshade modulation, the variation in both the end-of-guide losses and the directivity over frequency is much more severe than in Euclidean modulation, and this limits the operating bandwidth of this system to be closer to 150 MHz, as opposed to 500 MHz in the case of Euclidean modulation.

Modulation Pattern Restriction

One of the common problems that plagues holographic metamaterial antennas is the decay of the feed wave. As the feed wave travels down a metamaterial waveguide, the feed wave is scattered by the metamaterial elements. If the elements are spaced a sub-wavelength distance apart, then the feed wave scatters in such a way that it obtains a new, effective propagation constant, which is given in equation (11). Unfortunately, if the metamaterial elements are radiative, then this effective propagation constant is complex, and so the primary effect is that the feed wave decays exponentially, which creates an uneven aperture illumination that destroys the quality of the beam. However, in one embodiment, the polarizability of the metamaterial elements is tuned in such a way that the coupling of the elements increases down the length of the guide, and the increase in coupling compensates for the decay of the feed wave so that the magnitude of the dipole moment of all the metamaterial elements is constant across the surface of the antenna. When the magnitude of the dipole moment of all the elements is the same, then all the elements radiate the same amount, and therefore the aperture is evenly illuminated and equation (2) will be satisfied, yielding a tight beam radiation pattern. Thus, modulation pattern restriction is a specific way to control the average coupling level of the metamaterial elements using the modulation pattern itself.

Required Average Polarizability for Even Aperture Illumination

Figure 12:
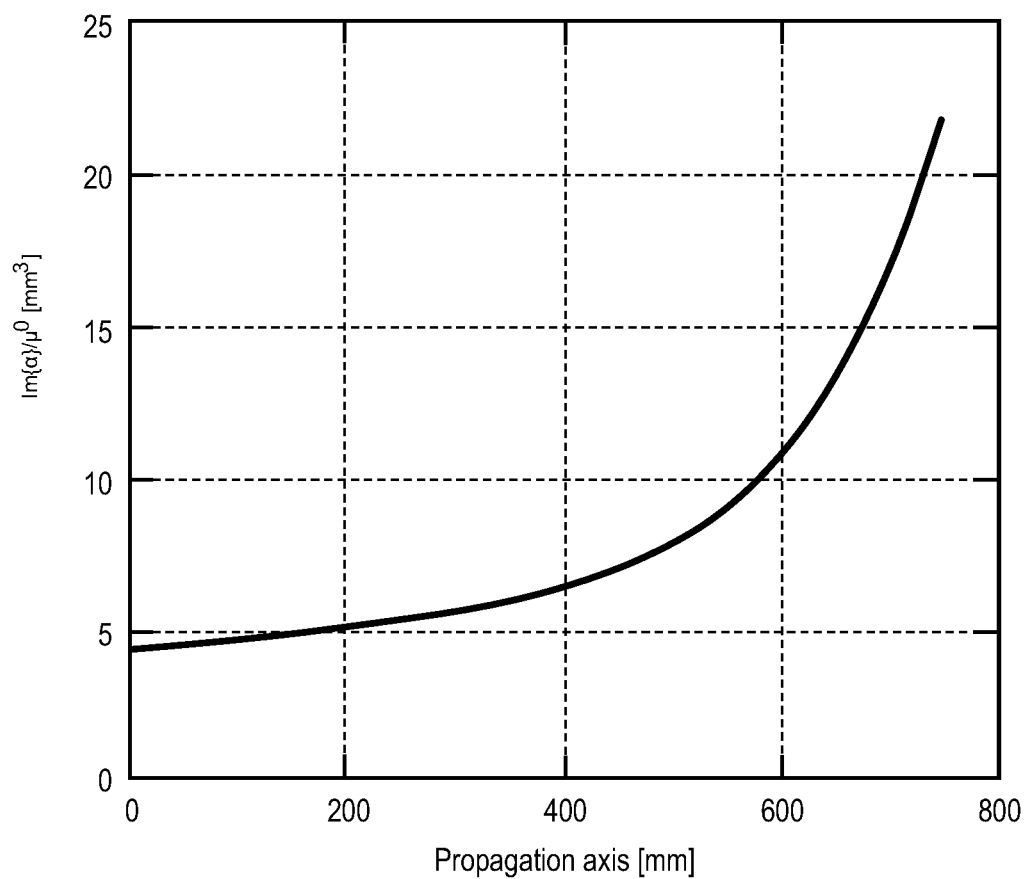
FIG. 12 illustrates a calculation of a required average polarizability down the length of a waveguide in order to obtain an even aperture.
Figure 13A:
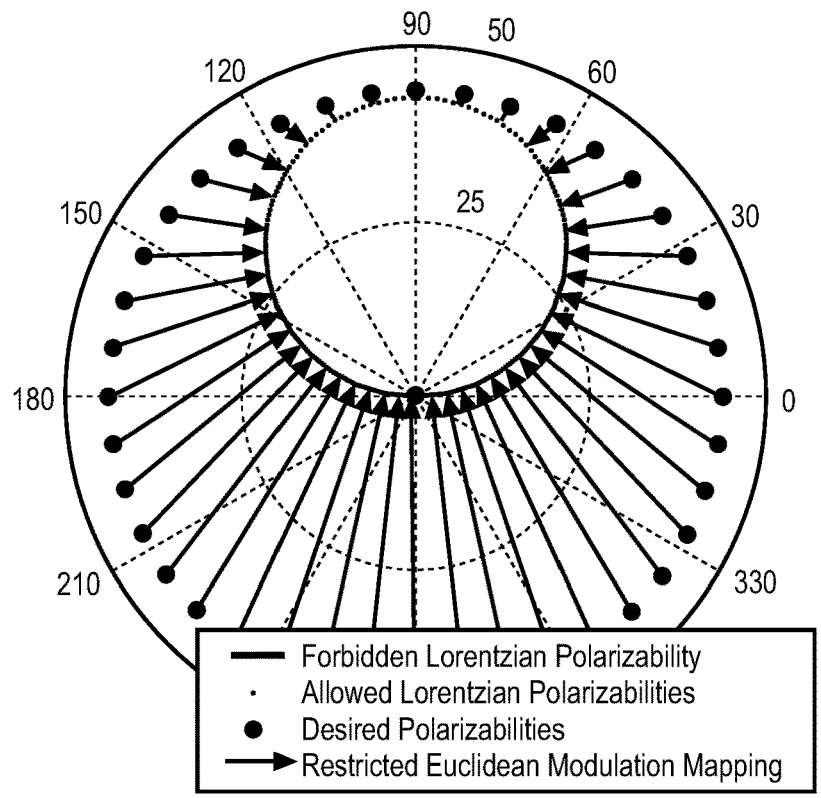
FIGS. 13A-D illustate how Euclidean modulation is altered by restriction.
Figure 13B:
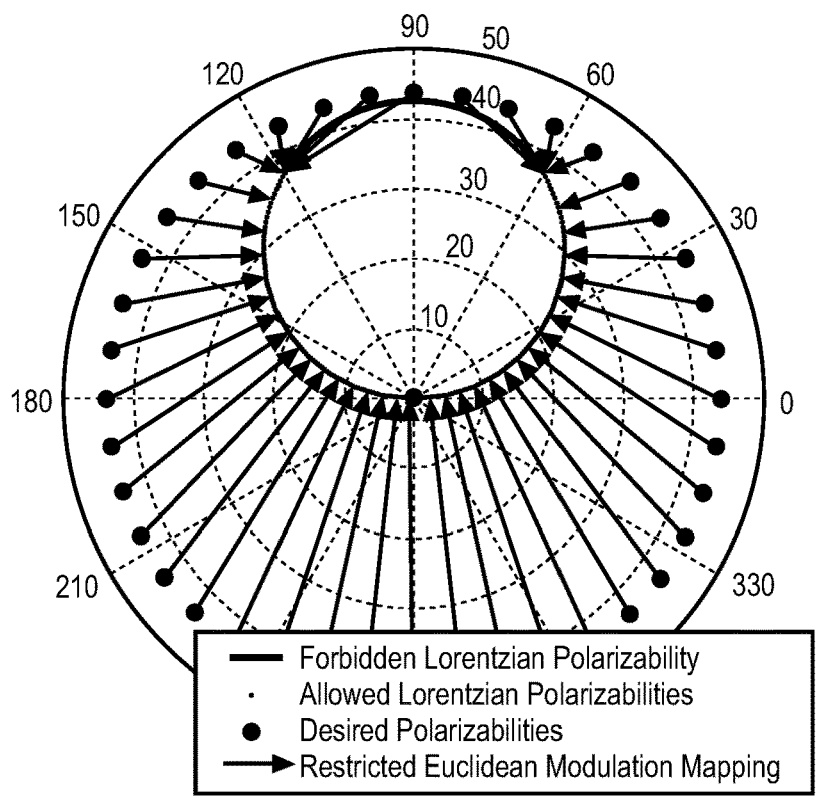
Figure 13C:
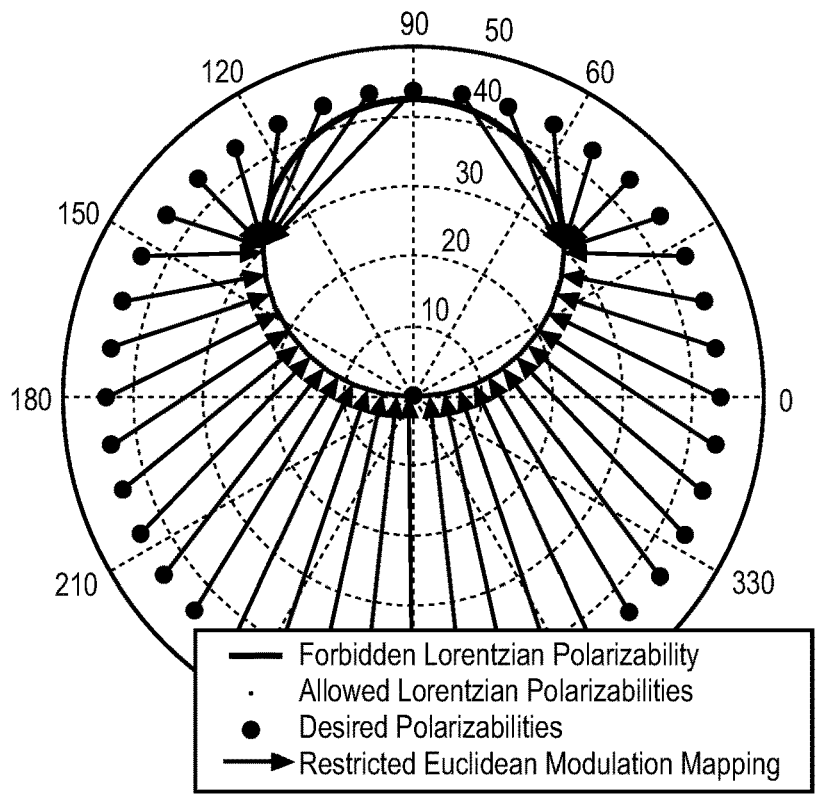
Figure 13D:
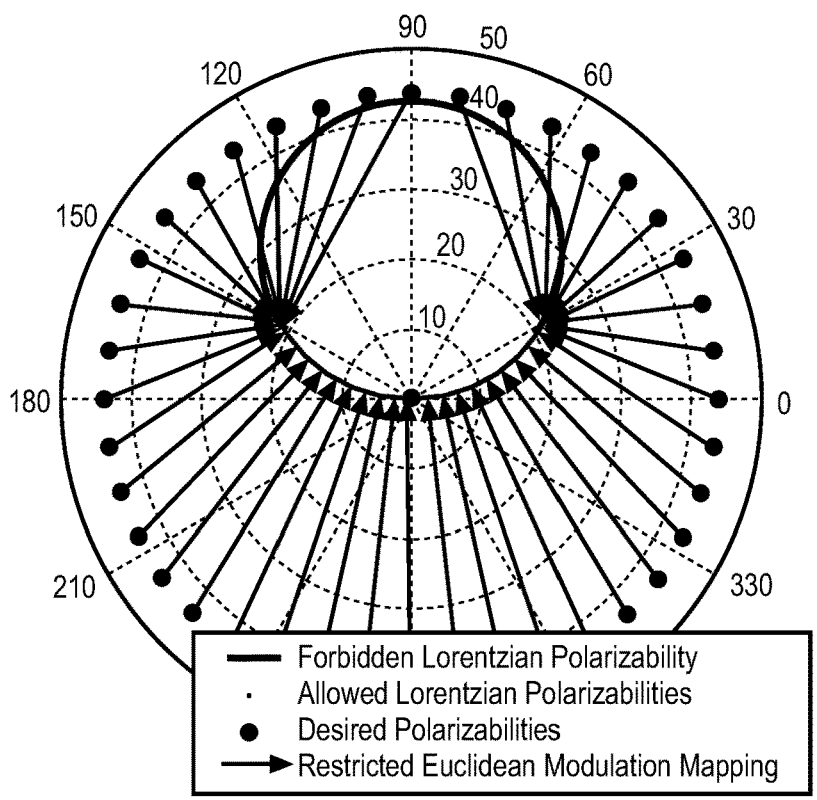

Imagine the simple case where a rectangular waveguide with a width of b and a height of a supports a single propagating mode that is propagating along the z-axis, and all the metamaterial elements have only one orientation: in the $\hat{y}$ direction. If this effective propagation constant is used to compute the required polarizabilities using equations (7a) and (7b), then a transcendental equation for the polarizability is obtained. The required polarization is the solution to the equation, $$\alpha_i = \frac{i\mu_0 \Lambda^2 Z_{ant}}{k Z_0} e^{i(k-\beta)y_i} e^{iC<\alpha(z)>kz_i} \text{ where } C = \frac{cZ_\mu}{4\Lambda} H_\mu^2 |_{z=h} \quad (13)$$

describes the coupling of the metamaterial elements to the waveguide mode, and the angle brackets denote local averaging. If the waveguide is rectangular with width b and height a, then $C=\sqrt{1-(\pi/ka)^2}/(2ab\Lambda\mu_0)$. The required average polarizability can be computed from this equation by taking the local average of both sides of the equation. The local average may be defined using a slowly varying envelope approximation, such that $\alpha_i \equiv \alpha(z_i) \approx \langle \alpha(z) \rangle e^{i(k-\beta)z_i}$. This approximation is valid as long as the distance between the elements, $\Lambda$, is much less than the periodicity of the modulation pattern, which is defined by the factor $e^{i(k-\beta)y_i}$. The period of the modulation pattern is $L=2\pi/|k-\beta|$, and so this approximation is valid when $\Lambda<<2\pi/|k-\beta|$. Using this definition of the local average, the average polarizability is given by $$(-ik/\Lambda^2\mu_0)\langle \alpha(z) \rangle + (Z_{ant}/Z_0)e^{-iC\langle \alpha(z) \rangle kz} = 0 \quad (14)$$

which yields a transcendental equation that can be numerically solved for $<\alpha(z)>$. Equation (14) gives a solution for how the average polarizability is to vary along the length of the waveguide in order to compensate for the decay of the feed wave. Therefore, solving this transcendental equation yields a completely self-consistent solution and not a perturbative solution, in the sense that it takes into account the new decay of the feed wave as the coupling level is modified. The solution of equation (14) is a purely imaginary average polarizability, which is guaranteed to be the case if the modulation pattern is Euclidean. The required imaginary part is plotted in FIG. 12 for a rectangular waveguide with 100 metamaterial elements, and parameters a=13.5 mm, b=27 mm, w=$2\pi 10^9$ rad/s, $Z_{ant}/Z_0$=0.065, and $\Lambda=\lambda/8$. The coupling starts low at some level, and then increases with a very specific curve in order to guarantee an even aperture distribution.

Controlling the Average Coupling Level Using Restricted Modulation Patterns

In order to obtain an even aperture and good beam performance, the average coupling level of the metamaterial elements is controlled. In one embodiment, the average coupling level is controlled by choosing a new map between the ideal polarizabilities and the range of possible polarizabilities that excludes any polarizability out of the range of possible polarizabilities that has an imaginary part that is greater than a certain level. Removing a certain portion of the range of possible polarizabilities on the Lorentzian curve is called restriction. Once the set of possible polarizabilities is restricted to remove any polarizabilities with an imaginary part greater than a certain level, a Euclidean modulation scheme may be applied to find the polarizability out of the remaining possible polarizabilities that is nearest in the complex plane to the required polarizability. Restricting the modulation pattern in this way introduces some additional error in the modulation pattern, since some phases that are achievable will be excluded. However, this phase error is usually very small in comparison with the benefits gained by obtaining an even aperture distribution. FIGS. 13A-D illustate altering Euclidean modulation by restriction. In one embodiment, the pattern is restricted to only utilize region 2101 of the Lorentzian curve to points where (a) $\bar{\alpha}_{max}=\alpha_{max}$, (b) $\bar{\alpha}_{max}=(3/4)\alpha_{max}$, (c) $\bar{\alpha}_{max}=(1/2)\alpha_{max}$, (d) $\bar{\alpha}_{max}=(1/4)\alpha_{max}$.

In one embodiment, in order to know what maximum imaginary polarizability should be allowed by the modulation pattern in order to obtain a particular average polarizability, the average of the imaginary part of the polarizability is computed for a Euclidean modulation pattern. For convenience, the following is defined $$\alpha_{max} = \max_{\omega_0}(\text{Im}\{\alpha_L\}) \quad (15)$$

to be the maximum imaginary polarizability possible for some particular metamaterial element, and $\bar{a}_{max}$ to be the chosen maximum allowed imaginary polarizability for the modulation pattern to choose. If the Euclidean modulation pattern is restricted such that only points with the imaginary part of the polarizability less than a certain value are allowed, then the average imaginary part of the polarizability of the pattern decreases. This effect is illustrated in FIGS.

13A-D, where, for each point of desired polarizability, the nearest point on the Lorentzian polarizability curve is found that has an imaginary part of the polarizability that is less than some value.

In FIGS. 13A-D, the effective impedance of the antenna for the modulation pattern is $Z_{ant}=0.65Z_0$, and the amplitude (or effective size) of the dipoles is set at $A=0.2$ mm$^3$. Choosing these values for the size of the dipoles and the impedance of the antenna fixes the maximum of the magnitude of the available polarizability equal to the magnitude of the required polarizability, which minimizes the phase error and best approximates the curve of required polarizabilities with the curve of available polarizabilities. Note that this value for $Z_{ant}$ that is used to find the modulation pattern is different from the value of $Z_{ant}$ that is used to find the curve of needed average imaginary polarizability to obtain an even aperture. This is ultimately because the average magnitude of the polarizability will be much smaller after the modulation pattern is applied than the ideal polarizability, because roughly half of the elements will end up with a polarizability that is near zero. FIGS. 13A-D shows that reducing the maximum allowed imaginary polarizability results in an average polarizability of $\langle \text{Im}\{\alpha\}\rangle/\mu_0=15.9$ in FIG. 13A, $\langle \text{Im}\{\alpha\}\rangle/\mu_0=14.6$ mm$^3$ in FIG. 13B, $\langle \text{Im}\{\alpha\}\rangle/\mu_0=11.8$ mm$^3$ in FIG. 13C, and $\langle \text{Im}\{\alpha\}\rangle/\mu_0=7.2$ mm$^3$ in FIG. 13D.

Figure 14:
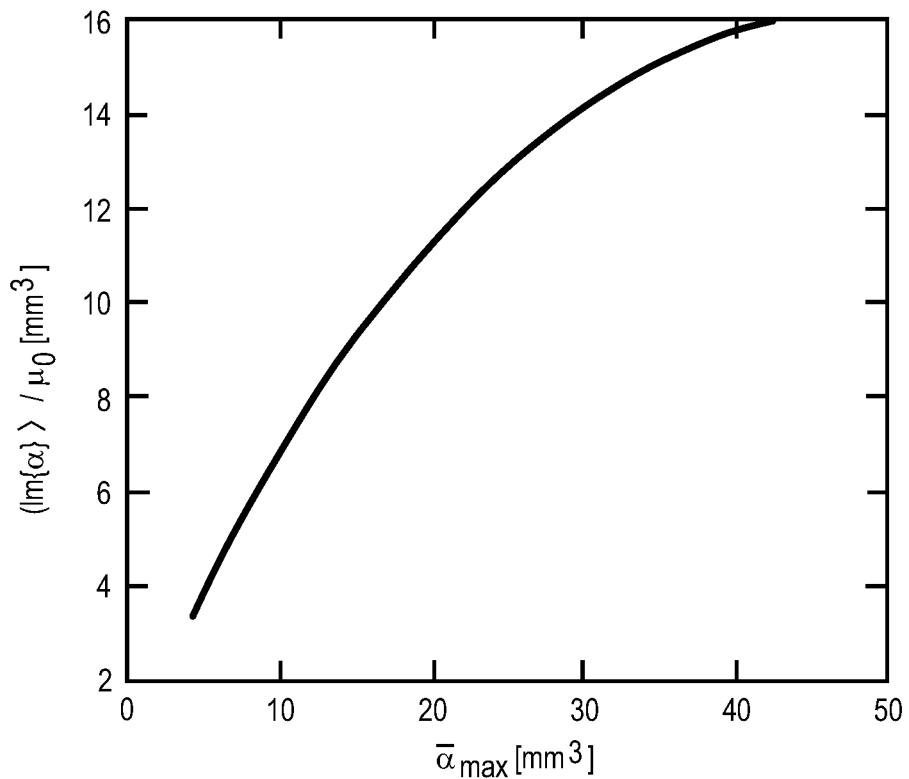
FIG. 14 illustrates calculation of the imaginary part of the average polarizability $\langle \text{Im}\{\alpha\}\rangle$ as a function of the maximum allowed imaginary polarizability $\bar{\alpha}_{max}$ for a restricted euclidean modulation pattern applied to metamaterial elements with A=0.2 mm$^3$.
Figure 15:
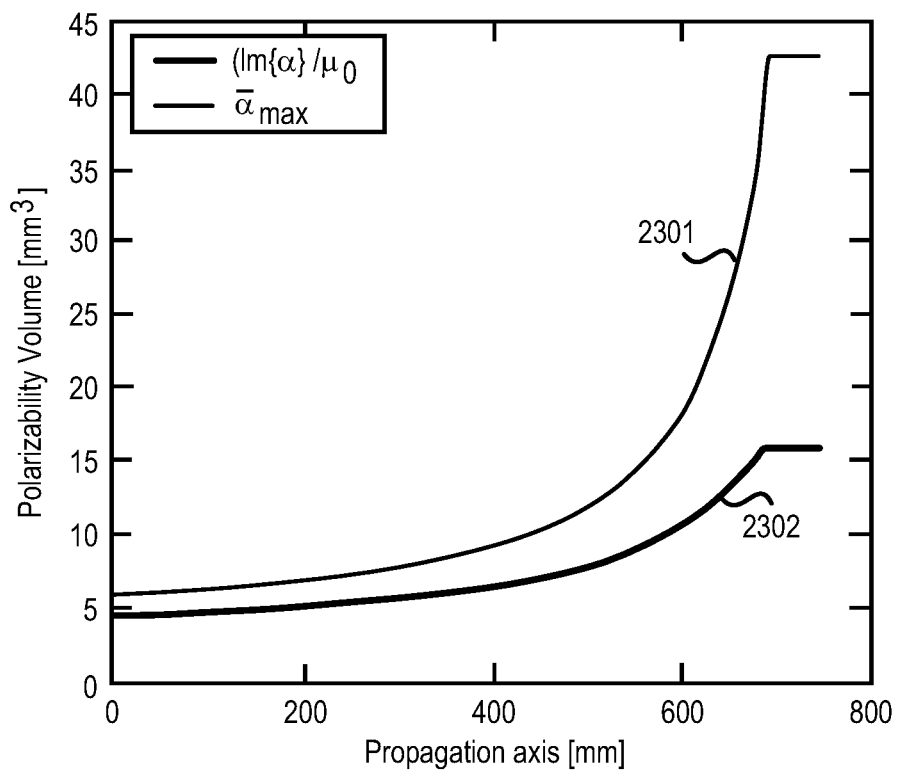
FIG. 15 illustrates a plot of the required restriction, $\bar{\alpha}_{max}$ (curve 2301), which is required to obtain a particular average imaginary polarizability, $\langle \text{Im}\{\alpha\}\rangle$ (curve 2302), that will result in an even aperture.

Based on this method of restriction, the average imaginary part of the polarizability of the modulation pattern can be computed as a continuous function of the maximum allowed imaginary polarizability, which is shown in FIG. 14. Referring to FIG. 14, a calculation of the imaginary part of the average polarizability $\langle \text{Im}\{\alpha\}\rangle$ is calculated as a function of the maximum allowed imaginary polarizability $\overline{\alpha}_{max}$ for a restricted Euclidean modulation pattern applied to metamaterial elements with $A=0.2$ mm$^3$. Once the function is known, it may be inverted to find $\overline{\alpha}_{max}$ in terms of $(\text{Im}\{\alpha\})$, which may be used together with the results of solving equation (14) to solve for the level of restriction of the modulation pattern, i.e., $\overline{\alpha}_{max}$, that should be applied to each metamaterial element down the length of the waveguide to obtain an even aperture. FIG. 15 illustrates a plot of the required restriction, $\overline{\alpha}_{max}$, which is required to obtain a particular average imaginary polarizability, $(\text{Im}\{\alpha\})$, that will result in an even aperture for the waveguide described in FIG. 12.

At some point, as more and more of the feed wave decays and the coupling level increases, the coupling of the metamaterial elements reaches the maximum amount available (i.e., there is no restriction of the pattern) and so the available coupling is not able to keep up with the needed coupling level to obtain an even aperture. At this point, we simply choose to maintain the maximum coupling level all the way to the end of the guide.

Based on the above description, in one embodiment, the following algorithm implements restricted Euclidean modulation.

1) For each metamaterial element in the waveguide, compute the ideal polarizability. In one embodiment, the ideal polarizability is given by equations (6a) and (6b).
2) Find the required average polarizability distribution required in order to obtain an even aperture for the metamaterial elements. In one embodiment, this is performed by numerically solving equation (14).
3) Find the range of polarizabilities available for the metamaterial elements, given the tuning range of the elements. In one embodiment, these polarizabilities follow a Lorentzian of the form of equation (8).
4) Find the average imaginary polarizability as a function of the maximum allowed imaginary polarizability. In one embodiment, the average imaginary polarizability is set forth in equation 15, and is found using the range of available polarizabilities found in step 3.
5) For each metamaterial element, find the maximum allowed imaginary polarizability that is required in order to obtain an even aperture. In one embodiment, this is found by inverting the relationship found in step 4.
6) For each element, remove from its range of available polarizabilities any points that have a larger imaginary polarizability than the maximum allowed imaginary polarizability that was prescribed by step 5. After those points are excluded, this set will be defined as the new set of available polarizabilities for the element.
7) For each element, find the point on the new range of available polarizabilities, which was given by step 6, that is the shortest distance in the complex plane from the ideal polarizability found in step 1.
8) Tune each element so that it operates with the polarizability that was found in step 7.

Figure 9D:
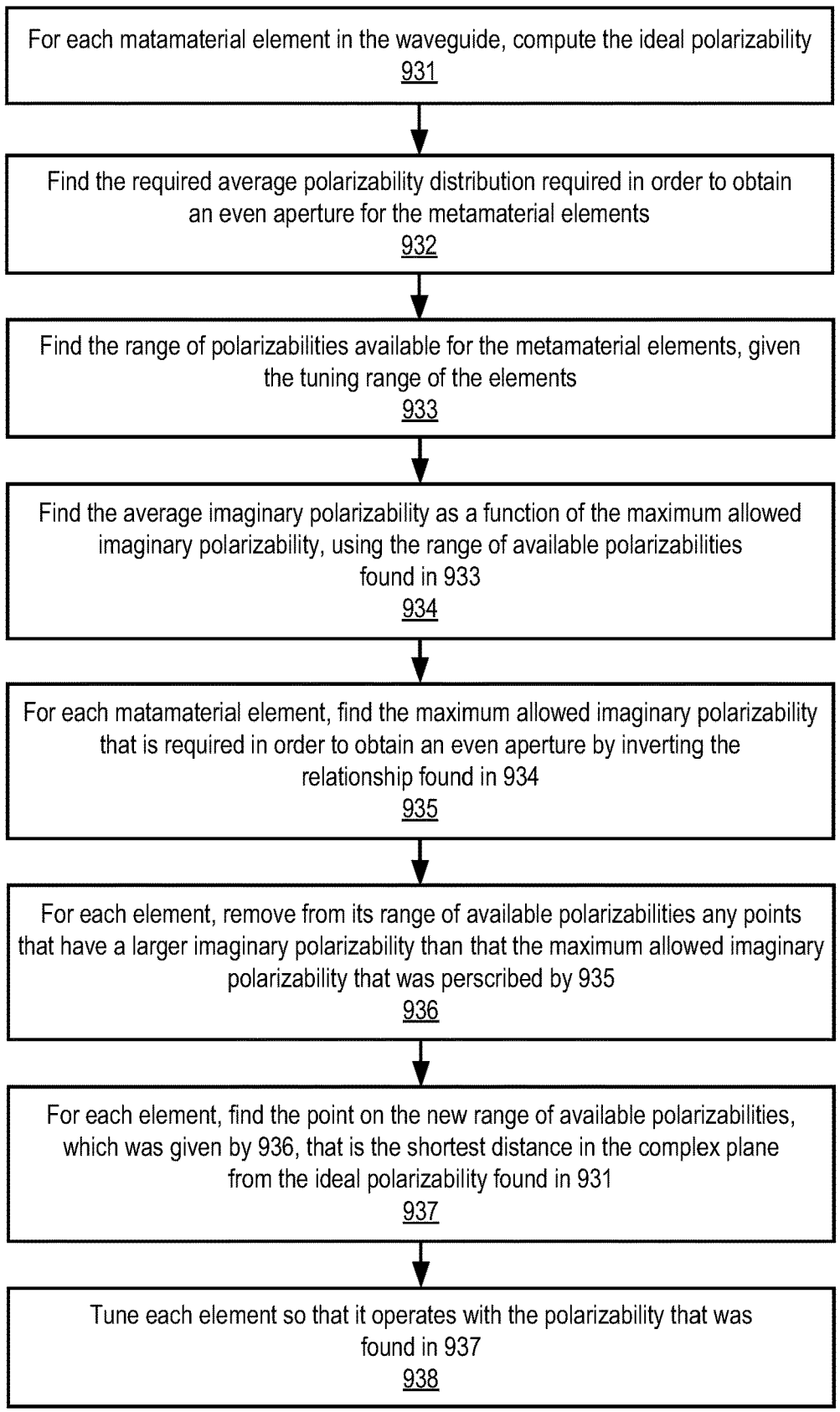

This above process is shown in FIG. 9D. In one embodiment, the operations of the process are performed by a logic circuit such as a processor, microcontroller or an FPGA.

In one embodiment, the restricted Euclidean modulation creates an even aperture excitation. As was mentioned above, restricting the pattern in this manner does introduce some small phase error relative to unrestricted Euclidean modulation, but this phase error is generally less costly than the benefits of obtaining an even aperture distribution. These effects are shown in the far-field patterns. In order to accurately test the restriction method of obtaining an even aperture, this antenna is modeled using the Discrete Dipole Approximation (DDA) that does not use effective medium averaging, but instead takes into account the complete scattering of all the elements into the waveguide in a self-consistent manner. For more information on DDA, see M. Johnson, et al, "Discrete-dipole approximation model for control and optimization of a holographic metamaterial antenna," *Appl. Opt.*, vol. 53, pp. 5791-5799, September 2014.

Figure 18A:
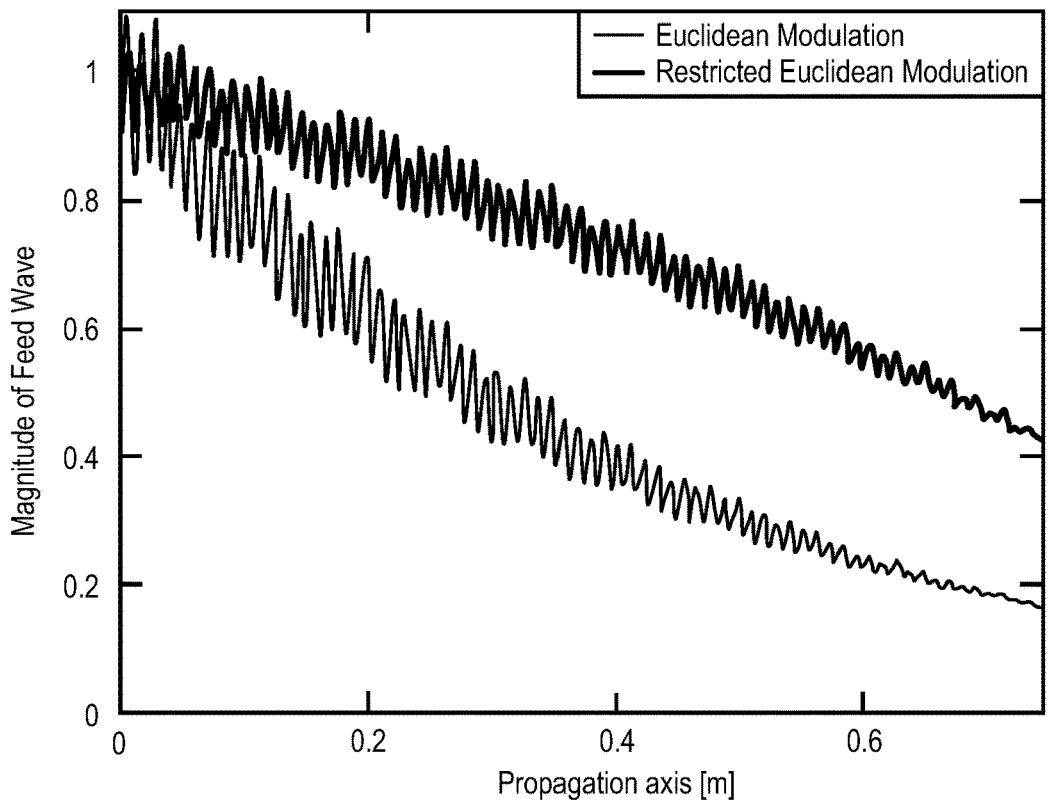
FIGS. 18A-C illustrate (a) the feed wave decay, (b) the magnitude of the polarizability of each metamaterial element, and (c) the dipole moment of each metamaterial element in the waveguide under restricted and unrestricted Euclidean modulation.

The final decay of the feed waves from modeling the antenna using the DDA under restricted and unrestricted Euclidean modulation are shown in FIG. 18A. The standard Euclidean modulation has the expected exponential feed wave decay, while restricted Euclidean has a decay profile that looks much more linear. The decay of the feed wave in the restricted Euclidean pattern is in fact a multiple-exponential decay that begins with a very slow decay rate, but increases its decay rate as it moves farther down the guide.

Figure 18B:
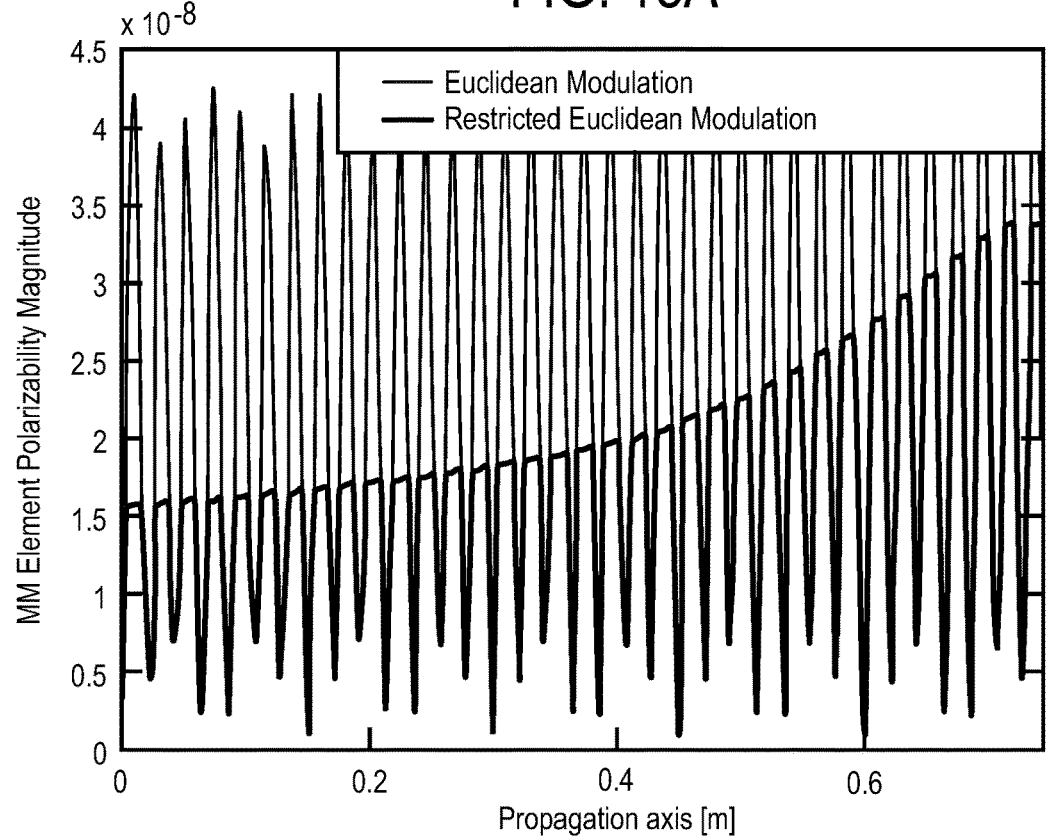

In FIG. 18B, the polarizabilities of all the metamaterial elements down the length of the waveguide are plotted for both restricted and unrestricted Euclidean modulation. The pattern oscillates rapidly, as expected, for both patterns. However, under the restricted modulation, the average coupling level of the elements increases rapidly towards the end of the waveguide, while it stays constant for unrestricted Euclidean modulation.

Figure 18C:
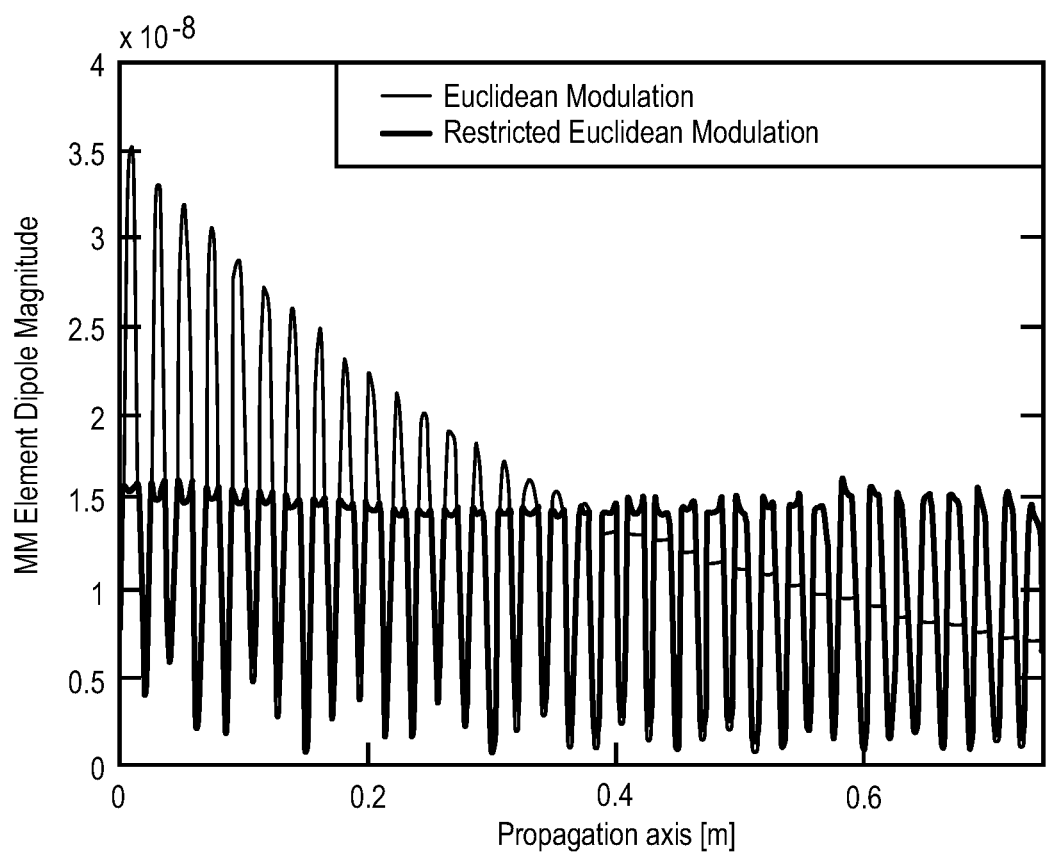

When the polarizability is multiplied by the feed wave amplitude, the result is the magnitude of the dipole moments, or excitation level, of each of the metamaterial elements. This is plotted in FIG. 18A, which is the product of FIG. 18B and FIG. 18C. Creating an aperture with cells where the average magnetic dipole moment is a constant is referred to as an even aperture, which is required by Schelkunoff's equivalence principle in equation (3) to create an ideal beam pattern.

Figure 16:
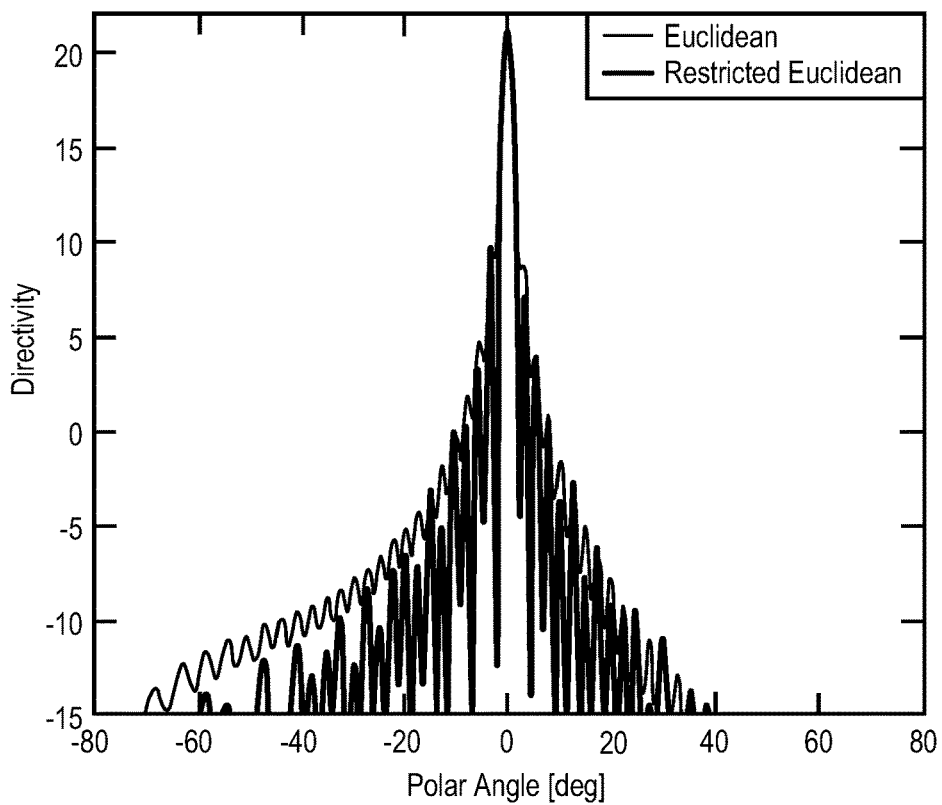
FIG. 16 illustrates far-field pattern of a waveguide with an effective index of $n_{wg}=1.15$, under both restricted and unrestricted Euclidean modulation, when the maximum directivity of the restricted Euclidean beam is 21.2 dBi, and the maximum directivity of the unrestricted Euclidean beam is 20.2 dBi.

The far-field patterns of the restricted and unrestricted Euclidean modulation schemes are compared in FIG. 16, using the results of the DDA analysis. Restricted Euclidean modulation results in a higher and narrower main beam with more directivity than unrestricted Euclidean modulation, which is due to the evenness of the aperture.

Figure 17:
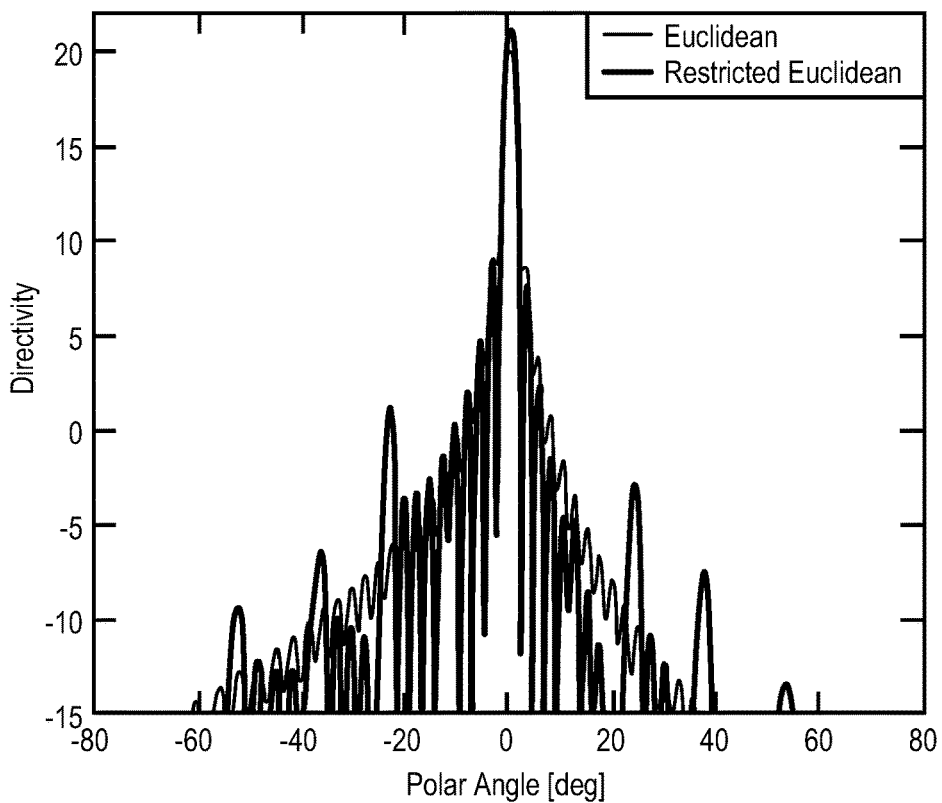
FIG. 17 shows the analysis applied to the same antenna, but modified so that $n_{wg}=1.4$.

In comparison, FIG. 17 shows the analysis applied to the same antenna, but with the effective index of the waveguide modified. In this case, several large side lobes appear in the restricted Euclidean pattern.

Note that the examples above are discussed in conjunction with linear waveguide antennas. The techniques described above are applicable to other types of antennas (e.g., cylindrically fed antennas). One or more examples of such waveguides that may be used are disclosed below. Note that for different antennas, the formulas above may need to be adjusted to use the propagation constant $\beta$ of the particular waveguide and may be changed to reflect the correct mode.

Bandwidth Adjustable Euclidean Modulation

In one embodiment, the Euclidean modulation that is used to select the modulation for use with the satellite antennas in a satellite communication system comprises bandwidth adjustable Euclidean modulation. In one embodiment, the bandwidth adjustable Euclidean modulation techniques described herein include performing a trade-off between gain and instantaneous bandwidth (IBW). That is, embodiments described herein include performing Euclidean modulation in a manner that makes a trade-off of gain for improved IBW. In one embodiment, the Euclidean modulation process makes adjustments to obtain improvements in IBW only in the software as opposed to relying on hardware modifications such as feed changes or scattering element changes. This helps enable the techniques described herein to be useful in various applications, such as for example, but not limited to: (1) adjustable IBW, (2) interoperability between GEO and LEO, (3) front-end analog equalizer, (4) frequency filter to reject interference, and etc. These are described in greater detail below.

As discussed above, IBW is defined herein as the frequency range that the antenna demonstrates consistent radiation characteristics without changes in the modulation pattern. As the desired impedance for each scattering antenna elements (RF radiating antenna elements) forming a holographic metasurface antenna is calculated using a holographic equation that relates the feed wave to a desired radiation pattern as described above, and these impedance values are ideal and need to be translated to an impedance that can be realized using the available scattering antenna elements, Euclidean mapping is used to reduce, and potentially minimize, the Euclidean distance (e.g., mapping error) between the desired and achievable impedances.

As discussed above, one way to do this calculation to reduce the Euclidean distance is at a single desired frequency, which can be, for example, the center frequency, the modulation frequency, or the carrier frequency. This means that the calculated modulation pattern is optimized only for that frequency and not necessarily optimized at any other frequency. Because of this, as the frequency moves further away from that desired frequency, mapping errors can result in an offset in the direction of the beam compared to the beam at the single desired or reference frequency, which is referred to as beam squinting.

Figure 19:
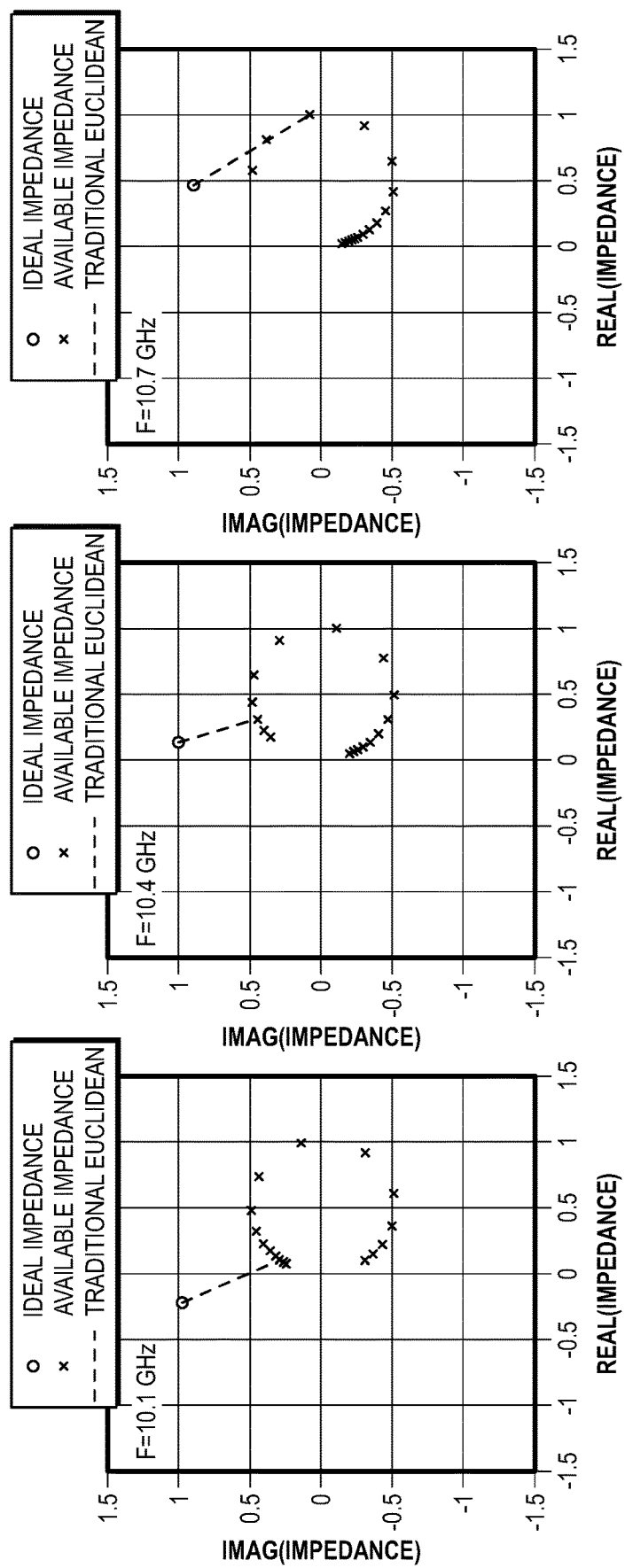
FIG. 19 illustrates traditional Euclidean mapping at 10.4 GHz for a random element over the aperture.
Figure 20:
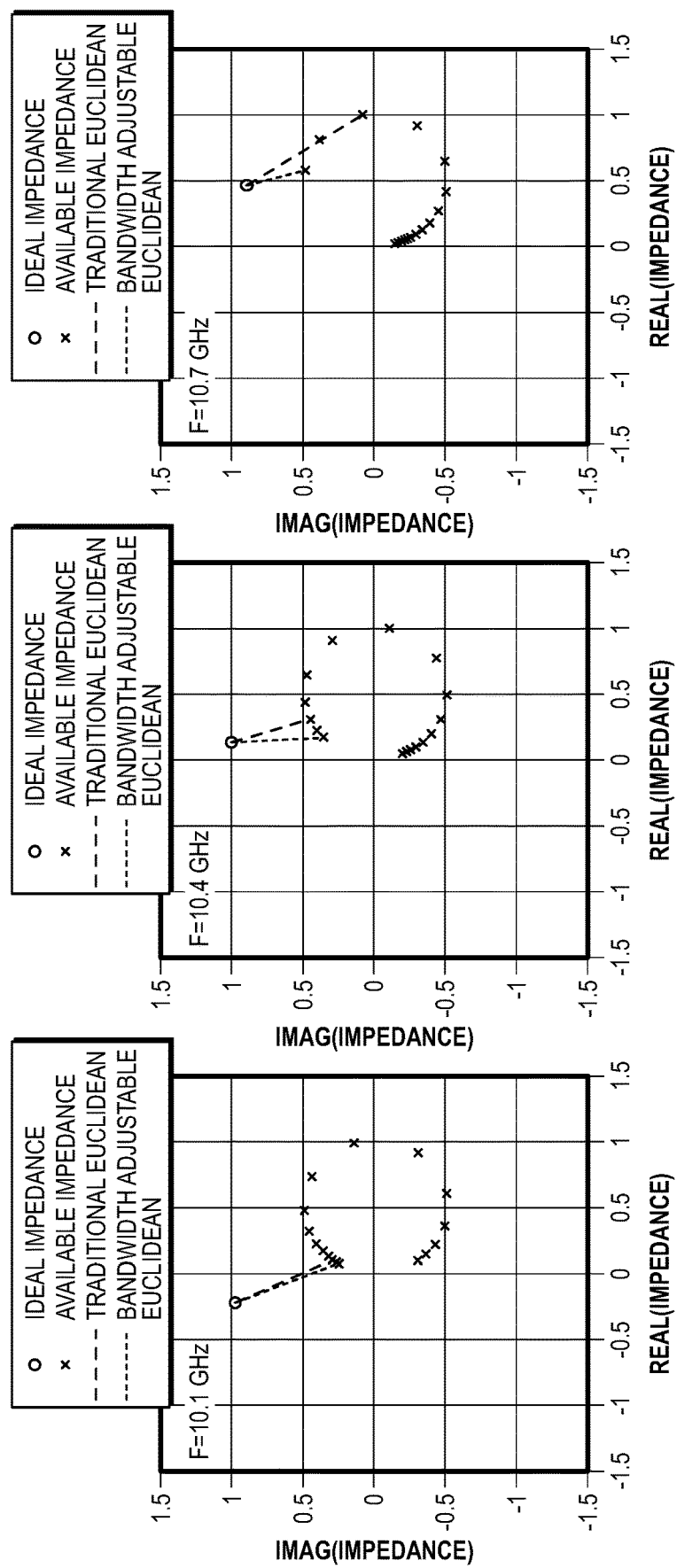
FIG. 20 illustrates bandwidth adjustable Euclidean mapping compared with traditional Euclidean mapping.

In one embodiment, the Euclidean modulation applied is modified in that it brings the frequency characteristics of the scattering antenna elements (e.g., the available impedances of the scattering elements) into calculation to reduce, and potentially minimize, the mapping error within a bandwidth as opposed to a single frequency. In this way, the beam squinting can be reduced to some extent and instantaneous bandwidth can be improved. More specifically, both ideal and available impedances are frequency dependent, so as the frequency changes from modulation frequency, those values change. FIGS. 19 and 20 show an example of this behavior. In FIG. 19, the 'o' shows the ideal impedances. Observed that as the frequency changes, the location of the 'o' also changes. Also in FIG. 19, the '+' are the available impedances. As frequency changes, the location of each '+' also moves. Therefore, know impedances vary versus frequency is needed to make a decision on the mapping, which is done using the bandwidth adjustable Euclidean modulation disclosed herein. FIG. 20 shows an example and comparison with the conventional Euclidean modulation.

The frequency bandwidth in which the characteristics of antenna elements are taken into the calculation (referred to herein as a calculation or frequency window) can be considered as a main trade-off parameter. For example, in one embodiment, the calculation window is centered around a reference frequency, which may be the single reference modulation frequency. Alternatively, the calculation window is centered around a different reference frequency. In yet another alternative, the reference frequency represents an endpoint such that the calculation window expands in a single frequency (increasing or decreasing). That is, the calculation window can be centered around the modulation frequency or shifted. There are cases where the gain curve versus frequency (e.g., the solid line in FIG. 21) falls faster at one side compared to the other side. The shifting of calculation window acts as an equalizing mechanism to improve, and potentially optimize, the modulation for one side more than the other side. In this way, a flatter gain curve can be achieved.

As the size of the calculation window increases, the instantaneous bandwidth is expected to improve at the expense of gain reduction at the modulation frequency. The reason for this reduction is that the modulation will no longer be optimized for that frequency.

FIG. 19 shows the example where the Euclidean mapping calculation is done only at the modulation frequency, which in the example is 10.4 GHz. While the mapping is optimized at that frequency, it is not optimized (i.e., mapping error is not minimum) at other frequencies, such as, for example, at 10.7 GHz.

FIG. 20 shows an example of when a calculation window is applied to account for a range of frequency characteristics of the elements. Referring to FIG. 20, although the mapping is slightly adjusted at 10.4 GHz, the mapping error is significantly reduced at 10.7 GHz.

Figure 21:
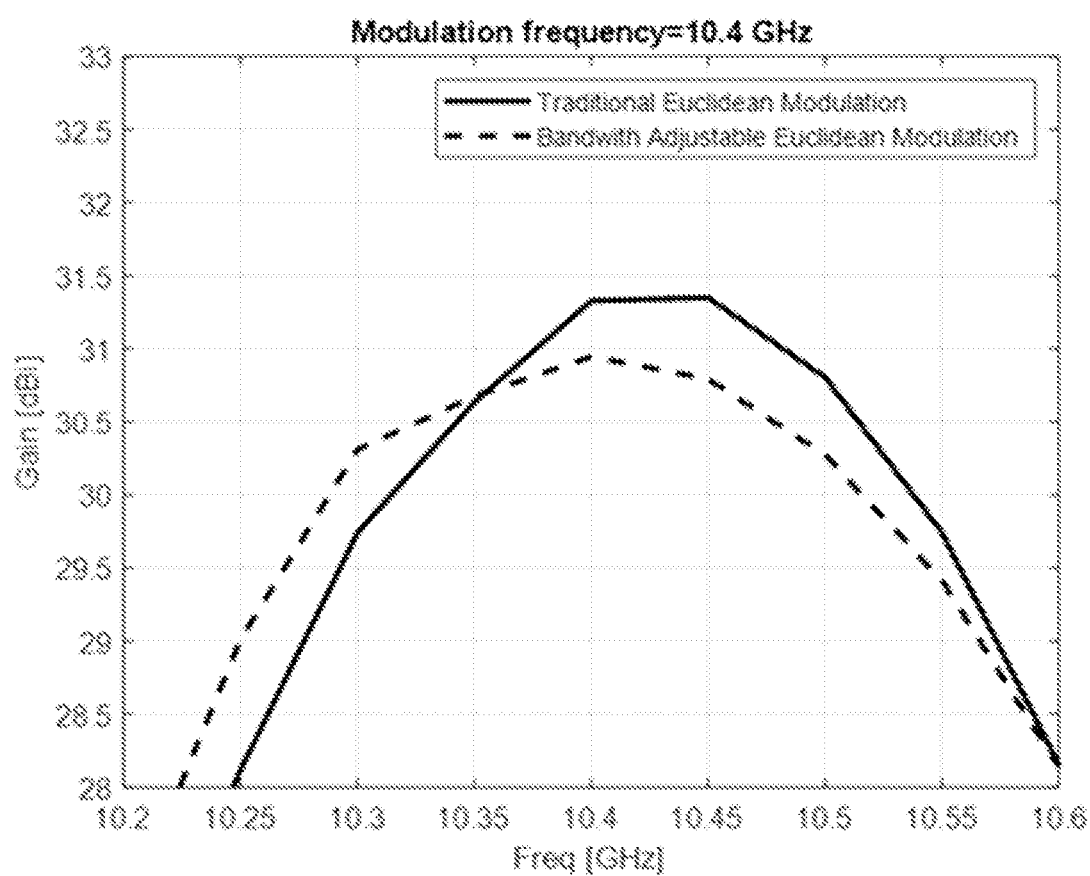
FIG. 21 illustrates a comparison of gain achieved for traditional Euclidean modulation at 10.4 GHz and gain achieved for bandwidth adjustable Euclidean modulation with an example calculation window.

The operation of bandwidth adjustable Euclidean modulation was tested on a radial metasurface antenna with tunable elements in the far-field chamber. FIG. 21 shows a comparison of gain achieved for traditional Euclidean modulation at the reference frequency (10.4 GHz) and gain achieved for bandwidth adjustable Euclidean modulation with an example calculation window. Referring to FIG. 21, an example of the trade-off between gain and instantaneous bandwidth (IBW) is shown. IBW here is defined as the gain flatness (peak-to-peak variation) within 230.4 MHz around the modulation frequency (±115.2 MHz). The solid curve shows the gain vs. frequency curve at 60 deg scan where the modulation pattern based on traditional Euclidean modulation is applied at 10.4 GHz. The dashed curve shows the gain curve where the modulation pattern based on bandwidth adjustable Euclidean modulation is applied. In this case, the acceptable gain drop was set to be less than 0.5 dB. Note that the peak-to-peak variation can be significantly improved at the expense of slight gain reduction.

Figure 22A:
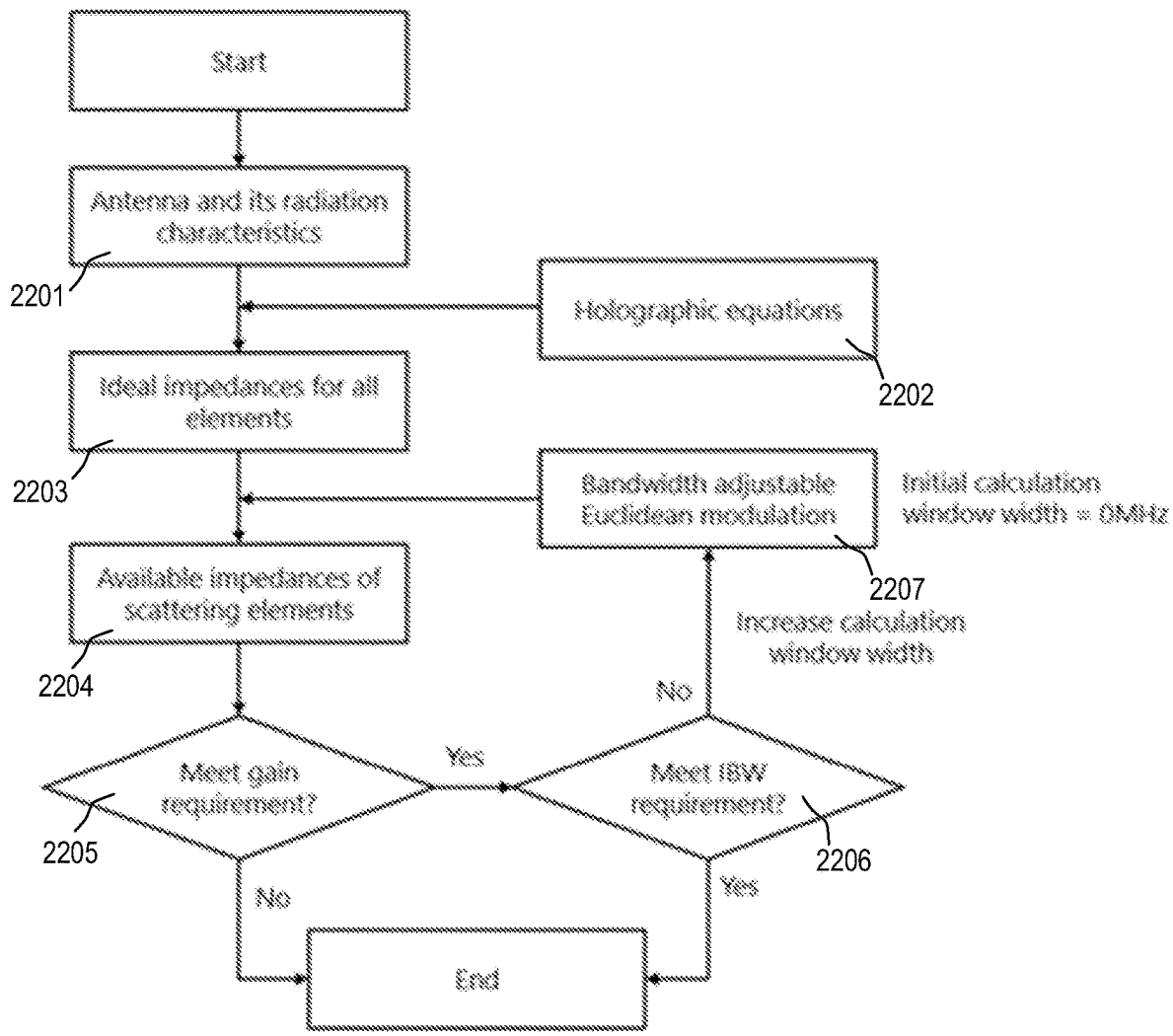
FIG. 22A is a flow diagram of one embodiment of a process for performing bandwidth adjustable Euclidean modulation processing.

FIG. 22A is a flow diagram of one embodiment of a process for performing bandwidth adjustable Euclidean modulation processing and optimization. The process is performed by processing logic that may comprise hardware (circuitry, dedicated logic, etc.), software (such as is run on a general-purpose computer system, a server, or a dedicated machine), firmware, or a combination of the three. In one embodiment, the processing logic is part of modulation logic in a modulator and/or demodulator of an antenna is a satellite terminal.

Referring to FIG. 22A, the process begins by processing logic determines the radiation characteristics of a flat-panel metasurface antenna (processing block 2201). In one embodiment, the radiation characteristics comprise frequency and beam characteristics indicating where the beam of the antenna is pointing. In one embodiment, the radiation characteristics comprise the scan angle and the linear polarization angle. In one embodiment, the beam characteristics include the propagation direction (e.g., specified by Theta/Phi, or Azimuth/Elevation in spherical coordinate system, etc.) and the linear polarization angle, where the linear polarization angle describes the angle difference between the co-polarized field component and the vertical field component (E_theta).

In one embodiment, the process considers the radiation requirements for low-earth orbit (LEO)-based transmitting devices, mid-earth orbit (MEO)-based transmitting devices, or geostationary transmitting devices. These requirements can be dynamic in nature in terms of how data is transmitted and there are many differences in the requirements, mainly referring to gain and IBW in this case. For instance, LEO devices may require lower gain, but larger bandwidth compared to GEO devices.

Based on the characteristics, processing logic calculates or obtains ideal impedance values for all the antenna elements (e.g., RF radiating elements of a metasurface, etc.) using the holographic equations (2202) as inputs for determining the ideal impedances (processing block 2203). In one embodiment, this is performed in a manner well-known in the art.

Processing logic then determines the available impedance values of the elements (processing block 2204). In one embodiment, the values are predetermined and stored in memory and accessed by the modulation process.

Initially, processing logic translates the ideal impedances into actual impedances using the traditional Euclidean modulation (described above) and tests whether the comparison indicates whether the gain is sufficient to allow for adjustments (e.g., is the gain associated with the modulation pattern above a minimum threshold) (processing block 2205). In one embodiment, the gain requirement is specified is set for the entire RF chain, and the RF chain budget determines the requirement on the antenna gain.

If there is insufficient gain to meet requirements, the process terminates as a further adjustment based on instantaneous bandwidth would result in insufficient gain. However, if there is sufficient gain, the process transitions to processing block 2206 where processing logic determines whether the IBW requirements have been met previously. In one embodiment, the IBW requirements are set for the entire RF chain, and the RF chain budget determines the requirement on the antenna IBW. If the IBW requirements have been met, then the process ends. If the IBW requirements have not been met, then the process transitions to processing block 2207 where the calculation window width is increased and the bandwidth adjustment is made in the Euclidean modulation process. In the process flow example, a default initial calculation window is set at 0 MHz. In one embodiment, the amount at each iteration can be fixed and set by a user. In another embodiment, this can be done using a search algorithm where the amount can vary at each iteration. For example, if targeting +/−125 MHz IBW, the calculation windows of 0 to +/−240 Mhz may be examined in the steps of 20 MHz.

In one embodiment, the determination requirements for the calculation window are based on the radiation requirement of the metasurface antenna. In the example in FIG. 22A, these requirements are antenna gain and instantaneous bandwidth. These requirements can change to meet various anticipated scenarios of the application of the metasurface antenna. For example, the radiation characteristics for LEO-based MEO-based or geostationary transmitting devices can determine the desired or optimal range of the calculation window. In other examples, the requirements and subsequently, the calculation window can be based on other factors such as, for example, but not limited to, aging, temperature variations, atmospheric conditions, etc.

As discussed above, thus, if the instantaneous bandwidth requirement is met by the existing calculation window, the process can end. If not, the process will proceed to adjust the calculation window and repeat the comparison of the radiation characteristics with the requirements. This continues until the further adjustments in gain are available and the IBW requirements are met. More specifically, as Gain is defined at a single frequency (i.e., modulation frequency) and IBW is defined as gain variation vs frequency, the gain data at frequencies other than the modulation frequency is needed. An example of requirement is peak-to-peak gain variation less than 1 dB in 250 MHz. In this case, the gain versus frequency within +/−125 MHz of the modulation frequency is examined, and if the gain variation is less than 1 dB, then the requirement is met.

FIG. 22B is a flow diagram of another embodiment of a process for performing bandwidth adjustable Euclidean modulation. The process is performed by processing logic that may comprise hardware (circuitry, dedicated logic, etc.), software (such as is run on a general-purpose computer system, a server, or a dedicated machine), firmware, or a combination of the three. In one embodiment, the processing logic is part of modulation logic in a modulator and/or demodulator of an antenna is a satellite terminal.

Referring to FIG. 22B, the process begins by processing logic selecting a modulation for a frequency range to be applied to antenna elements (e.g., surface scattering antenna elements) of an aperture of an antenna (e.g., satellite antenna) (processing block 2211). In one embodiment, the antenna elements comprises RF radiating antenna elements. In one embodiment, the RF radiating antenna elements comprise tunable elements in a metasurface.

In one embodiment, performing modulation for a frequency range occurs in response to determining that instantaneous bandwidth (IBW) requirements are not met by a beam formed by the antenna with another set of modulation values associated with another, previously selected frequency range. The previously selected frequency range may consist of a single frequency or a frequency band that includes multiple frequency values. For example, in one embodiment, on a first pass through the process, the frequency range is a single frequency. In the second or any later pass through the process, the frequency range includes bandwidth.

In one embodiment, determining instantaneous bandwidth (IBW) requirements are not met by a beam formed by the antenna with another set of modulation values associated with a previously selected frequency range is performed after determining gain is sufficient to allow for adjustments to the frequency range associated with that previously set of modulation values in order to satisfy the IBW requirements.

In one embodiment, selecting a modulation comprises obtaining the desired modulation, mapping the desired modulation to the achievable modulation states, and determining a first set of modulation values for achievable modulation states associated with the frequency range. In one embodiment, the desired modulation is based on one or more of: location of at least a subset of the RF radiating antenna elements, beam pointing direction and polarization, and wave propagation in a feed of the antenna. In one embodiment, mapping the desired modulation to the achievable modulation states is based on Euclidian distance between required and achievable polarizabilities and each of the achievable modulation states corresponds to voltages applied to the antenna elements of the antenna to induce magnetic dipole moments with achievable polarizabilities. In one embodiment, where the antenna elements comprises the RF radiating antenna elements comprise tunable elements in a metasurface and mapping the desired modulation to the achievable modulation states comprises approximating a set of required polarizabilities with a set of the tunable elements in the metasurface.

After selecting the modulation for the frequency range, processing logic maps modulation values associated with the achievable modulation states to one or more control parameters (processing block 2212) and controls the radiating antenna elements using the one or more control parameters to perform beam forming (processing block 2213). In one embodiment, these control parameters comprise a voltage to be applied to each of the RF radiating antenna elements.

FIG. 22C is a flow diagram of yet another embodiment of a process for performing bandwidth adjustable Euclidean modulation. The process is performed by processing logic that may comprise hardware (circuitry, dedicated logic, etc.), software (such as is run on a general-purpose computer system, a server, or a dedicated machine), firmware, or a combination of the three. In one embodiment, the processing logic is part of modulation logic in a modulator and/or demodulator of an antenna is a satellite terminal.

Referring to FIG. 22C, the process begins by processing logic determining, for a first frequency window (e.g., a single frequency, a frequency window/range), a desired modulation associated with a desired impedance for each radio frequency (RF) radiating antenna element of a plurality of RF radiating antenna elements of an antenna, using a holographic equation that relates a feed wave to a desired radiation pattern (processing block 2221).

Using this information, processing logic maps the desired modulation to achievable modulation states using Euclidean mapping (processing block 2222) and determines the gain associated with a modulation pattern for the frequency window (processing block 2223). In one embodiment, the mapping of a desired modulation to achievable modulation states is based on Euclidean distance. In one embodiment, the RF radiating antenna elements comprise tunable elements in a metasurface and mapping the desired modulation to achievable modulation states comprises approximating a set of required polarizabilities with a set of the tunable elements in the metasurface.

Processing logic determines whether the gain associated with the modulation pattern is above a threshold (processing block 2224). In one embodiment, the threshold is the gain requirement set by a satellite services provider. If the gain is not above the threshold, then the process ends (processing block 2225).

If the gain is above the threshold, then the process transitions to processing block 2226 where processing logic determines whether requirements for instantaneous bandwidth (IBW) have been met previously by the modulation pattern associated with the frequency window. If the IBW requirements are not met by the modulation pattern associated frequency window, then processing logic adjusts the first frequency window by increasing size of the frequency window to create a new frequency window and repeats the process using the new frequency window (processing block 2227).

If the IBW requirements are met by the modulation pattern associated frequency window, then processing logic maps modulation values associated with the achievable modulation pattern to one or more control parameters and controls radio frequency (RF) radiating antenna elements using the one or more control parameters to perform beam forming (processing block 2228). In one embodiment, these control parameters comprise a voltage to be applied to each of the RF radiating antenna elements.

Embodiments described herein include a number of additional innovations and improvements besides those mentioned above. For example, in one embodiment, the antenna dynamically adjusts the modulation pattern to account for various scenarios (e.g., rain fade). In one embodiment, as the rain fade causes degradation in the signal, such that a higher antenna gain is needed to compensate, a reverse case could be used where the calculation window is already applied but the gain drops below a threshold due to the rain fade. In this scenario, in one embodiment, IBW is traded to increase the gain.

As another example, in one embodiment, the antenna dynamically adjusts the IBW based on the data payload. For instance, the requirements might be different for LEO and GEO applications, so the antenna can dynamically adjust and trade gain or G/T vs IBW. In such a case, a higher G/T could be traded in favor of IBW if the IBW is not wide enough.

In one embodiment, Euclidean modulation is also performed in a manner that makes a trade-off for cost: Low Earth orbiting satellite (LEO) versus geostationary Earth orbit (GEO) (e.g., smart hub). More specifically, the ability to use bandwidth adjustable Euclidean modulation allows an antenna to be configured to provide support for both GEO and LEO and enable it for interoperability between LEO and GEO. In one embodiment, this is accomplished by increasing the diameter of the antenna to meet the GEO G/T requirements. However, to meet LEO instantaneous bandwidth requirements with a larger aperture size, the modulation techniques disclosed herein in accordance with one embodiment trade off gain and G/T for instantaneous bandwidth if a GEO terminal is updated to turn it into a LEO terminal. Thus, in one embodiment, the interoperability of the terminal may be dynamically adjusted to operate between GEO and LEO terminals. After such an adjustment, the modulation pattern is adjusted to communicate with either type of satellites.

In one embodiment, the techniques disclosed herein enable the antenna to act as a front-end analog equalizer, thereby potentially eliminating the need for equalizers in the RF chain. Currently, equalizers are used to adjust the unequal gain within the bandwidth. These variations can be due to the antenna bandwidth as well as the channel impairment that would produce unequal gain. In one embodiment, the adjustable bandwidth Euclidean modulation techniques disclosed herein assist the equalizer in compensation or replace it when its settings are adjusted using feedback from the demodulator. In a broader point of view, this method can be used to automatically compensate for other factors such, for example, but not limited to aging, temperature variations, etc.

One way to implement enabling the antenna to act as a front-end analog equalizer is by training an adaptive equalizer by using either blind equalization or using a known signal such as the physical layer Start of Frame of a waveform (e.g., DVB-S2X). Once the adaptive equalizer has been trained, equalization is applied to specific antenna elements. For example, in one embodiment, the adaptive equalizer taps are interpolated and then a similar pattern is applied to the antenna for that specific orientation. The antenna orientation is factored in since the adaptive equalizer can be basically thought of as finding a set of delays that reduce inter-symbol interference as well as other artifacts. In one embodiment, an equalizer is still be used to estimate the delay corrections required for a specific orientation.

In another embodiment, the techniques described herein enable the antenna to act as a frequency filter with adjustable bandwidth to potentially exclude and/or eliminate the interference when getting into the passband. Referring to FIG. 21, for example, the gain curve vs frequency can be interpreted as a filtering response where the antenna beam will be only directive within the vicinity of the modulation frequency. In this perspective, the filtering response can become wider or narrower using the bandwidth adjustable Euclidean modulation techniques disclosed herein. If the filtering response is wide and an interference occurs within the band, the parameters (e.g., calculation window) in the bandwidth adjustable Euclidean modulation techniques can be adjusted to narrow the filtering response in order to exclude/eliminate the interference.

Examples of Antenna Embodiments

The techniques described above may be used with flat panel antennas. Embodiments of such flat panel antennas are disclosed. The flat panel antennas include one or more arrays of antenna elements on an antenna aperture. In one embodiment, the antenna elements comprise liquid crystal cells. In one embodiment, the flat panel antenna is a cylindrically fed antenna that includes matrix drive circuitry to uniquely address and drive each of the antenna elements that are not placed in rows and columns. In one embodiment, the elements are placed in rings.

In one embodiment, the antenna aperture having the one or more arrays of antenna elements is comprised of multiple segments coupled together. When coupled together, the combination of the segments form closed concentric rings of antenna elements. In one embodiment, the concentric rings are concentric with respect to the antenna feed.

Overview of an Example of Antenna Systems

In one embodiment, the flat panel antenna is part of a metamaterial antenna system. Embodiments of a metamaterial antenna system for communications satellite earth stations are described. In one embodiment, the antenna system is a component or subsystem of a satellite earth station (ES) operating on a mobile platform (e.g., aeronautical, maritime, land, etc.) that operates using either Ka-band frequencies or Ku-band frequencies for civil commercial satellite communications. Note that embodiments of the antenna system also can be used in earth stations that are not on mobile platforms (e.g., fixed or transportable earth stations).

In one embodiment, the antenna system uses surface scattering metamaterial technology to form and steer transmit and receive beams through separate antennas. In one embodiment, the antenna systems are analog systems, in contrast to antenna systems that employ digital signal processing to electrically form and steer beams (such as phased array antennas).

In one embodiment, the antenna system is comprised of three functional subsystems: (1) a wave guiding structure consisting of a cylindrical wave feed architecture; (2) an array of wave scattering metamaterial unit cells that are part of antenna elements; and (3) a control structure to command formation of an adjustable radiation field (beam) from the metamaterial scattering elements using holographic principles.

Examples of Wave Guiding Structures

Figure 23:
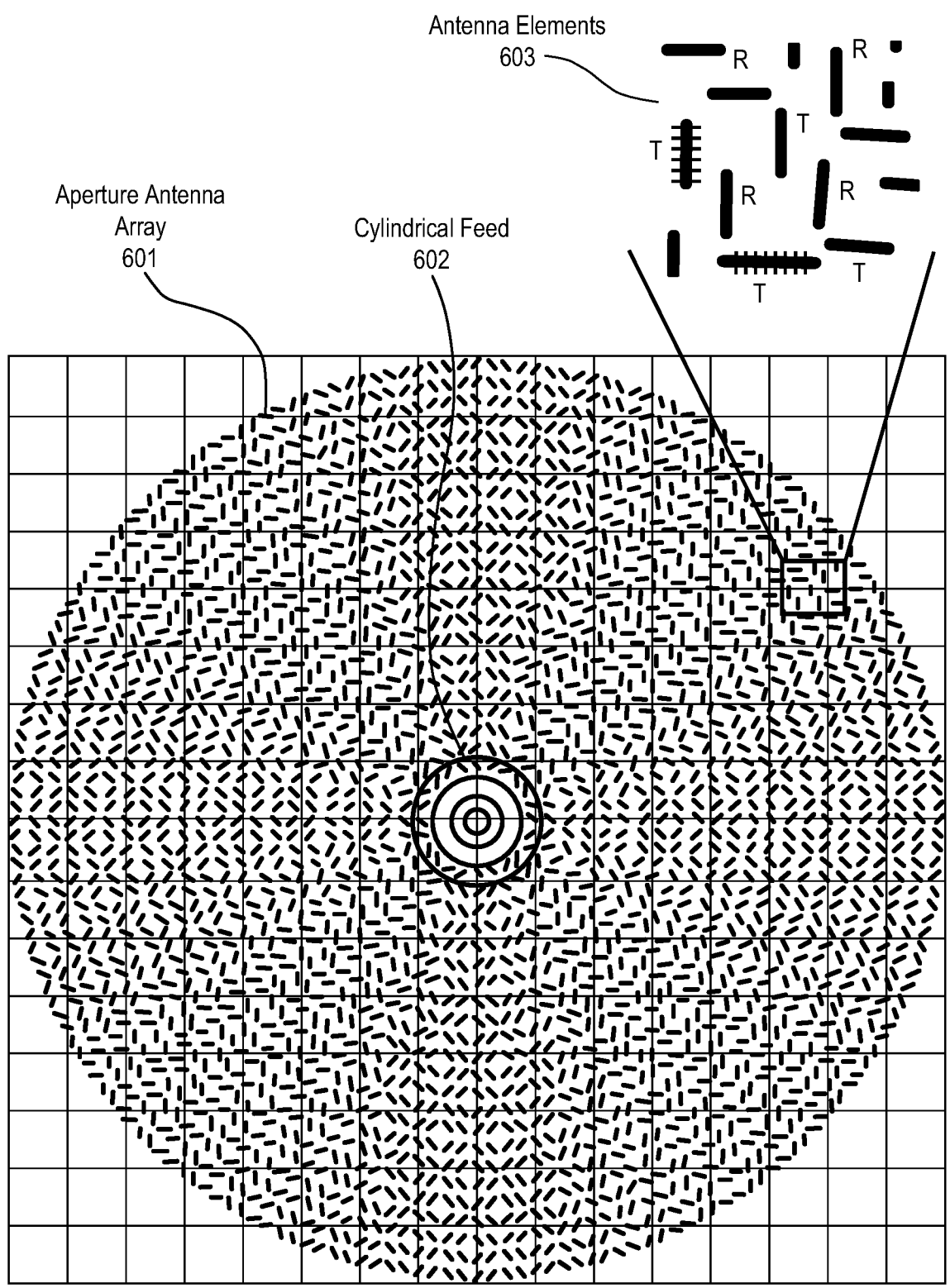
FIG. 23 illustrates an aperture having one or more arrays of antenna elements placed in concentric rings around an input feed of the cylindrically fed antenna.

FIG. 23 illustrates an aperture having one or more arrays of antenna elements placed in concentric rings around an input feed of the cylindrically fed antenna. In one embodiment, the cylindrically fed antenna includes a coaxial feed that is used to provide a cylindrical wave feed. In one embodiment, the cylindrical wave feed architecture feeds the antenna from a central point with an excitation that spreads outward in a cylindrical manner from the feed point. That is, a cylindrically fed antenna creates an outward travelling concentric feed wave. Even so, the shape of the cylindrical feed antenna around the cylindrical feed can be circular, square or any shape. In another embodiment, a cylindrically fed antenna creates an inward travelling feed wave. In such a case, the feed wave most naturally comes from a circular structure.

Antenna Elements

In one embodiment, the antenna elements comprise a group of patch antennas. This group of patch antennas comprises an array of scattering metamaterial elements. In one embodiment, each scattering element in the antenna system is part of a unit cell that consists of a lower conductor, a dielectric substrate and an upper conductor that embeds a complementary electric inductive-capacitive resonator ("complementary electric LC" or "CELC") that is etched in or deposited onto the upper conductor. As would be understood by those skilled in the art, LC in the context of CELC refers to inductance-capacitance, as opposed to liquid crystal.

In one embodiment, a liquid crystal (LC) is disposed in the gap around the scattering element. This LC is driven by the direct drive embodiments described above. In one embodiment, liquid crystal is encapsulated in each unit cell and separates the lower conductor associated with a slot from an upper conductor associated with its patch. Liquid crystal has a permittivity that is a function of the orientation of the molecules comprising the liquid crystal, and the orientation of the molecules (and thus the permittivity) can be controlled by adjusting the bias voltage across the liquid crystal. Using this property, in one embodiment, the liquid crystal integrates an on/off switch for the transmission of energy from the guided wave to the CELC. When switched on, the CELC emits an electromagnetic wave like an electrically small dipole antenna. Note that the teachings herein are not limited to having a liquid crystal that operates in a binary fashion with respect to energy transmission.

In one embodiment, the feed geometry of this antenna system allows the antenna elements to be positioned at forty-five-degree (45°) angles to the vector of the wave in the wave feed. Note that other positions may be used (e.g., at 40° angles). This position of the elements enables control of the free space wave received by or transmitted/radiated from the elements. In one embodiment, the antenna elements are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz). In one embodiment, the two sets of elements are perpendicular to each other and simultaneously have equal amplitude excitation if controlled to the same tuning state. Rotating them +/−45 degrees relative to the feed wave excitation achieves both desired features at once. Rotating one set 0 degrees and the other 90 degrees would achieve the perpendicular goal, but not the equal amplitude excitation goal. Note that 0 and 90 degrees may be used to achieve isolation when feeding the array of antenna elements in a single structure from two sides.

The amount of radiated power from each unit cell is controlled by applying a voltage to the patch (potential across the LC channel) using a controller. Traces to each patch are used to provide the voltage to the patch antenna. The voltage is used to tune or detune the capacitance and thus the resonance frequency of individual elements to effectuate beam forming. The voltage required is dependent on the liquid crystal mixture being used. The voltage tuning characteristic of liquid crystal mixtures is mainly described by a threshold voltage at which the liquid crystal starts to be affected by the voltage and the saturation voltage, above which an increase of the voltage does not cause major tuning in liquid crystal. These two characteristic parameters can change for different liquid crystal mixtures.

In one embodiment, as discussed above, a matrix drive is used to apply voltage to the patches in order to drive each cell separately from all the other cells without having a separate connection for each cell (direct drive). Because of the high density of elements, the matrix drive is an efficient way to address each cell individually.

In one embodiment, the control structure for the antenna system has 2 main components: the antenna array controller, which includes drive electronics, for the antenna system, is below the wave scattering structure, while the matrix drive switching array is interspersed throughout the radiating RF array in such a way as to not interfere with the radiation. In one embodiment, the drive electronics for the antenna system comprise commercial off-the shelf LCD controls used in commercial television appliances that adjust the bias voltage for each scattering element by adjusting the amplitude or duty cycle of an AC bias signal to that element.

In one embodiment, the antenna array controller also contains a microprocessor executing the software. The control structure may also incorporate sensors (e.g., a GPS receiver, a three-axis compass, a 3-axis accelerometer, 3-axis gyro, 3-axis magnetometer, etc.) to provide location and orientation information to the processor. The location and orientation information may be provided to the processor by other systems in the earth station and/or may not be part of the antenna system.

More specifically, the antenna array controller controls which elements are turned off and those elements turned on and at which phase and amplitude level at the frequency of operation. The elements are selectively detuned for frequency operation by voltage application.

For transmission, a controller supplies an array of voltage signals to the RF patches to create a modulation, or control pattern. The control pattern causes the elements to be turned to different states. In one embodiment, multistate control is used in which various elements are turned on and off to varying levels, further approximating a sinusoidal control pattern, as opposed to a square wave (i.e., a sinusoid gray shade modulation pattern). In one embodiment, some elements radiate more strongly than others, rather than some elements radiate and some do not. Variable radiation is achieved by applying specific voltage levels, which adjusts the liquid crystal permittivity to varying amounts, thereby detuning elements variably and causing some elements to radiate more than others.

The generation of a focused beam by the metamaterial array of elements can be explained by the phenomenon of constructive and destructive interference. Individual electromagnetic waves sum up (constructive interference) if they have the same phase when they meet in free space and waves cancel each other (destructive interference) if they are in opposite phase when they meet in free space. If the slots in a slotted antenna are positioned so that each successive slot is positioned at a different distance from the excitation point of the guided wave, the scattered wave from that element will have a different phase than the scattered wave of the previous slot. If the slots are spaced one quarter of a guided wavelength apart, each slot will scatter a wave with a one fourth phase delay from the previous slot.

Using the array, the number of patterns of constructive and destructive interference that can be produced can be increased so that beams can be pointed theoretically in any direction plus or minus ninety degrees (90°) from the bore sight of the antenna array, using the principles of holography. Thus, by controlling which metamaterial unit cells are turned on or off (i.e., by changing the pattern of which cells are turned on and which cells are turned off), a different pattern of constructive and destructive interference can be produced, and the antenna can change the direction of the main beam. The time required to turn the unit cells on and off dictates the speed at which the beam can be switched from one location to another location.

In one embodiment, the antenna system produces one steerable beam for the uplink antenna and one steerable beam for the downlink antenna. In one embodiment, the antenna system uses metamaterial technology to receive beams and to decode signals from the satellite and to form transmit beams that are directed toward the satellite. In one embodiment, the antenna systems are analog systems, in contrast to antenna systems that employ digital signal processing to electrically form and steer beams (such as phased array antennas). In one embodiment, the antenna system is considered a "surface" antenna that is planar and relatively low profile, especially when compared to conventional satellite dish receivers.

Figure 24:
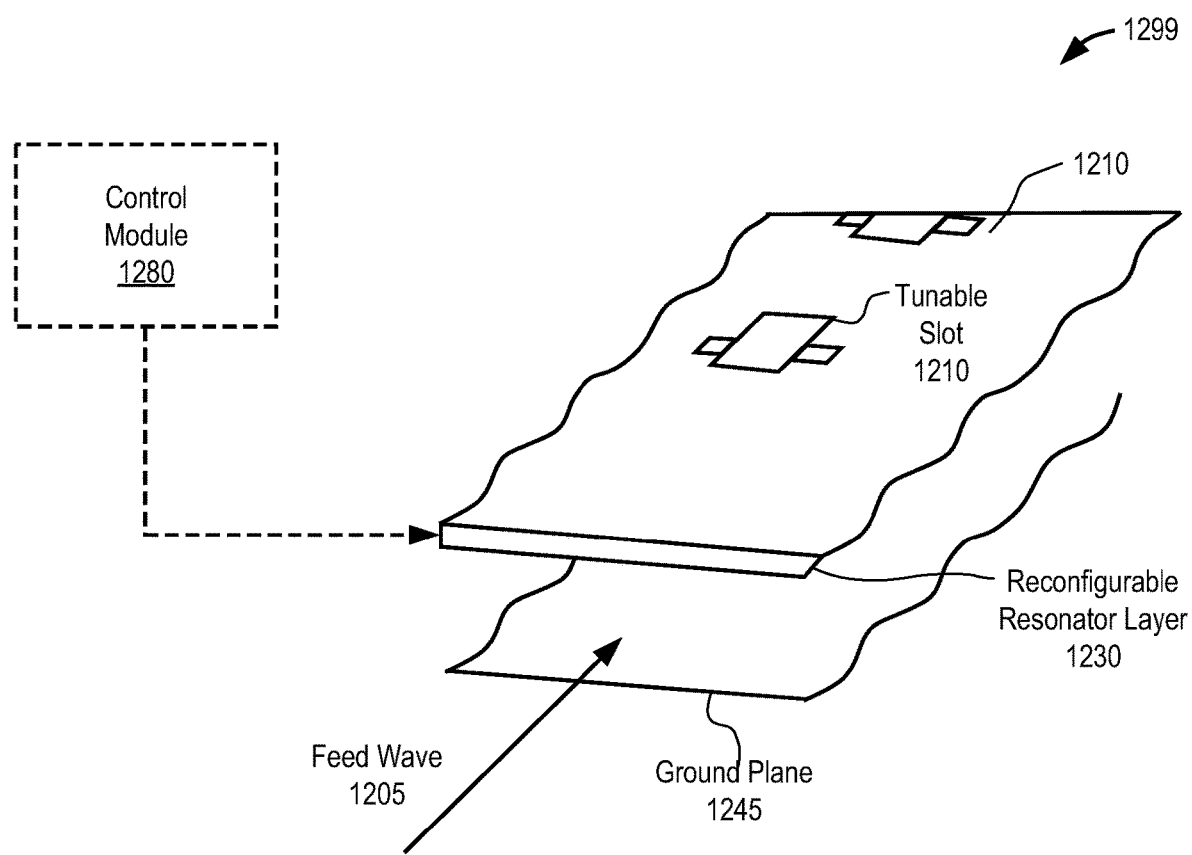
FIG. 24 illustrates a perspective view of one row of antenna elements that includes a ground plane and a reconfigurable resonator layer.

FIG. 24 illustrates a perspective view of one row of antenna elements that includes a ground plane and a reconfigurable resonator layer. Reconfigurable resonator layer 1230 includes an array of tunable slots 1210. The array of tunable slots 1210 can be configured to point the antenna in a desired direction. Each of the tunable slots can be tuned/adjusted by varying a voltage across the liquid crystal.

Figure 25A:
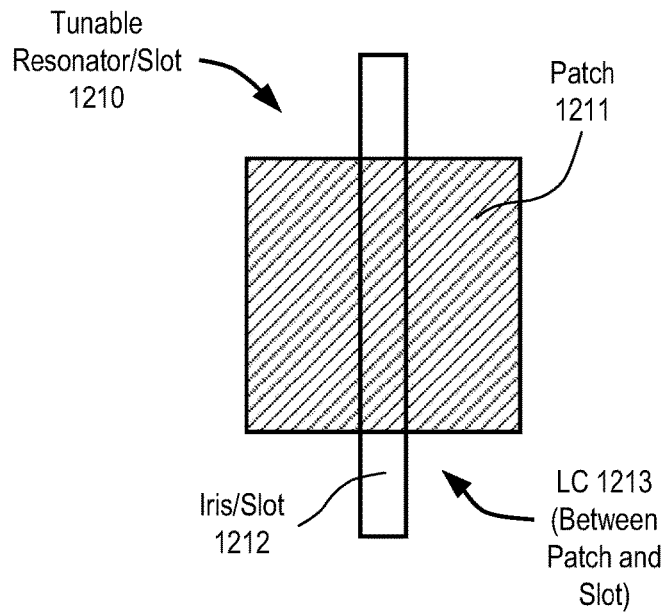
FIG. 25A illustrates one embodiment of a tunable resonator/slot.

Control module 1280 is coupled to reconfigurable resonator layer 1230 to modulate the array of tunable slots 1210 by varying the voltage across the liquid crystal in FIG. 25A. Control module 1280 may include a Field Programmable Gate Array ("FPGA"), a microprocessor, a controller, System-on-a-Chip (SoC), or other processing logic. In one embodiment, control module 1280 includes logic circuitry (e.g., multiplexer) to drive the array of tunable slots 1210. In one embodiment, control module 1280 receives data that includes specifications for a holographic diffraction pattern to be driven onto the array of tunable slots 1210. The holographic diffraction patterns may be generated in response to a spatial relationship between the antenna and a satellite so that the holographic diffraction pattern steers the downlink beams (and uplink beam if the antenna system performs transmit) in the appropriate direction for communication. Although not drawn in each figure, a control module similar to control module 1280 may drive each array of tunable slots described in the figures of the disclosure.

Radio Frequency ("RF") holography is also possible using analogous techniques where a desired RF beam can be generated when an RF reference beam encounters an RF holographic diffraction pattern. In the case of satellite communications, the reference beam is in the form of a feed wave, such as feed wave 1205 (approximately 20 GHz in some embodiments). To transform a feed wave into a radiated beam (either for transmitting or receiving purposes), an interference pattern is calculated between the desired RF beam (the object beam) and the feed wave (the reference beam). The interference pattern is driven onto the array of tunable slots 1210 as a diffraction pattern so that the feed wave is "steered" into the desired RF beam (having the desired shape and direction). In other words, the feed wave encountering the holographic diffraction pattern "reconstructs" the object beam, which is formed according to design requirements of the communication system. The holographic diffraction pattern contains the excitation of each element and is calculated by $w_{hologram}=w_{in}*w_{out}$, with $w_{in}$ as the wave equation in the waveguide and $w_{out}$ the wave equation on the outgoing wave.

FIG. 25A illustrates one embodiment of a tunable resonator/slot 1210. Tunable slot 1210 includes an iris/slot 1212, a radiating patch 1211, and liquid crystal 1213 disposed between iris 1212 and patch 1211. In one embodiment, radiating patch 1211 is co-located with iris 1212.

Figure 25B:
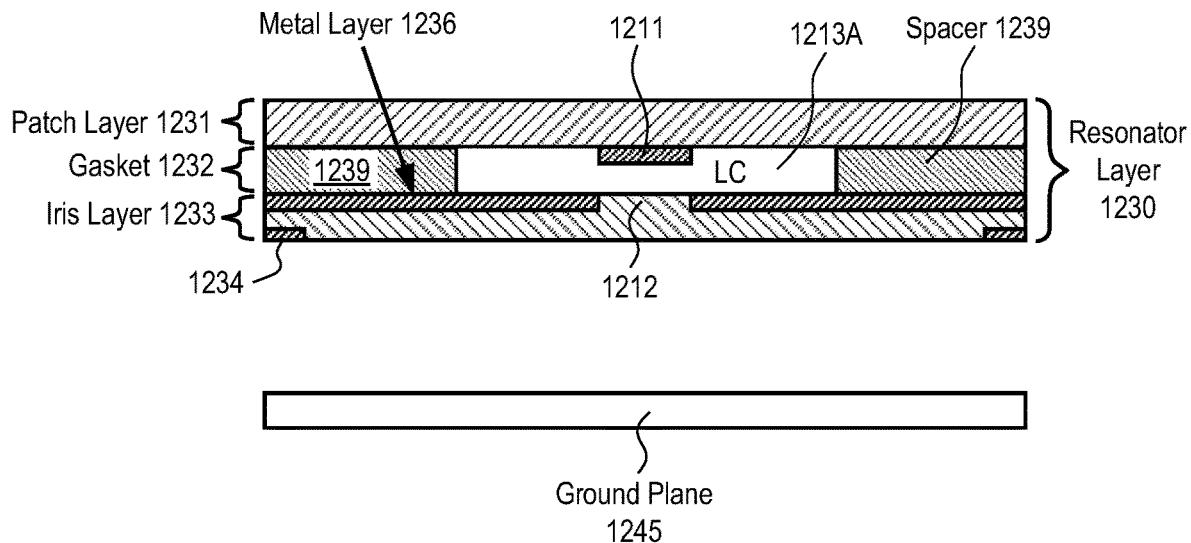
FIG. 25B illustrates a cross section view of one embodiment of a physical antenna aperture.

FIG. 25B illustrates a cross section view of one embodiment of a physical antenna aperture. The antenna aperture includes ground plane 1245, and a metal layer 1236 within iris layer 1233, which is included in reconfigurable resonator layer 1230. In one embodiment, the antenna aperture of FIG. 25B includes a plurality of tunable resonator/slots 1210 of FIG. 25A. Iris/slot 1212 is defined by openings in metal layer 1236. A feed wave, such as feed wave 1205 of FIG. 24, may have a microwave frequency compatible with satellite communication channels. The feed wave propagates between ground plane 1245 and resonator layer 1230.

Reconfigurable resonator layer 1230 also includes gasket layer 1232 and patch layer 1231. Gasket layer 1232 is disposed between patch layer 1231 and iris layer 1233. Note that in one embodiment, a spacer could replace gasket layer 1232. In one embodiment, iris layer 1233 is a printed circuit board ("PCB") that includes a copper layer as metal layer 1236. In one embodiment, iris layer 1233 is glass. Iris layer 1233 may be other types of substrates.

Openings may be etched in the copper layer to form slots 1212. In one embodiment, iris layer 1233 is conductively coupled by a conductive bonding layer to another structure (e.g., a waveguide) in FIG. 25B. Note that in an embodiment the iris layer is not conductively coupled by a conductive bonding layer and is instead interfaced with a non-conducting bonding layer.

Patch layer 1231 may also be a PCB that includes metal as radiating patches 1211. In one embodiment, gasket layer 1232 includes spacers 1239 that provide a mechanical standoff to define the dimension between metal layer 1236 and patch 1211. In one embodiment, the spacers are 75 microns, but other sizes may be used (e.g., 3-200 mm). As mentioned above, in one embodiment, the antenna aperture of FIG. 25B includes multiple tunable resonator/slots, such as tunable resonator/slot 1210 includes patch 1211, liquid crystal 1213, and iris 1212 of FIG. 25B. The chamber for liquid crystal 1213 is defined by spacers 1239, iris layer 1233 and metal layer 1236. When the chamber is filled with liquid crystal, patch layer 1231 can be laminated onto spacers 1239 to seal liquid crystal within resonator layer 1230.

A voltage between patch layer 1231 and iris layer 1233 can be modulated to tune the liquid crystal in the gap between the patch and the slots (e.g., tunable resonator/slot 1210). Adjusting the voltage across liquid crystal 1213 varies the capacitance of a slot (e.g., tunable resonator/slot 1210). Accordingly, the reactance of a slot (e.g., tunable resonator/slot 1210) can be varied by changing the capacitance. Resonant frequency of slot 1210 also changes according to the equation $$f = \frac{1}{2\pi\sqrt{LC}}$$

where f is the resonant frequency of slot 1210 and L and C are the inductance and capacitance of slot 1210, respectively. The resonant frequency of slot 1210 affects the energy radiated from feed wave 1205 propagating through the waveguide. As an example, if fed wave 1205 is 20 GHz, the resonant frequency of a slot 1210 may be adjusted (by varying the capacitance) to 17 GHz so that the slot 1210 couples substantially no energy from feed wave 1205. Or, the resonant frequency of a slot 1210 may be adjusted to 20 GHz so that the slot 1210 couples energy from feed wave 1205 and radiates that energy into free space. Although the examples given are binary (fully radiating or not radiating at all), full gray scale control of the reactance, and therefore the resonant frequency of slot 1210 is possible with voltage variance over a multi-valued range. Hence, the energy radiated from each slot 1210 can be finely controlled so that detailed holographic diffraction patterns can be formed by the array of tunable slots.

In one embodiment, tunable slots in a row are spaced from each other by $\lambda/5$. Other spacings may be used. In one embodiment, each tunable slot in a row is spaced from the closest tunable slot in an adjacent row by $\lambda/2$, and, thus, commonly oriented tunable slots in different rows are spaced by $\lambda/4$, though other spacings are possible (e.g., $\lambda/5$, $\lambda/6.3$). In another embodiment, each tunable slot in a row is spaced from the closest tunable slot in an adjacent row by $\lambda/3$.

Embodiments use reconfigurable metamaterial technology, such as described in U.S. patent application Ser. No. 14/550,178, entitled "Dynamic Polarization and Coupling Control from a Steerable Cylindrically Fed Holographic Antenna", filed Nov. 21, 2014 and U.S. patent application Ser. No. 14/610,502, entitled "Ridged Waveguide Feed Structures for Reconfigurable Antenna", filed Jan. 30, 2015.

FIGS. 26A-D illustrate one embodiment of the different layers for creating the slotted array. The antenna array includes antenna elements that are positioned in rings, such as the example rings shown in FIG. 23. Note that in this example the antenna array has two different types of antenna elements that are used for two different types of frequency bands.

Figure 26A:
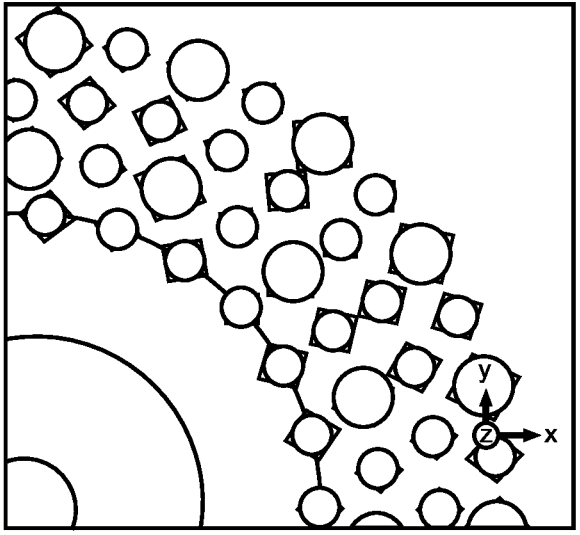
FIGS. 26A-D illustrate one embodiment of the different layers for creating the slotted array.
Figure 26B:
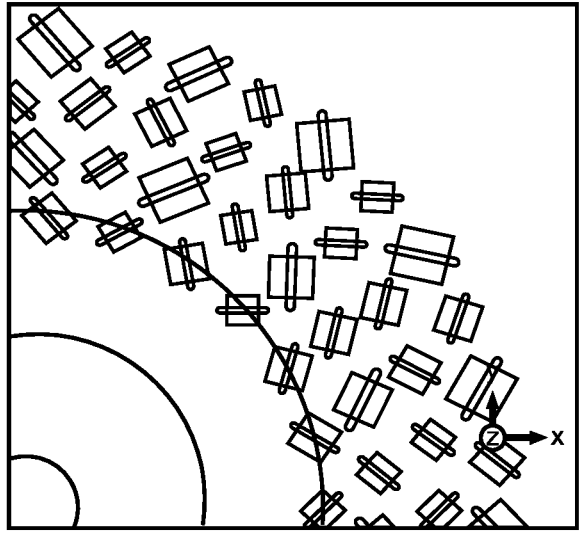
Figure 26C:
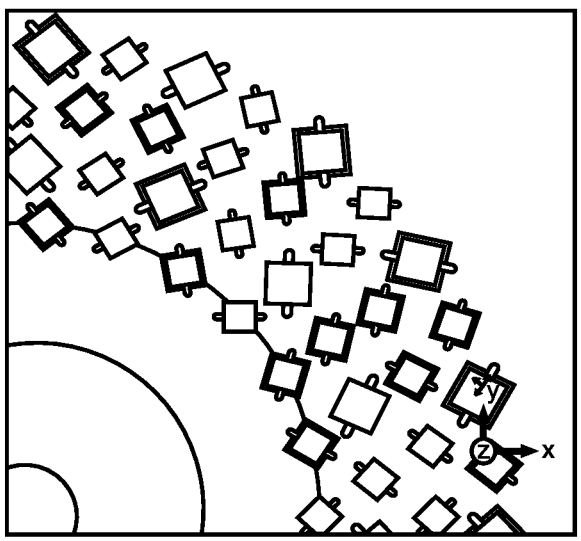
Figure 26D:
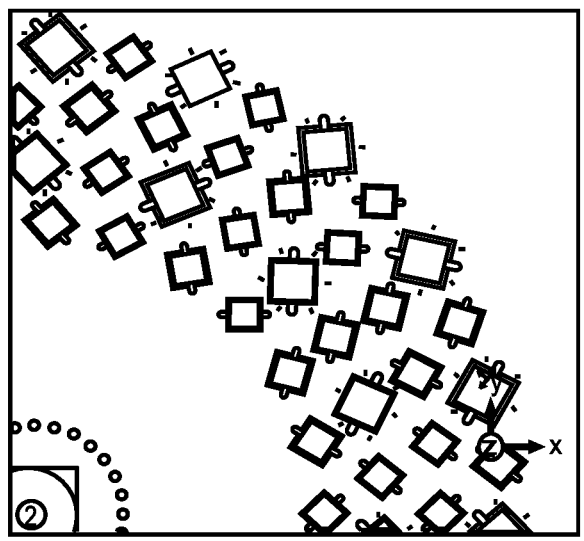

FIG. 26A illustrates a portion of the first iris board layer with locations corresponding to the slots. Referring to FIG. 26A, the circles are open areas/slots in the metallization in the bottom side of the iris substrate, and are for controlling the coupling of elements to the feed (the feed wave). Note that this layer is an optional layer and is not used in all designs. FIG. 26B illustrates a portion of the second iris board layer containing slots. FIG. 26C illustrates patches over a portion of the second iris board layer. FIG. 26D illustrates a top view of a portion of the slotted array.

Figure 27:
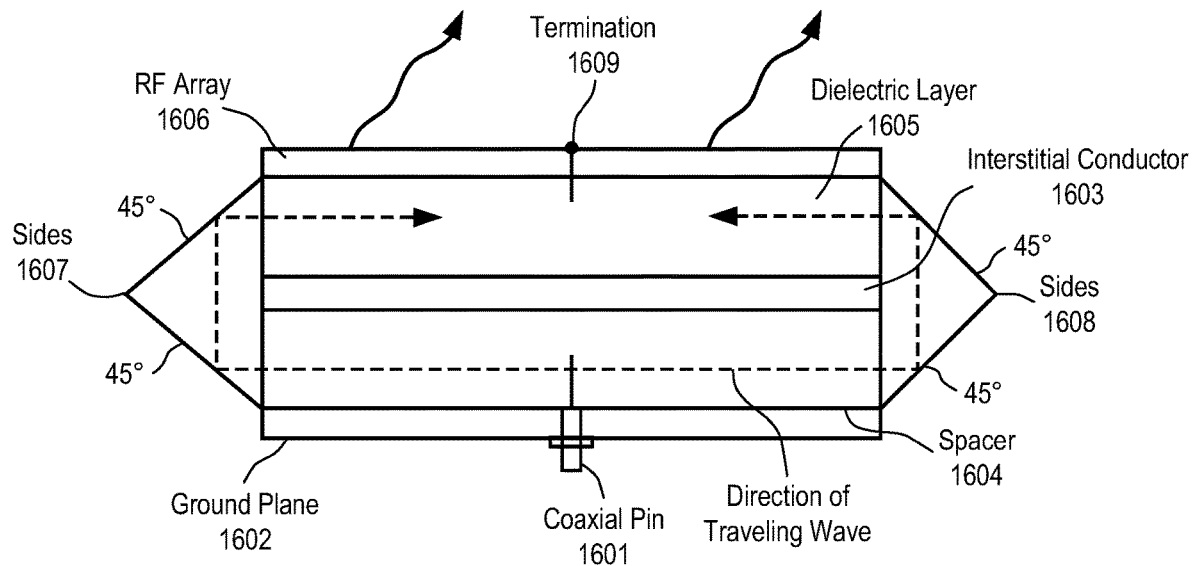
FIG. 27 illustrates a side view of one embodiment of a cylindrically fed antenna structure.

FIG. 27 illustrates a side view of one embodiment of a cylindrically fed antenna structure. The antenna produces an inwardly travelling wave using a double layer feed structure (i.e., two layers of a feed structure). In one embodiment, the antenna includes a circular outer shape, though this is not required. That is, non-circular inward travelling structures can be used. In one embodiment, the antenna structure in FIG. 27 includes the coaxial feed of FIG. 23.

Referring to FIG. 27, a coaxial pin 1601 is used to excite the field on the lower level of the antenna. In one embodiment, coaxial pin 1601 is a 50Ω coax pin that is readily available. Coaxial pin 1601 is coupled (e.g., bolted) to the bottom of the antenna structure, which is conducting ground plane 1602.

Separate from conducting ground plane 1602 is interstitial conductor 1603, which is an internal conductor. In one embodiment, conducting ground plane 1602 and interstitial conductor 1603 are parallel to each other. In one embodiment, the distance between ground plane 1602 and interstitial conductor 1603 is 0.1-0.15". In another embodiment, this distance may be $\lambda/2$, where $\lambda$, is the wavelength of the travelling wave at the frequency of operation.

Ground plane 1602 is separated from interstitial conductor 1603 via a spacer 1604. In one embodiment, spacer 1604 is a foam or air-like spacer. In one embodiment, spacer 1604 comprises a plastic spacer.

On top of interstitial conductor 1603 is dielectric layer 1605. In one embodiment, dielectric layer 1605 is plastic. The purpose of dielectric layer 1605 is to slow the travelling wave relative to free space velocity. In one embodiment, dielectric layer 1605 slows the travelling wave by 30% relative to free space. In one embodiment, the range of indices of refraction that are suitable for beam forming are 1.2-1.8, where free space has by definition an index of refraction equal to 1. Other dielectric spacer materials, such as, for example, plastic, may be used to achieve this effect. Note that materials other than plastic may be used as long as they achieve the desired wave slowing effect. Alternatively, a material with distributed structures may be used as dielectric 1605, such as periodic sub-wavelength metallic structures that can be machined or lithographically defined, for example.

An RF-array 1606 is on top of dielectric 1605. In one embodiment, the distance between interstitial conductor 1603 and RF-array 1606 is 0.1-0.15". In another embodiment, this distance may be $\lambda_{eff}/2$, where $\lambda_{eff}$ is the effective wavelength in the medium at the design frequency.

The antenna includes sides 1607 and 1608. Sides 1607 and 1608 are angled to cause a travelling wave feed from coax pin 1601 to be propagated from the area below interstitial conductor 1603 (the spacer layer) to the area above interstitial conductor 1603 (the dielectric layer) via reflection. In one embodiment, the angle of sides 1607 and 1608 are at 45° angles. In an alternative embodiment, sides 1607 and 1608 could be replaced with a continuous radius to achieve the reflection. While FIG. 27 shows angled sides that have angle of 45 degrees, other angles that accomplish signal transmission from lower level feed to upper level feed may be used. That is, given that the effective wavelength in the lower feed will generally be different than in the upper feed, some deviation from the ideal 45° angles could be used to aid transmission from the lower to the upper feed level. For example, in another embodiment, the 45° angles are replaced with a single step. The steps on one end of the antenna go around the dielectric layer, interstitial the conductor, and the spacer layer. The same two steps are at the other ends of these layers.

In operation, when a feed wave is fed in from coaxial pin 1601, the wave travels outward concentrically oriented from coaxial pin 1601 in the area between ground plane 1602 and interstitial conductor 1603. The concentrically outgoing waves are reflected by sides 1607 and 1608 and travel inwardly in the area between interstitial conductor 1603 and RF array 1606. The reflection from the edge of the circular perimeter causes the wave to remain in phase (i.e., it is an in-phase reflection). The travelling wave is slowed by dielectric layer 1605. At this point, the travelling wave starts interacting and exciting with elements in RF array 1606 to obtain the desired scattering.

To terminate the travelling wave, a termination 1609 is included in the antenna at the geometric center of the antenna. In one embodiment, termination 1609 comprises a pin termination (e.g., a 50Ω pin). In another embodiment, termination 1609 comprises an RF absorber that terminates unused energy to prevent reflections of that unused energy back through the feed structure of the antenna. These could be used at the top of RF array 1606.

Figure 28:
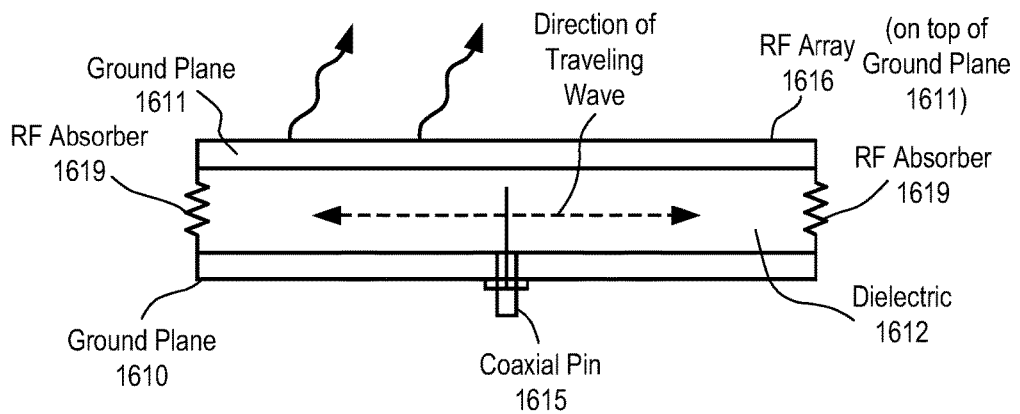
FIG. 28 illustrates another embodiment of the antenna system with an outgoing wave.

FIG. 28 illustrates another embodiment of the antenna system with an outgoing wave. Referring to FIG. 28, two ground planes 1610 and 1611 are substantially parallel to each other with a dielectric layer 1612 (e.g., a plastic layer, etc.) in between ground planes. RF absorbers 1619 (e.g., resistors) couple the two ground planes 1610 and 1611 together. A coaxial pin 1615 (e.g., 50Ω) feeds the antenna. An RF array 1616 is on top of dielectric layer 1612 and ground plane 1611.

In operation, a feed wave is fed through coaxial pin 1615 and travels concentrically outward and interacts with the elements of RF array 1616.

The cylindrical feed in both the antennas of FIGS. 25 and 26 improves the service angle of the antenna. Instead of a service angle of plus or minus forty five degrees azimuth (±45° Az) and plus or minus twenty five degrees elevation (±25° El), in one embodiment, the antenna system has a service angle of seventy five degrees (75°) from the bore sight in all directions. As with any beam forming antenna comprised of many individual radiators, the overall antenna gain is dependent on the gain of the constituent elements, which themselves are angle-dependent. When using common radiating elements, the overall antenna gain typically decreases as the beam is pointed further off bore sight. At 75 degrees off bore sight, significant gain degradation of about 6 dB is expected.

Embodiments of the antenna having a cylindrical feed solve one or more problems. These include dramatically simplifying the feed structure compared to antennas fed with a corporate divider network and therefore reducing total required antenna and antenna feed volume; decreasing sensitivity to manufacturing and control errors by maintaining high beam performance with coarser controls (extending all the way to simple binary control); giving a more advantageous side lobe pattern compared to rectilinear feeds because the cylindrically oriented feed waves result in spatially diverse side lobes in the far field; and allowing polarization to be dynamic, including allowing left-hand circular, right-hand circular, and linear polarizations, while not requiring a polarizer.

Array of Wave Scattering Elements

RF array 1606 of FIG. 27 and RF array 1616 of FIG. 28 include a wave scattering subsystem that includes a group of patch antennas (i.e., scatterers) that act as radiators. This group of patch antennas comprises an array of scattering metamaterial elements.

In one embodiment, each scattering element in the antenna system is part of a unit cell that consists of a lower conductor, a dielectric substrate and an upper conductor that embeds a complementary electric inductive-capacitive resonator ("complementary electric LC" or "CELC") that is etched in or deposited onto the upper conductor.

In one embodiment, a liquid crystal (LC) is injected in the gap around the scattering element. Liquid crystal is encapsulated in each unit cell and separates the lower conductor associated with a slot from an upper conductor associated with its patch. Liquid crystal has a permittivity that is a function of the orientation of the molecules comprising the liquid crystal, and the orientation of the molecules (and thus the permittivity) can be controlled by adjusting the bias voltage across the liquid crystal. Using this property, the liquid crystal acts as an on/off switch for the transmission of energy from the guided wave to the CELC. When switched on, the CELC emits an electromagnetic wave like an electrically small dipole antenna.

Controlling the thickness of the LC increases the beam switching speed. A fifty percent (50%) reduction in the gap between the lower and the upper conductor (the thickness of the liquid crystal) results in a fourfold increase in speed. In another embodiment, the thickness of the liquid crystal results in a beam switching speed of approximately fourteen milliseconds (14 ms). In one embodiment, the LC is doped in a manner well-known in the art to improve responsiveness so that a seven millisecond (7 ms) requirement can be met.

The CELC element is responsive to a magnetic field that is applied parallel to the plane of the CELC element and perpendicular to the CELC gap complement. When a voltage is applied to the liquid crystal in the metamaterial scattering unit cell, the magnetic field component of the guided wave induces a magnetic excitation of the CELC, which, in turn, produces an electromagnetic wave in the same frequency as the guided wave.

The phase of the electromagnetic wave generated by a single CELC can be selected by the position of the CELC on the vector of the guided wave. Each cell generates a wave in phase with the guided wave parallel to the CELC. Because the CELCs are smaller than the wave length, the output wave has the same phase as the phase of the guided wave as it passes beneath the CELC.

In one embodiment, the cylindrical feed geometry of this antenna system allows the CELC elements to be positioned at forty-five-degree (45°) angles to the vector of the wave in the wave feed. This position of the elements enables control of the polarization of the free space wave generated from or received by the elements. In one embodiment, the CELCs are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

In one embodiment, the CELCs are implemented with patch antennas that include a patch co-located over a slot with liquid crystal between the two. In this respect, the metamaterial antenna acts like a slotted (scattering) wave guide. With a slotted wave guide, the phase of the output wave depends on the location of the slot in relation to the guided wave.

Cell Placement

Figure 29:
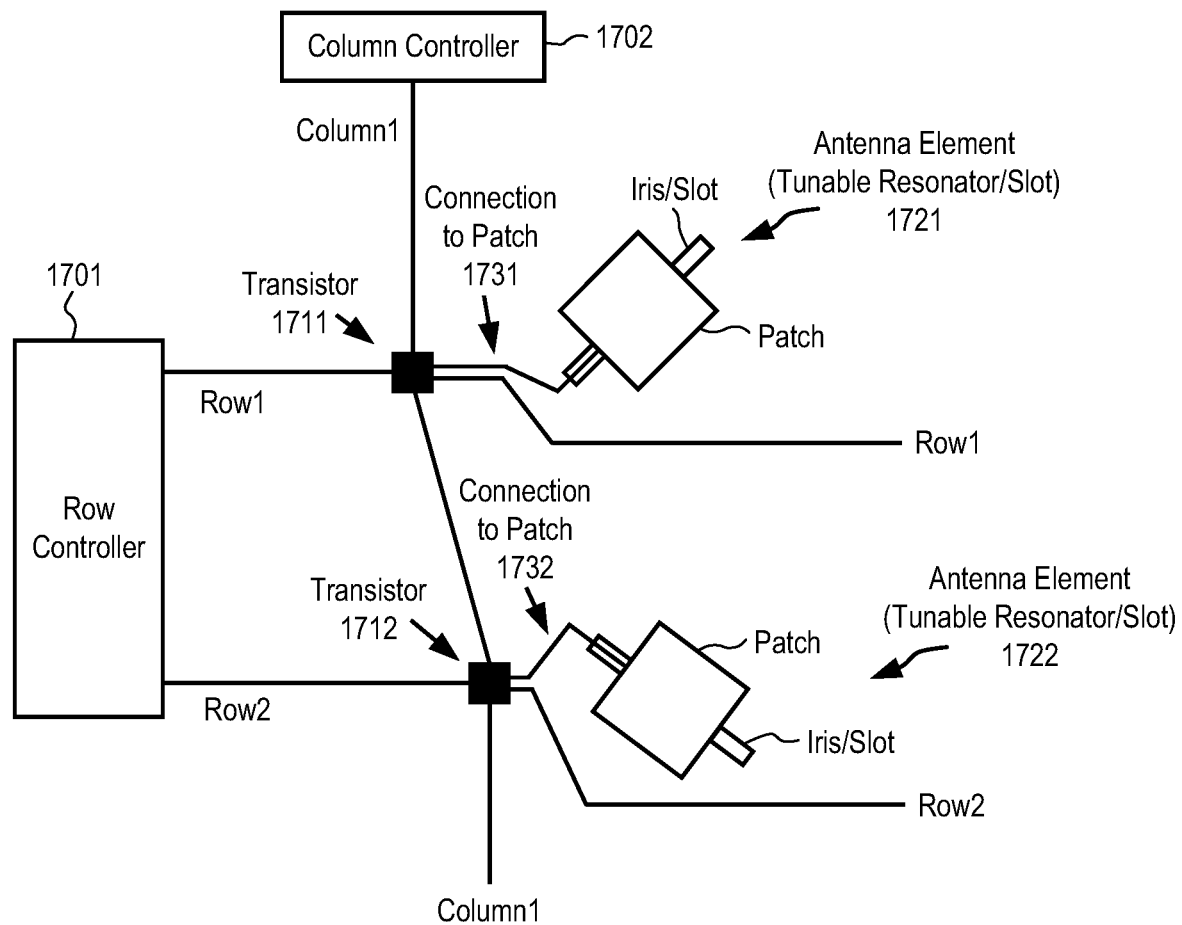
FIG. 29 illustrates one embodiment of the placement of matrix drive circuitry with respect to antenna elements.

In one embodiment, the antenna elements are placed on the cylindrical feed antenna aperture in a way that allows for a systematic matrix drive circuit. The placement of the cells includes placement of the transistors for the matrix drive. FIG. 29 illustrates one embodiment of the placement of matrix drive circuitry with respect to antenna elements. Referring to FIG. 29, row controller 1701 is coupled to transistors 1711 and 1712, via row select signals Row1 and Row2, respectively, and column controller 1702 is coupled to transistors 1711 and 1712 via column select signal Column1. Transistor 1711 is also coupled to antenna element 1721 via connection to patch 1731, while transistor 1712 is coupled to antenna element 1722 via connection to patch 1732.

In an initial approach to realize matrix drive circuitry on the cylindrical feed antenna with unit cells placed in a non-regular grid, two steps are performed. In the first step, the cells are placed on concentric rings and each of the cells is connected to a transistor that is placed beside the cell and acts as a switch to drive each cell separately. In the second step, the matrix drive circuitry is built in order to connect every transistor with a unique address as the matrix drive approach requires. Because the matrix drive circuit is built by row and column traces (similar to LCDs) but the cells are placed on rings, there is no systematic way to assign a unique address to each transistor. This mapping problem results in very complex circuitry to cover all the transistors and leads to a significant increase in the number of physical traces to accomplish the routing. Because of the high density of cells, those traces disturb the RF performance of the antenna due to coupling effect. Also, due to the complexity of traces and high packing density, the routing of the traces cannot be accomplished by commercially available layout tools.

In one embodiment, the matrix drive circuitry is predefined before the cells and transistors are placed. This ensures a minimum number of traces that are necessary to drive all the cells, each with a unique address. This strategy reduces the complexity of the drive circuitry and simplifies the routing, which subsequently improves the RF performance of the antenna.

More specifically, in one approach, in the first step, the cells are placed on a regular rectangular grid composed of rows and columns that describe the unique address of each cell. In the second step, the cells are grouped and transformed to concentric circles while maintaining their address and connection to the rows and columns as defined in the first step. A goal of this transformation is not only to put the cells on rings but also to keep the distance between cells and the distance between rings constant over the entire aperture. In order to accomplish this goal, there are several ways to group the cells.

Figure 30:
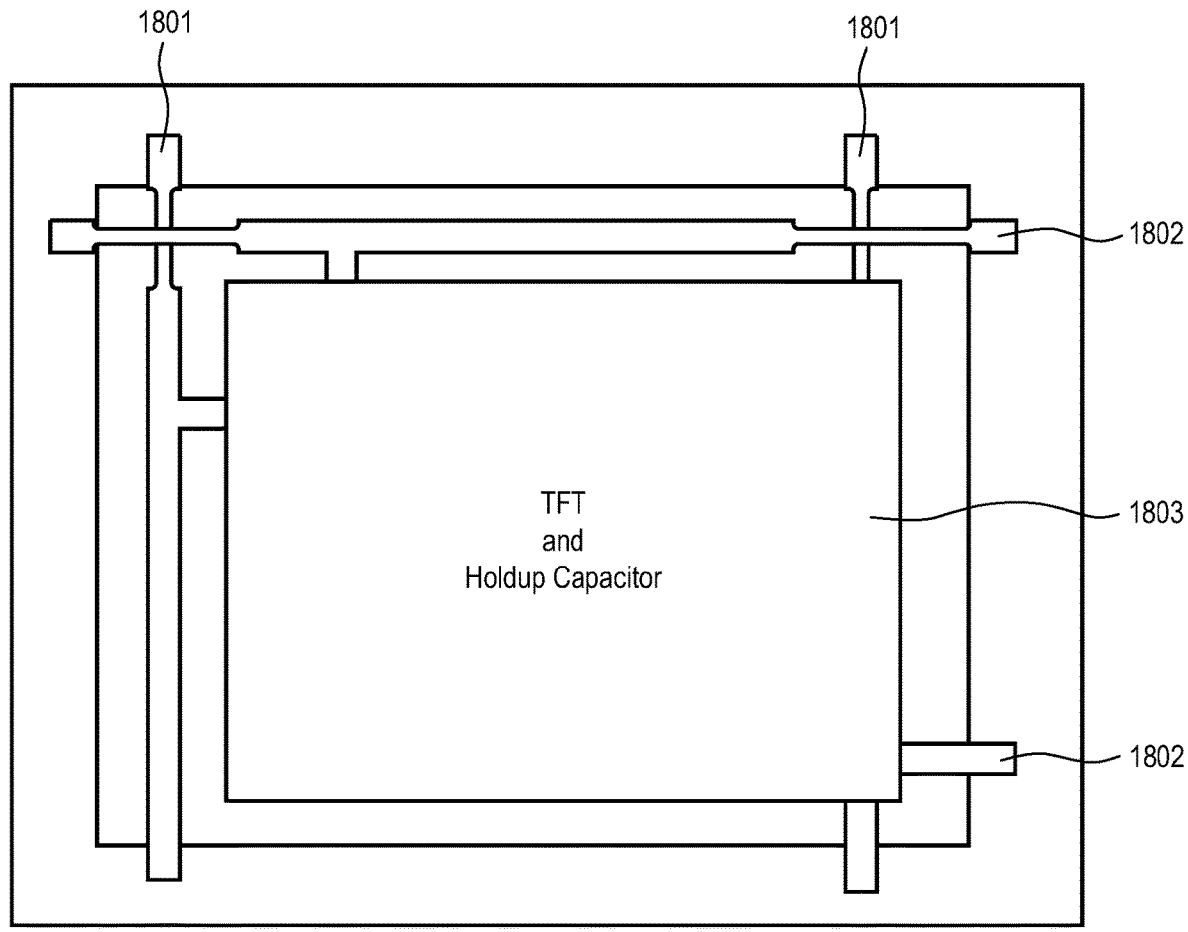
FIG. 30 illustrates one embodiment of a TFT package.

In one embodiment, a TFT package is used to enable placement and unique addressing in the matrix drive. FIG. 30 illustrates one embodiment of a TFT package. Referring to FIG. 30, a TFT and a hold capacitor 1803 is shown with input and output ports. There are two input ports connected to traces 1801 and two output ports connected to traces 1802 to connect the TFTs together using the rows and columns. In one embodiment, the row and column traces cross in 90° angles to reduce, and potentially minimize, the coupling between the row and column traces. In one embodiment, the row and column traces are on different layers.

An Example System Embodiment

In one embodiment, the combined antenna apertures are used in a television system that operates in conjunction with a set top box. For example, in the case of a dual reception antenna, satellite signals received by the antenna are provided to a set top box (e.g., a DirecTV receiver) of a television system. More specifically, the combined antenna operation is able to simultaneously receive RF signals at two different frequencies and/or polarizations. That is, one sub-array of elements is controlled to receive RF signals at one frequency and/or polarization, while another sub-array is controlled to receive signals at another, different frequency and/or polarization. These differences in frequency or polarization represent different channels being received by the television system. Similarly, the two antenna arrays can be controlled for two different beam positions to receive channels from two different locations (e.g., two different satellites) to simultaneously receive multiple channels.

Figure 31:
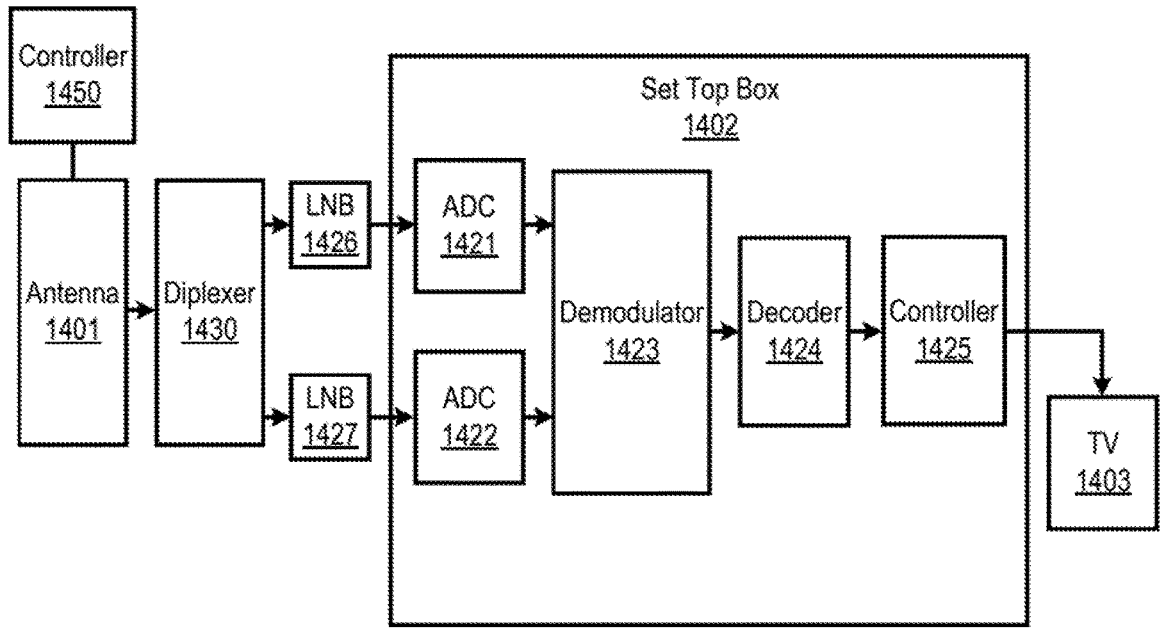
FIG. 31 is a block diagram of an embodiment of a communication system having simultaneous transmit and receive paths.

FIG. 31 is a block diagram of one embodiment of a communication system that performs dual reception simultaneously in a television system. Referring to FIG. 31, antenna 1401 includes two spatially interleaved antenna apertures operable independently to perform dual reception simultaneously at different frequencies and/or polarizations as described above. Note that while only two spatially interleaved antenna operations are mentioned, the TV system may have more than two antenna apertures (e.g., 3, 4, 5, etc. antenna apertures).

In one embodiment, antenna 1401, including its two interleaved slotted arrays, is coupled to diplexer 1430. The coupling may include one or more feeding networks that receive the signals from elements of the two slotted arrays to produce two signals that are fed into diplexer 1430. In one embodiment, diplexer 1430 is a commercially available diplexer (e.g., model PB1081WA Ku-band sitcom diplexer from A1 Microwave).

Diplexer 1430 is coupled to a pair of low noise block down converters (LNBs) 1426 and 1427, which perform a noise filtering function, a down conversion function, and amplification in a manner well-known in the art. In one embodiment, LNBs 1426 and 1427 are in an out-door unit (ODU). In another embodiment, LNBs 1426 and 1427 are integrated into the antenna apparatus. LNBs 1426 and 1427 are coupled to a set top box 1402, which is coupled to television 1403.

Set top box 1402 includes a pair of analog-to-digital converters (ADCs) 1421 and 1422, which are coupled to LNBs 1426 and 1427, to convert the two signals output from diplexer 1430 into digital format.

Once converted to digital format, the signals are demodulated by demodulator 1423 and decoded by decoder 1424 to obtain the encoded data on the received waves. The decoded data is then sent to controller 1425, which sends it to television 1403.

Controller 1450 controls antenna 1401, including the interleaved slotted array elements of both antenna apertures on the single combined physical aperture.

An Example of a Full Duplex Communication System

Figure 32:
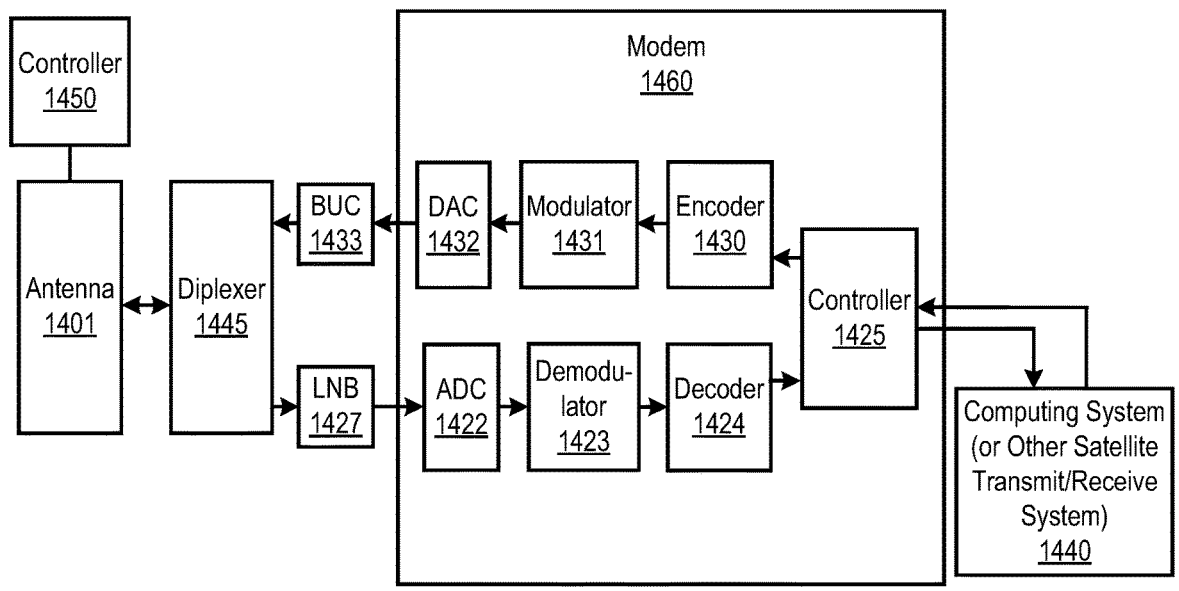
FIG. 32 is a block diagram of another embodiment of a communication system having simultaneous transmit and receive paths.

In another embodiment, the combined antenna apertures are used in a full duplex communication system. FIG. 32 is a block diagram of another embodiment of a communication system having simultaneous transmit and receive paths. While only one transmit path and one receive path are shown, the communication system may include more than one transmit path and/or more than one receive path.

Referring to FIG. 32, antenna 1401 includes two spatially interleaved antenna arrays operable independently to transmit and receive simultaneously at different frequencies as described above. In one embodiment, antenna 1401 is coupled to diplexer 1445. The coupling may be by one or more feeding networks. In one embodiment, in the case of a radial feed antenna, diplexer 1445 combines the two signals and the connection between antenna 1401 and diplexer 1445 is a single broad-band feeding network that can carry both frequencies.

Diplexer 1445 is coupled to a low noise block down converter (LNBs) 1427, which performs a noise filtering function and a down conversion and amplification function in a manner well-known in the art. In one embodiment, LNB 1427 is in an out-door unit (ODU). In another embodiment, LNB 1427 is integrated into the antenna apparatus. LNB 1427 is coupled to a modem 1460, which is coupled to computing system 1440 (e.g., a computer system, modem, etc.).

Modem 1460 includes an analog-to-digital converter (ADC) 1422, which is coupled to LNB 1427, to convert the received signal output from diplexer 1445 into digital format. Once converted to digital format, the signal is demodulated by demodulator 1423 and decoded by decoder 1424 to obtain the encoded data on the received wave. The decoded data is then sent to controller 1425, which sends it to computing system 1440.

Modem 1460 also includes an encoder 1430 that encodes data to be transmitted from computing system 1440. The encoded data is modulated by modulator 1431 and then converted to analog by digital-to-analog converter (DAC) 1432. The analog signal is then filtered by a BUC (up-convert and high pass amplifier) 1433 and provided to one port of diplexer 1445. In one embodiment, BUC 1433 is in an out-door unit (ODU).

Diplexer 1445 operating in a manner well-known in the art provides the transmit signal to antenna 1401 for transmission.

Controller 1450 controls antenna 1401, including the two arrays of antenna elements on the single combined physical aperture.

Note that the full duplex communication system shown in FIG. 32 has a number of applications, including but not limited to, internet communication, vehicle communication (including software updating), etc.

There is a number of example embodiments described herein.

Example 1 is a method for controlling an antenna having a plurality of radio frequency (RF) radiating antenna elements, the method comprising: performing modulation for a frequency range, including determining a first set of modulation values for achievable modulation states associated with the frequency range; mapping modulation values associated with the achievable modulation states to one or more control parameters; and controlling the radiating antenna elements using the one or more control parameters to perform beam forming.

Example 2 is the method of example 1 that may optionally include that performing modulation for a frequency range occurs in response to determining instantaneous bandwidth (IBW) requirements would not be met by a beam formed by the antenna with a second set of modulation values.

Example 3 is the method of example 3 that may optionally include that determining instantaneous bandwidth (IBW) requirements are not met by a beam formed by the antenna with a second set of modulation values is performed after determining gain is sufficient to allow for adjustments to the frequency range associated with the second set of modulation values in order to satisfy the IBW requirements.

Example 4 is the method of example 1 that may optionally include mapping a desired modulation to the achievable modulation states.

Example 5 is the method of example 4 that may optionally include that mapping the desired modulation to the achievable modulation states is based on Euclidian distance between required and achievable polarizabilities and each of the achievable modulation states corresponds to voltages applied to the antenna elements of the antenna to induce magnetic dipole moments with achievable polarizabilities.

Example 6 is the method of example 4 that may optionally include that the RF radiating antenna elements comprise tunable elements in a metasurface and mapping the desired modulation to the achievable modulation states comprises approximating a set of required polarizabilities with a set of the tunable elements in the metasurface.

Example 7 is the method of example 1 that may optionally include that the one or more control parameters comprise a voltage to be applied to each of the RF radiating antenna elements.

Example 8 is the method of example 1 that may optionally include obtaining the desired modulation, wherein the desired modulation is based on one or more of: location of at least a subset of the RF radiating antenna elements, beam pointing direction and polarization, and wave propagation in a feed of the antenna.

Example 9 is an antenna comprising: an antenna aperture having a plurality of RF radiating antenna elements; a controller coupled to the antenna aperture and having modulation logic to perform modulation for a frequency range, the modulation logic operable to determine a first set of modulation values for achievable modulation states associated with the frequency range and map modulation values associated with the achievable modulation states to one or more control parameters; and drive circuitry coupled to the antenna aperture and the controller to control the RF radiating antenna elements using the one or more control parameters to perform beam forming.

Example 10 is the antenna of example 9 that may optionally include that the modulation logic is operable to perform modulation for a frequency range occurs in response to determining instantaneous bandwidth (IBW) requirements are not met by a beam formed by the antenna with a second set of modulation values.

Example 11 is the antenna of example 10 that may optionally include that the modulation logic is operable to determine instantaneous bandwidth (IBW) requirements would not be met by a beam formed by the antenna with a second set of modulation values after determining gain is sufficient to allow for adjustments to the frequency range associated with the second set of modulation values in order to satisfy the IBW requirements.

Example 12 is the antenna of example 9 that may optionally include that the modulation logic is further operable to map a desired modulation to the achievable modulation states.

Example 13 is the antenna of example 12 that may optionally include that the modulation logic maps the desired modulation to the achievable modulation states based on Euclidian distance between required and achievable polarizabilities and each of the achievable modulation states corresponds to voltages applied to the antenna elements of the antenna to induce magnetic dipole moments with achievable polarizabilities.

Example 14 is the antenna of example 12 that may optionally include that the RF radiating antenna elements comprise tunable elements in a metasurface and the modulation logic maps the desired modulation to the achievable modulation states by approximating a set of required polarizabilities with a set of the tunable elements in the metasurface.

Example 15 is the antenna of example 9 that may optionally include that the one or more control parameters comprise a voltage to be applied to each of the RF radiating antenna elements.

Example 16 is the antenna of example 9 that may optionally include that the modulation logic is further operable to obtain the desired modulation, wherein the desired modulation is based on one or more of: location of at least a subset of the RF radiating antenna elements, beam pointing direction and polarization, and wave propagation in a feed of the antenna.

Example 17 is one or more non-transitory computer readable storage media having instructions stored thereupon which, when executed by an antenna having at least a processor and a memory therein, cause antenna to perform operations comprising: performing modulation for a frequency range, including determining a first set of modulation values for achievable modulation states associated with the frequency range; mapping modulation values associated with the achievable modulation states to one or more control parameters; and controlling the radiating antenna elements using the one or more control parameters to perform beam forming.

Example 18 is the one or more non-transitory computer readable storage media of example 17 that may optionally include that performing modulation for a frequency range occurs in response to determining instantaneous bandwidth (IBW) requirements would not be met by a beam formed by the antenna with a second set of modulation values.

Example 19 is the one or more non-transitory computer readable storage media of example 18 that may optionally include that determining instantaneous bandwidth (IBW) requirements would not be met by a beam formed by the antenna with a second set of modulation values is performed after determining gain is sufficient to allow for adjustments to the frequency range associated with the second set of modulation values in order to satisfy the IBW requirements.

Example 20 is the one or more non-transitory computer readable storage media of example 17 that may optionally include that mapping a desired modulation to the achievable modulation states.

Example 21 is the one or more non-transitory computer readable storage media of example 20 that may optionally include that mapping the desired modulation to the achievable modulation states is based on Euclidian distance between required and achievable polarizabilities and each of the achievable modulation states corresponds to voltages applied to the antenna elements of the antenna to induce magnetic dipole moments with achievable polarizabilities.

Example 22 is a method comprising: a) determining, for a first frequency window, a desired modulation associated with a desired impedance for each radio frequency (RF) radiating antenna element of a plurality of RF radiating antenna elements of an antenna, using a holographic equation that relates a feed wave to a desired radiation pattern; b) mapping the desired modulation to achievable modulation states using Euclidean mapping; c) determining whether gain associated with a modulation pattern is above a threshold; d) determining whether requirements for instantaneous bandwidth (IBW) would be met previously by the first frequency window; e) adjusting the first frequency window by increasing size of the first frequency window to create a second frequency window if the gain is above the threshold and requirements for IBW would not be met by the first window; and f) repeating a)-c) using the second frequency window instead of the first frequency window.

Example 23 is the method of example 22 that may optionally include that the first frequency window comprises a single frequency.

Example 24 is the method of example 22 that may optionally include g) determining whether requirements for instantaneous bandwidth (IBW) have been met for the modulation with the second frequency window; and h) if requirements for IBW are met, then mapping modulation values associated with the achievable modulation states to one or more control parameters, and controlling radio frequency (RF) radiating antenna elements using the one or more control parameters to perform beam forming.

Example 25 is the method of example 24 that may optionally include, if requirements for IBW are not met but the gain is above the threshold, then h) adjusting the second frequency window by increasing size of the second frequency window to create a third frequency window; and i) repeating a)-c) using the third frequency window instead of the second frequency window.

Example 26 is the method of example 24 that may optionally include that mapping a desired modulation to achievable modulation states is based on Euclidian distance.

Example 27 is the method of example 24 that may optionally include that the one or more control parameters comprise a voltage to be applied to each of the RF radiating antenna elements.

Example 28 is the method of example 27 that may optionally include that the RF radiating antenna elements comprise tunable elements in a metasurface and mapping the desired modulation to achievable modulation states comprises approximating a set of required polarizabilities with a set of the tunable elements in the metasurface.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for controlling an antenna having a plurality of radio frequency (RF) radiating antenna elements, the method comprising:
  performing modulation for a frequency range that includes multiple frequency values, including determining a first set of modulation values for achievable modulation states associated with the frequency range;

mapping modulation values associated with the achievable modulation states to one or more control parameters, including mapping a desired modulation to the achievable modulation states based on Euclidian distance between required and achievable polarizabilities, and each of the achievable modulation states corresponds to voltages applied to the antenna elements of the antenna to induce magnetic dipole moments with achievable polarizabilities; and controlling the radiating antenna elements using the one or more control parameters to perform beam forming.

2. The method of claim 1 wherein performing modulation for a frequency range occurs in response to determining instantaneous bandwidth (IBW) requirements would not be met by a beam formed by the antenna with a second set of modulation values.

3. The method of claim 2 wherein determining instantaneous bandwidth (IBW) requirements are not met by a beam formed by the antenna with a second set of modulation values is performed after determining gain is sufficient to allow for adjustments to the frequency range associated with the second set of modulation values in order to satisfy the IBW requirements.

4. The method of claim 1 wherein the RF radiating antenna elements comprise tunable elements in a metasurface and mapping the desired modulation to the achievable modulation states comprises approximating a set of required polarizabilities with a set of the tunable elements in the metasurface.

5. The method defined in claim 1 wherein the one or more control parameters comprise a voltage to be applied to each of the RF radiating antenna elements.

6. The method defined in claim 1 further comprising obtaining the desired modulation, wherein the desired modulation is based on one or more of: location of at least a subset of the RF radiating antenna elements, beam pointing direction and polarization, and wave propagation in a feed of the antenna.

7. An antenna comprising:
an antenna aperture having a plurality of RF radiating antenna elements;
a controller coupled to the antenna aperture and having modulation logic to perform modulation for a frequency range that includes multiple frequency values, the modulation logic operable to determine a first set of modulation values for achievable modulation states associated with the frequency range and map modulation values associated with the achievable modulation states to one or more control parameters, wherein the modulation logic is further operable to map a desired modulation to the achievable modulation states based on Euclidian distance between required and achievable polarizabilities, and each of the achievable modulation states corresponds to voltages applied to the antenna elements of the antenna to induce magnetic dipole moments with achievable polarizabilities; and
drive circuitry coupled to the antenna aperture and the controller to control the RF radiating antenna elements using the one or more control parameters to perform beam forming.

8. The antenna of claim 7 wherein the modulation logic is operable to perform modulation for a frequency range occurs in response to determining instantaneous bandwidth (IBW) requirements are not met by a beam formed by the antenna with a second set of modulation values.

9. The antenna of claim 8 wherein the modulation logic is operable to determine instantaneous bandwidth (IBW) requirements would not be met by a beam formed by the antenna with a second set of modulation values after determining gain is sufficient to allow for adjustments to the frequency range associated with the second set of modulation values in order to satisfy the IBW requirements.

10. The antenna of claim 7 wherein the RF radiating antenna elements comprise tunable elements in a metasurface and the modulation logic maps the desired modulation to the achievable modulation states by approximating a set of required polarizabilities with a set of the tunable elements in the metasurface.

11. The antenna defined in claim 7 wherein the one or more control parameters comprise a voltage to be applied to each of the RF radiating antenna elements.

12. The antenna defined in claim 7 wherein the modulation logic is further operable to obtain the desired modulation, wherein the desired modulation is based on one or more of: location of at least a subset of the RF radiating antenna elements, beam pointing direction and polarization, and wave propagation in a feed of the antenna.

13. One or more non-transitory computer readable storage media having instructions stored thereupon which, when executed by an antenna having at least a processor and a memory therein, cause antenna to perform operations comprising:
performing modulation for a frequency range that includes multiple frequency values, including determining a first set of modulation values for achievable modulation states associated with the frequency range;
mapping modulation values associated with the achievable modulation states to one or more control parameters, including mapping a desired modulation to the achievable modulation states based on Euclidian distance between required and achievable polarizabilities, and each of the achievable modulation states corresponds to voltages applied to the antenna elements of the antenna to induce magnetic dipole moments with achievable polarizabilities; and
controlling the radiating antenna elements using the one or more control parameters to perform beam forming.

14. The one or more non-transitory computer readable storage media of claim 13 wherein performing modulation for a frequency range occurs in response to determining instantaneous bandwidth (IBW) requirements would not be met by a beam formed by the antenna with a second set of modulation values.

15. The one or more non-transitory computer readable storage media of claim 14 wherein determining instantaneous bandwidth (IBW) requirements would not be met by a beam formed by the antenna with a second set of modulation values is performed after determining gain is sufficient to allow for adjustments to the frequency range associated with the second set of modulation values in order to satisfy the IBW requirements.

* * * * *